(12) United States Patent
Jolly et al.

(10) Patent No.: US 7,942,633 B2
(45) Date of Patent: *May 17, 2011

(54) HELICOPTER VIBRATION CONTROL SYSTEM AND ROTARY FORCE GENERATOR FOR CANCELING VIBRATIONS

(75) Inventors: Mark Jolly, Raleigh, NC (US); Stephen Hildebrand, Apex, NC (US); Russell Altieri, Cary, NC (US); Matthew Ferguson, Erie, PA (US); Douglas Ivers, Cary, NC (US)

(73) Assignee: LORD Corporation, Cary, NC (US)

( * ) Notice: Subject to any disclaimer, the term of this patent is extended or adjusted under 35 U.S.C. 154(b) by 106 days.

This patent is subject to a terminal disclaimer.

(21) Appl. No.: 12/286,461

(22) Filed: Sep. 30, 2008

(65) Prior Publication Data

US 2009/0035137 A1 Feb. 5, 2009

Related U.S. Application Data

(63) Continuation of application No. 11/215,388, filed on Aug. 30, 2005, now Pat. No. 7,448,854.

(60) Provisional application No. 60/605,470, filed on Aug. 30, 2004.

(51) Int. Cl.
*F01D 5/26* (2006.01)

(52) U.S. Cl. .................... 416/1; 416/24; 416/98; 415/1; 415/116

(58) Field of Classification Search .................. 415/119, 415/1; 416/1, 24, 98
See application file for complete search history.

(56) References Cited

U.S. PATENT DOCUMENTS

| | | |
|---|---|---|
| 3,219,120 A | 11/1965 | Hooper |
| 3,509,971 A | 5/1970 | Gerstine et al. |
| 3,540,809 A | 11/1970 | Paul et al. |
| 3,635,427 A | 1/1972 | Balke |
| 3,649,132 A | 3/1972 | Arcidiacono |

(Continued)

FOREIGN PATENT DOCUMENTS

EP 0409462 A1 1/1991

(Continued)

OTHER PUBLICATIONS

Office Action dated Oct. 16, 2007 for corresponding U.S. Appl. No. 11/215,388, now U.S. Patent No. 7,448,854 issued Nov. 11, 2008.

(Continued)

*Primary Examiner* — Igor Kershteyn
(74) *Attorney, Agent, or Firm* — Edward F. Murphy, III

(57) ABSTRACT

Helicopter rotating hub mounted vibration control system for a rotary wing hub having periodic vibrations while rotating at an operational rotation frequency. The vibration control system includes a housing attachable to the rotary wing hub and rotating with the hub at the operational frequency. The housing is centered about the rotary wing hub axis of rotation and has an electronics housing cavity subsystem and an adjacent rotor housing cavity subsystem. The rotor housing cavity contains a first coaxial ring motor with a first rotor and imbalance mass and a second coaxial ring motor with a second rotor and imbalance mass. The electronics housing cavity contains an electronics control system which receives sensor outputs and electrically controls and drives the first motor and the second motor such that the first imbalance mass and the second imbalance mass are driven at a vibration canceling rotation frequency greater than the operational rotation frequency wherein the helicopter rotary wing hub periodic vibrations are reduced.

35 Claims, 38 Drawing Sheets

U.S. PATENT DOCUMENTS

| | | |
|---|---|---|
| 3,761,851 A | 9/1973 | Nelson |
| 3,770,997 A | 11/1973 | Presley |
| 3,783,746 A | 1/1974 | Jacobellis |
| 3,807,678 A | 4/1974 | Karnopp et al. |
| 3,839,945 A | 10/1974 | Jacobellis |
| 4,057,363 A | 11/1977 | Kenigsberg et al. |
| 4,083,654 A | 4/1978 | Kenigsberg et al. |
| 4,255,084 A | 3/1981 | Mouille et al. |
| 4,326,158 A | 4/1982 | Helgesen |
| 4,426,911 A | 1/1984 | Robinson et al. |
| 4,928,028 A | 5/1990 | Leibovich |
| 5,005,439 A | 4/1991 | Jensen |
| 5,219,143 A | 6/1993 | Staple et al. |
| 5,347,884 A | 9/1994 | Garnjost |
| 5,369,348 A | 11/1994 | Gennesseaux |
| 5,553,514 A | 9/1996 | Walkowc |
| 5,620,068 A | 4/1997 | Garnjost et al. |
| 5,647,726 A | 7/1997 | Sehgal et al. |
| 5,757,662 A | 5/1998 | Dyer et al. |
| 5,825,663 A | 10/1998 | Barba |
| 5,903,077 A | 5/1999 | Garnjost et al. |
| 6,105,685 A | 8/2000 | Bald |
| 6,212,445 B1 | 4/2001 | Barba et al. |
| 6,236,934 B1 | 5/2001 | Dyer et al. |
| 6,318,527 B1 | 11/2001 | Byrnes et al. |
| 6,354,536 B1 | 3/2002 | Torok et al. |
| 6,416,016 B1 | 7/2002 | Welsh |
| 6,476,534 B1 | 11/2002 | Vanderbeck et al. |
| 6,480,609 B1 | 11/2002 | Strehlow et al. |
| 6,618,646 B1 | 9/2003 | Dyer |
| 6,644,590 B2 | 11/2003 | Terpay et al. |
| 6,769,872 B2 | 8/2004 | Torok et al. |
| 7,047,109 B2 * | 5/2006 | Ogura et al. ............... 700/280 |
| 7,448,854 B2 | 11/2008 | Jolly |
| 7,471,057 B2 | 12/2008 | Clary |
| 7,554,237 B2 | 6/2009 | Clary |
| 2002/0123403 A1 | 9/2002 | Welsh |
| 2003/0060903 A1 | 3/2003 | MacMartin et al. |
| 2003/0089193 A1 | 5/2003 | Altieri et al. |
| 2004/0036367 A1 | 2/2004 | Denton et al. |
| 2004/0050999 A1 | 3/2004 | Hill et al. |
| 2004/0098168 A1 | 5/2004 | Dyer |
| 2005/0079056 A1 | 4/2005 | Welsh |
| 2005/0114053 A1 | 5/2005 | Southward et al. |
| 2005/0201863 A1 | 9/2005 | Welsh |
| 2009/0116963 A1 | 5/2009 | Welsh |
| 2009/0236468 A1 | 9/2009 | Welsh |

FOREIGN PATENT DOCUMENTS

| | | |
|---|---|---|
| EP | 0601527 B1 | 4/1997 |
| GB | 1120193 A | 7/1968 |
| JP | 61164109 A | 7/1986 |
| JP | 2001233296 | 8/2001 |

OTHER PUBLICATIONS

PCT International Search Report and Written Opinion for PCT/2005/030909.

Kollmorgen, BM(S) Series Motors, Radford, VA, pp. 1-17, 2003.

Moog Inc., General Characteristics—High Frequency Rotor/Stator Units, East Aurora, NY, pp. 1-6, 2010.

Advanced Motion Controls, B30A40 Series Brushless Servo Amplifiers, Camarillo, CA, pp. C-59-C-66, Dec. 8, 2010.

PCT International Search Report and Written Opinion for PCT/2005/030909, Jan. 12, 2006.

May 5, 2009 Office Action U.S. Appl. No. 11/557,384.

* cited by examiner

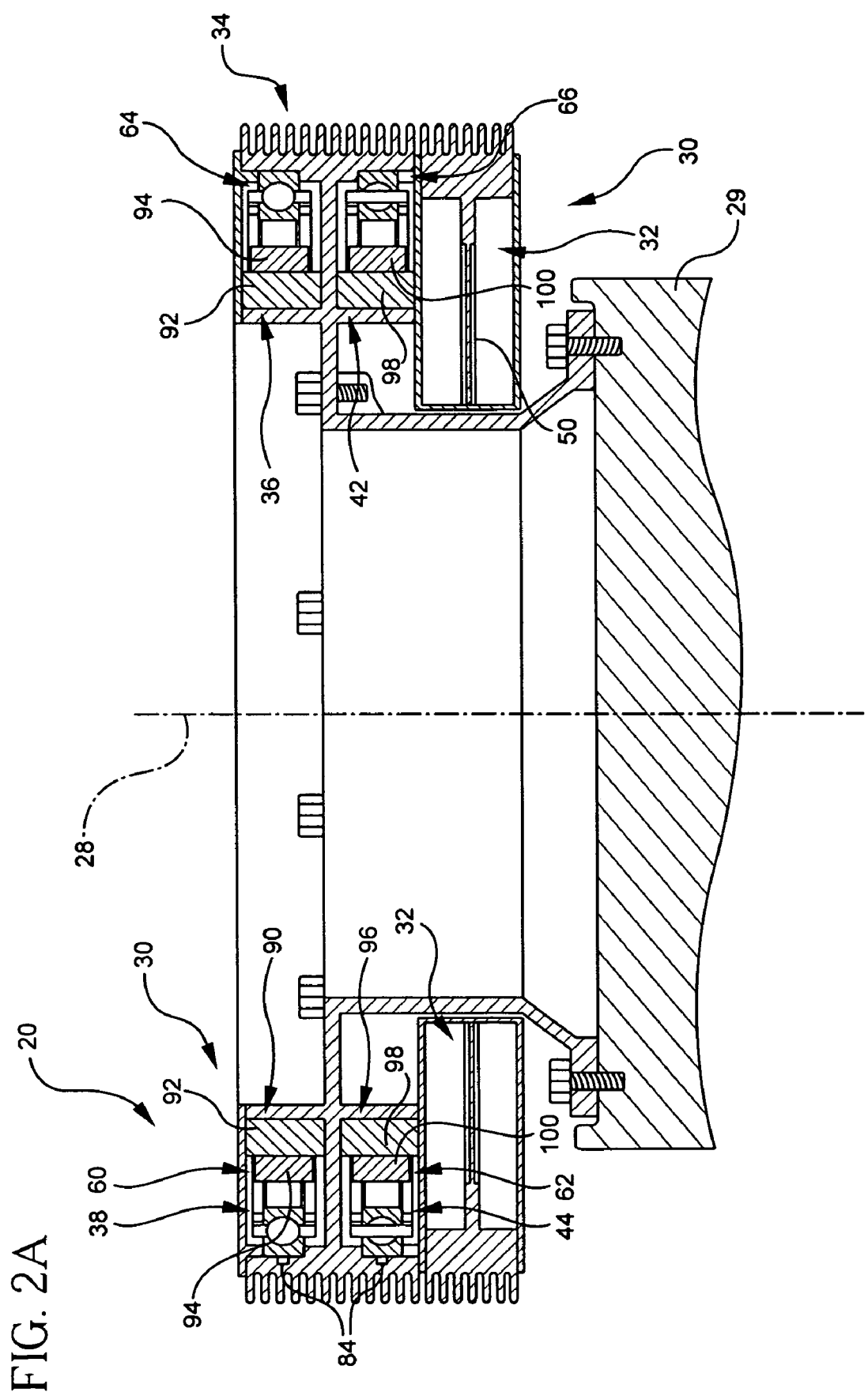

- - - - Rotor 1
......... Rotor 2
- · - · - Resultant
———— Disturbance

- - - - Rotor 1
......... Rotor 2
- · - · - Resultant
———— Disturbance

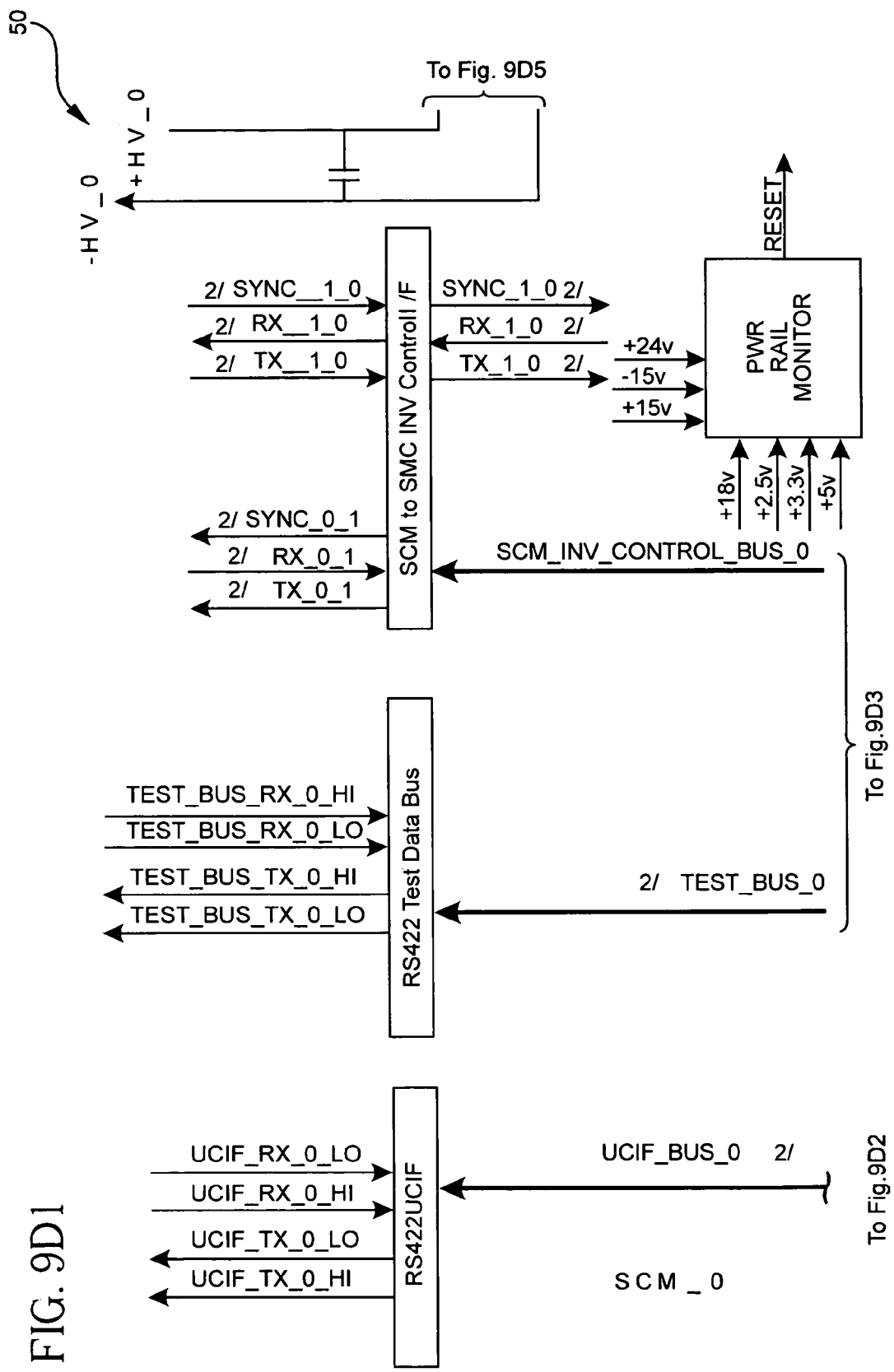
FIG. 9D1

FIG. 9D2
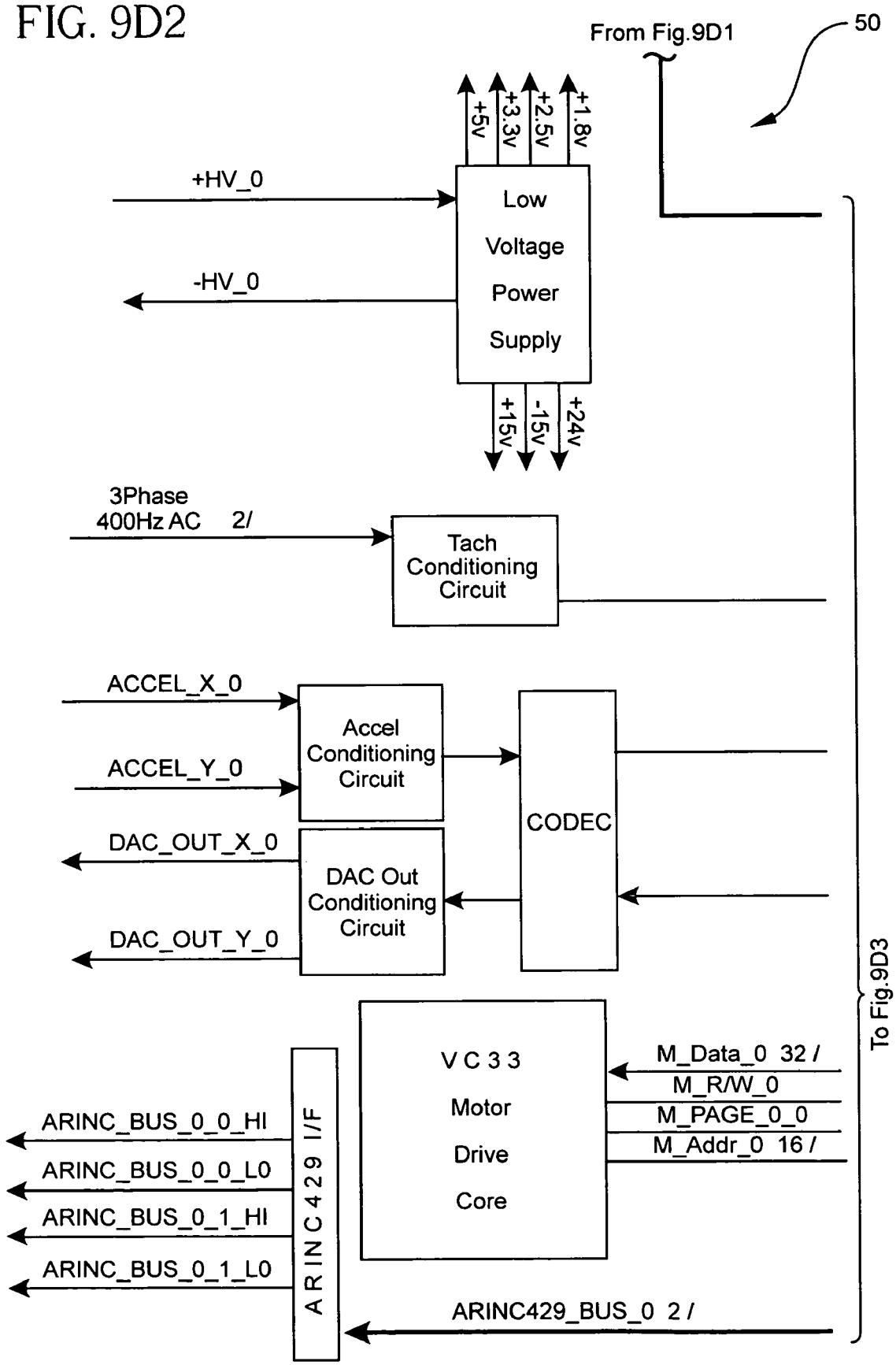

FIG. 9D3
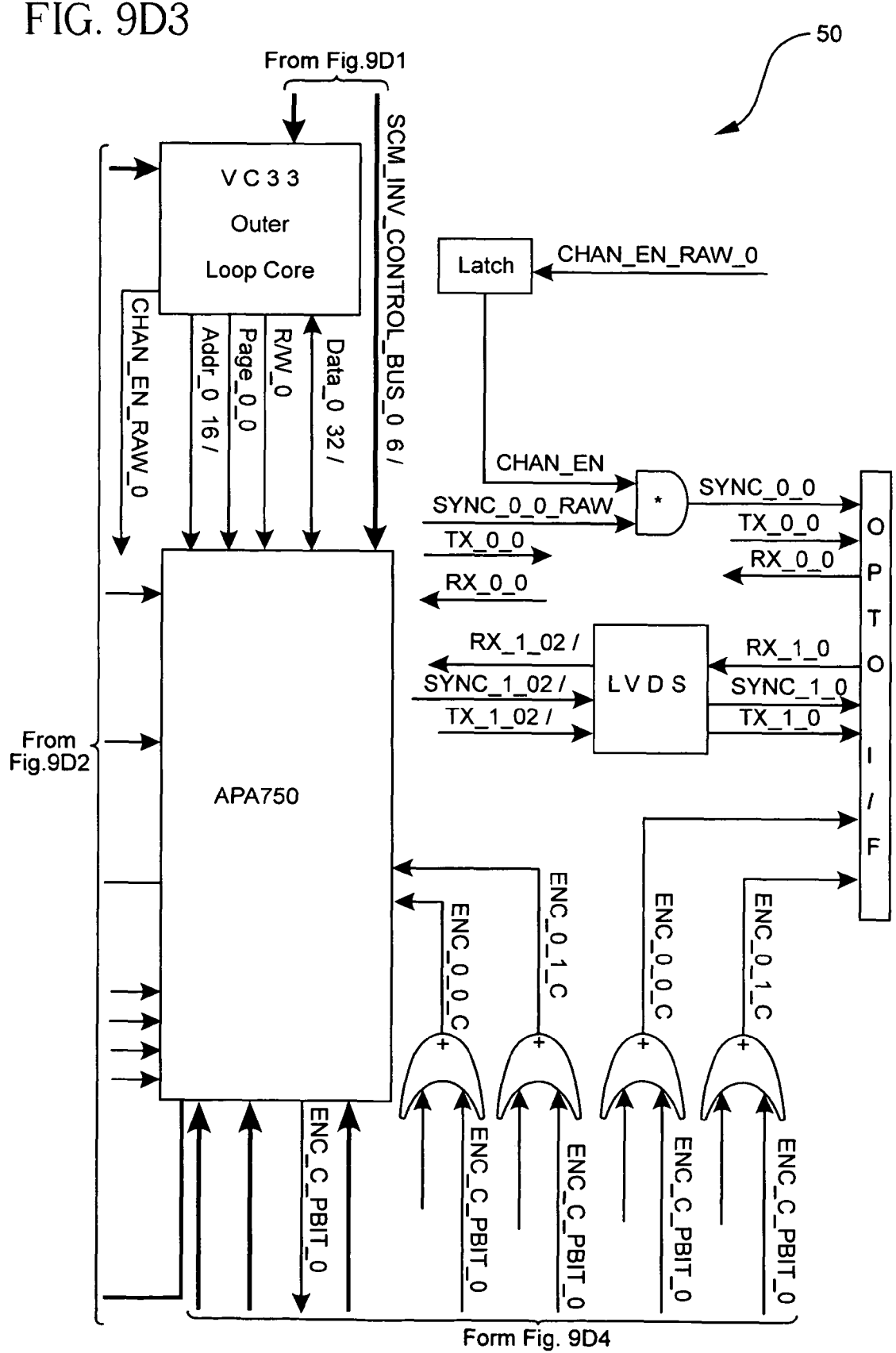

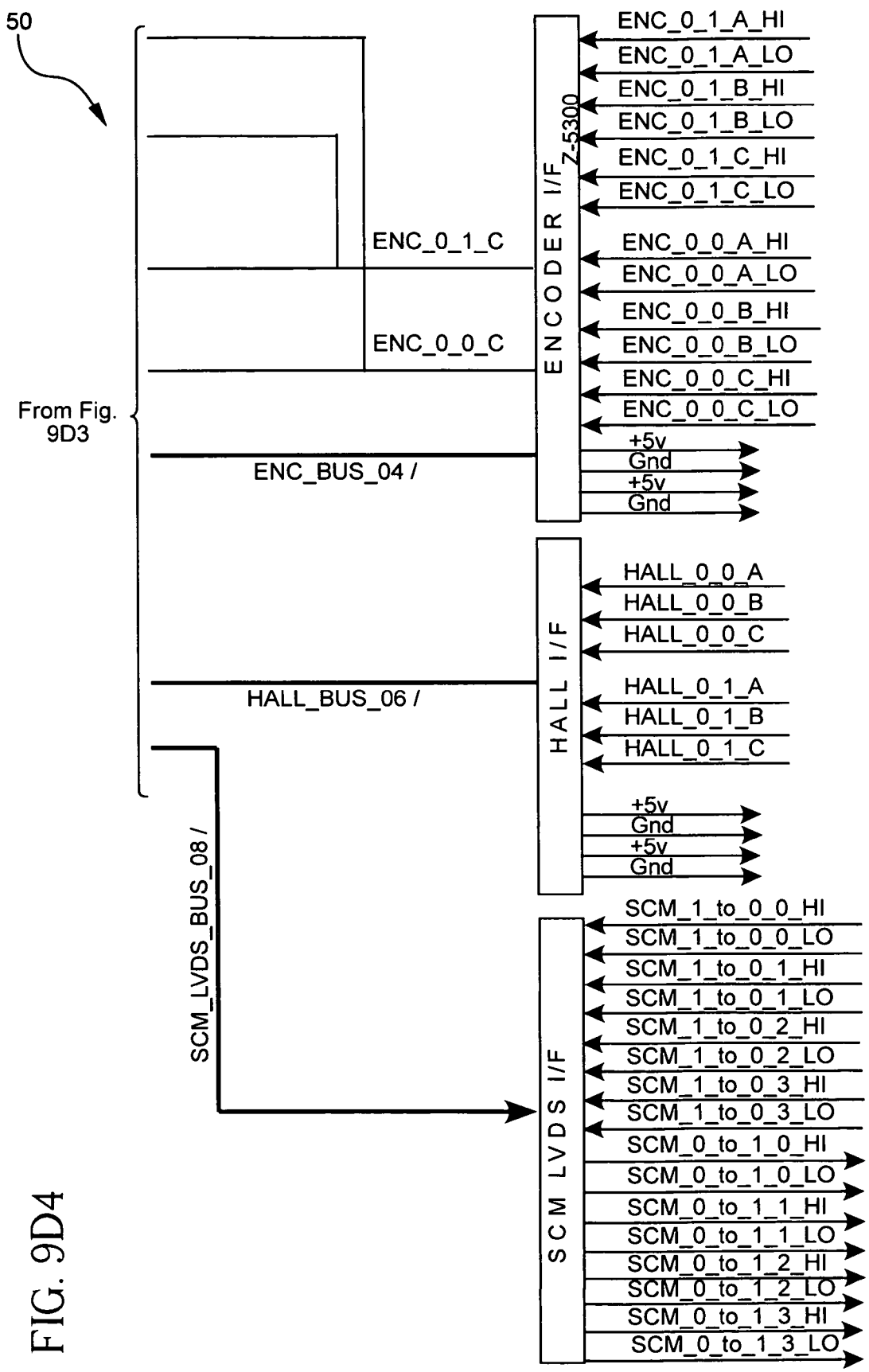
FIG. 9D4

FIG. 9D5
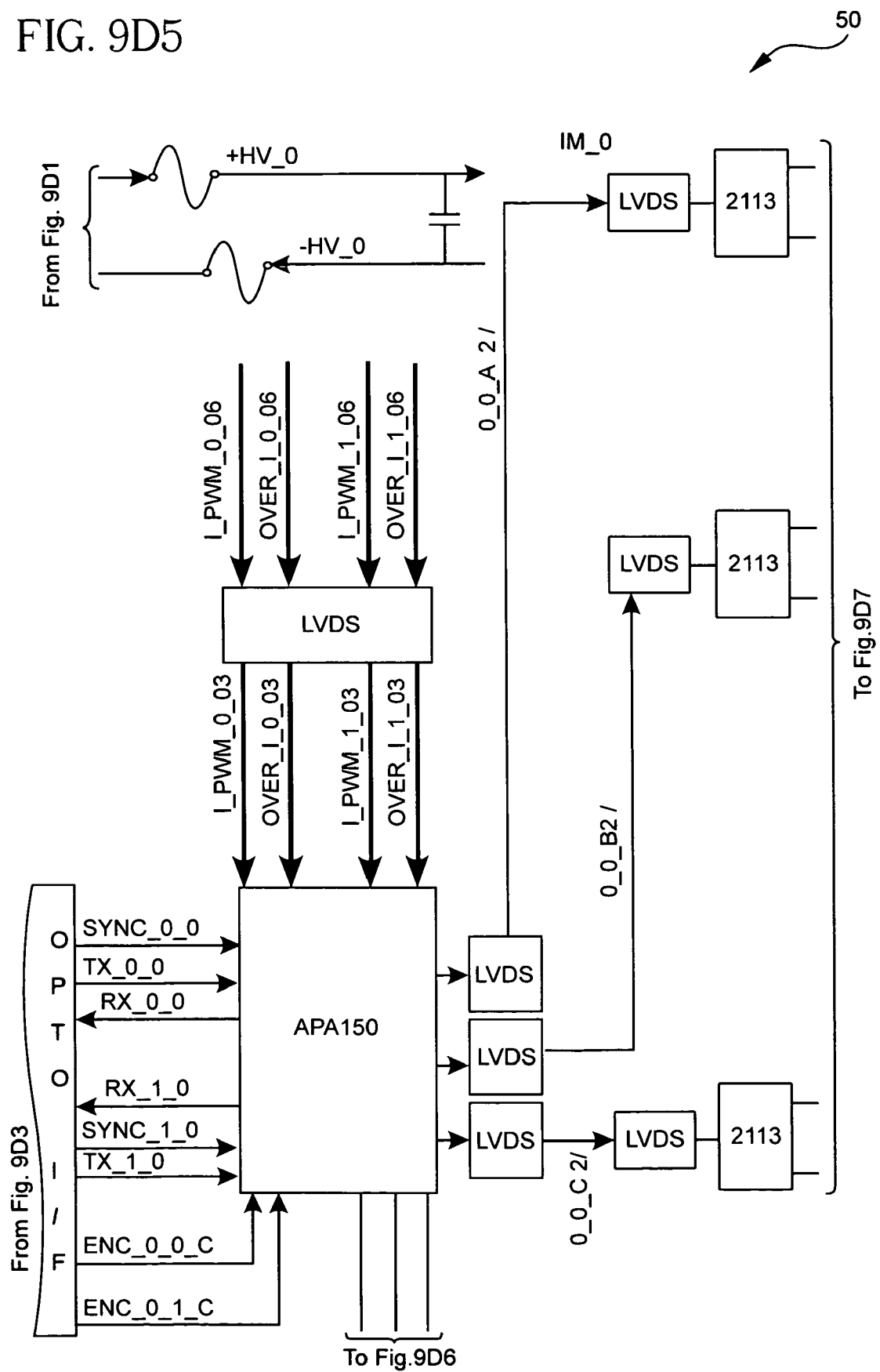

FIG. 9D6
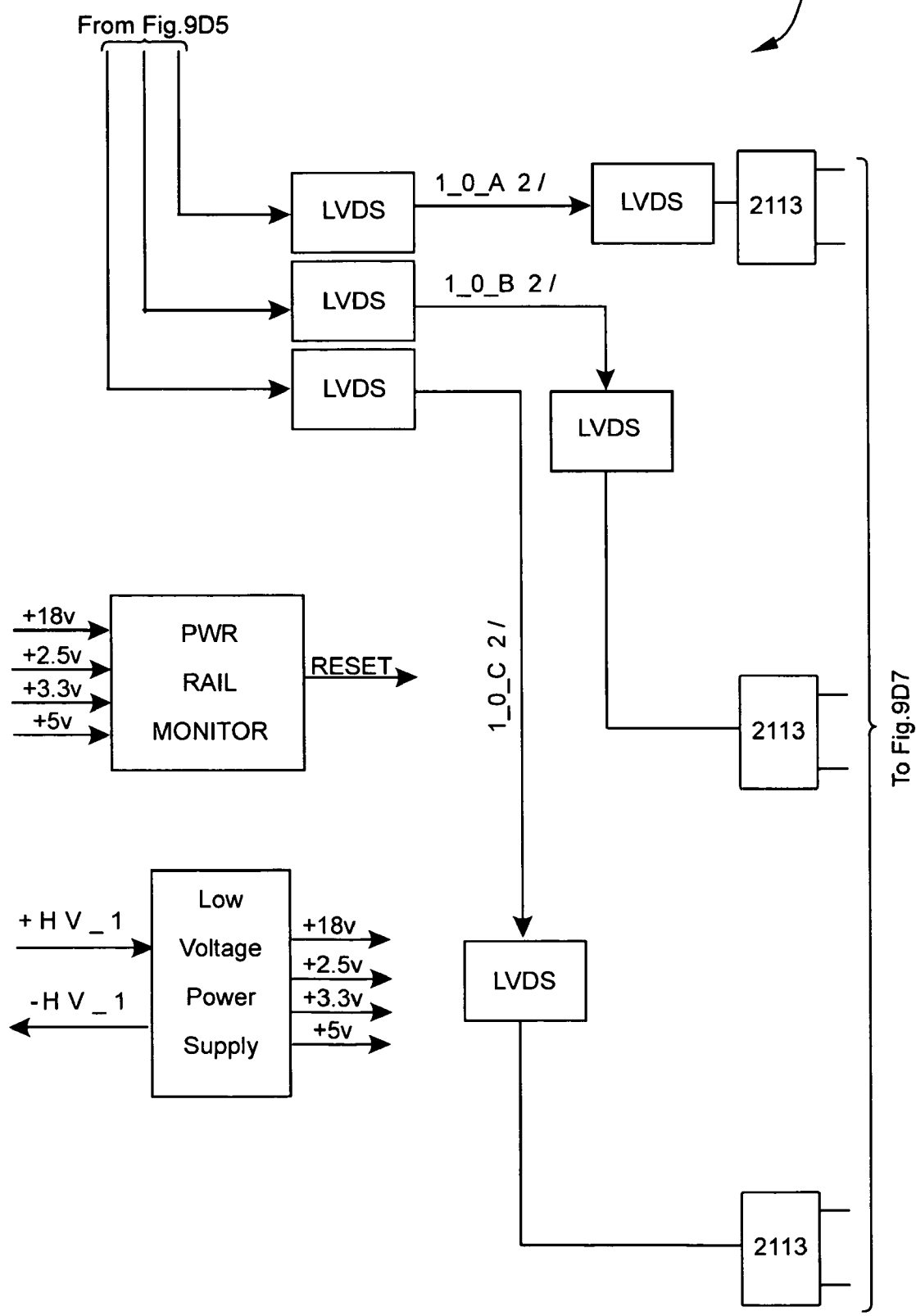

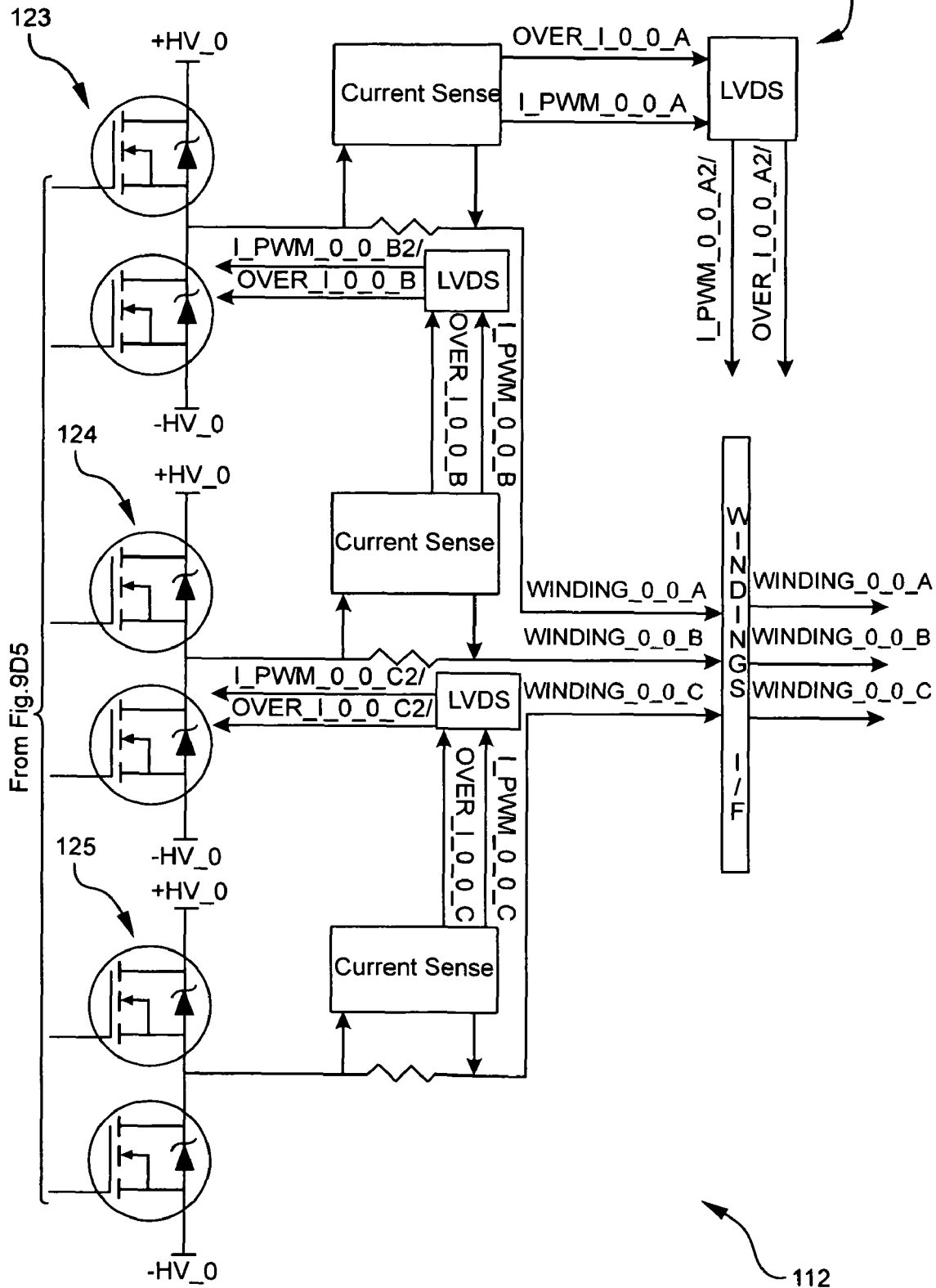
FIG. 9D7

FIG. 9D8
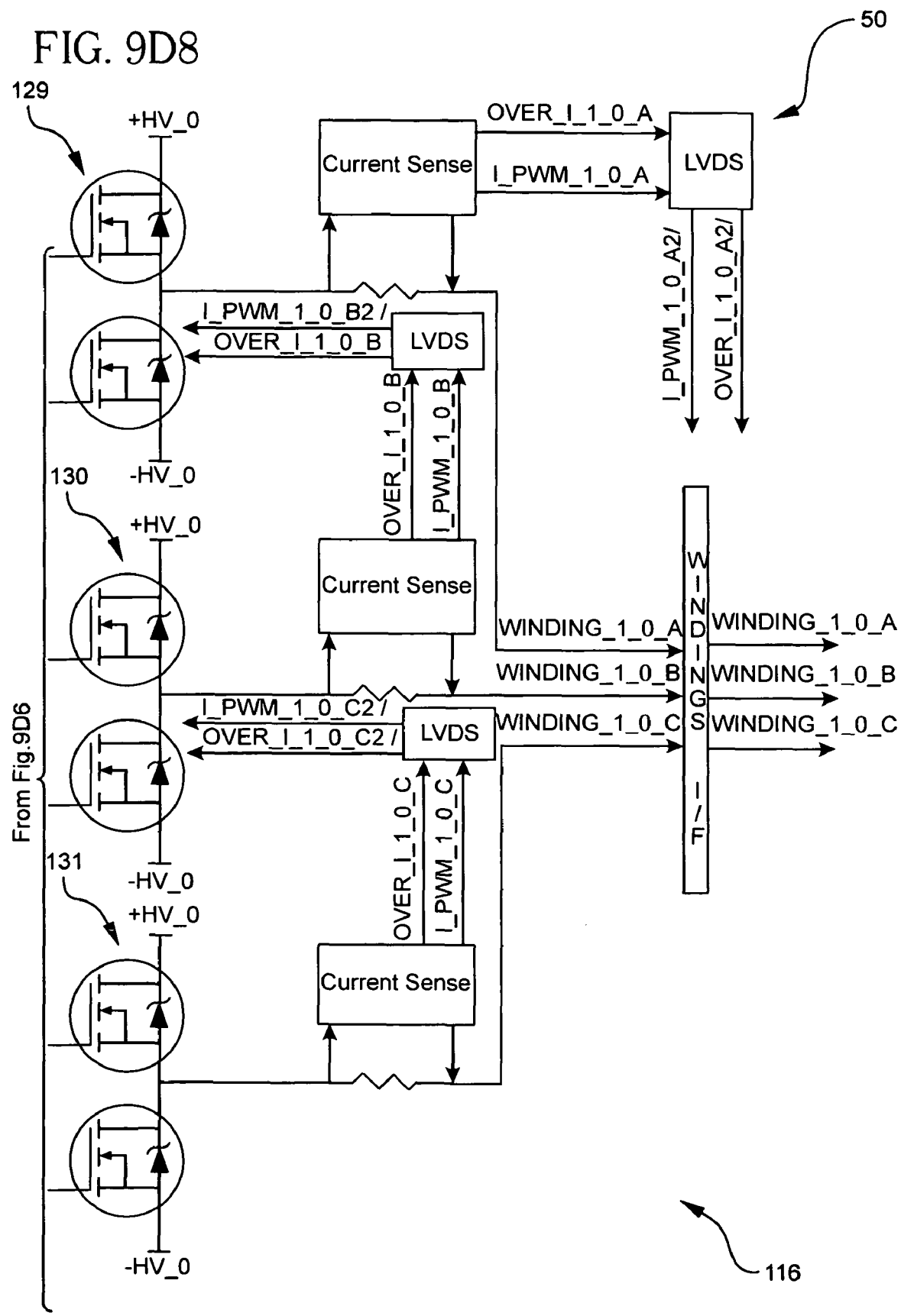

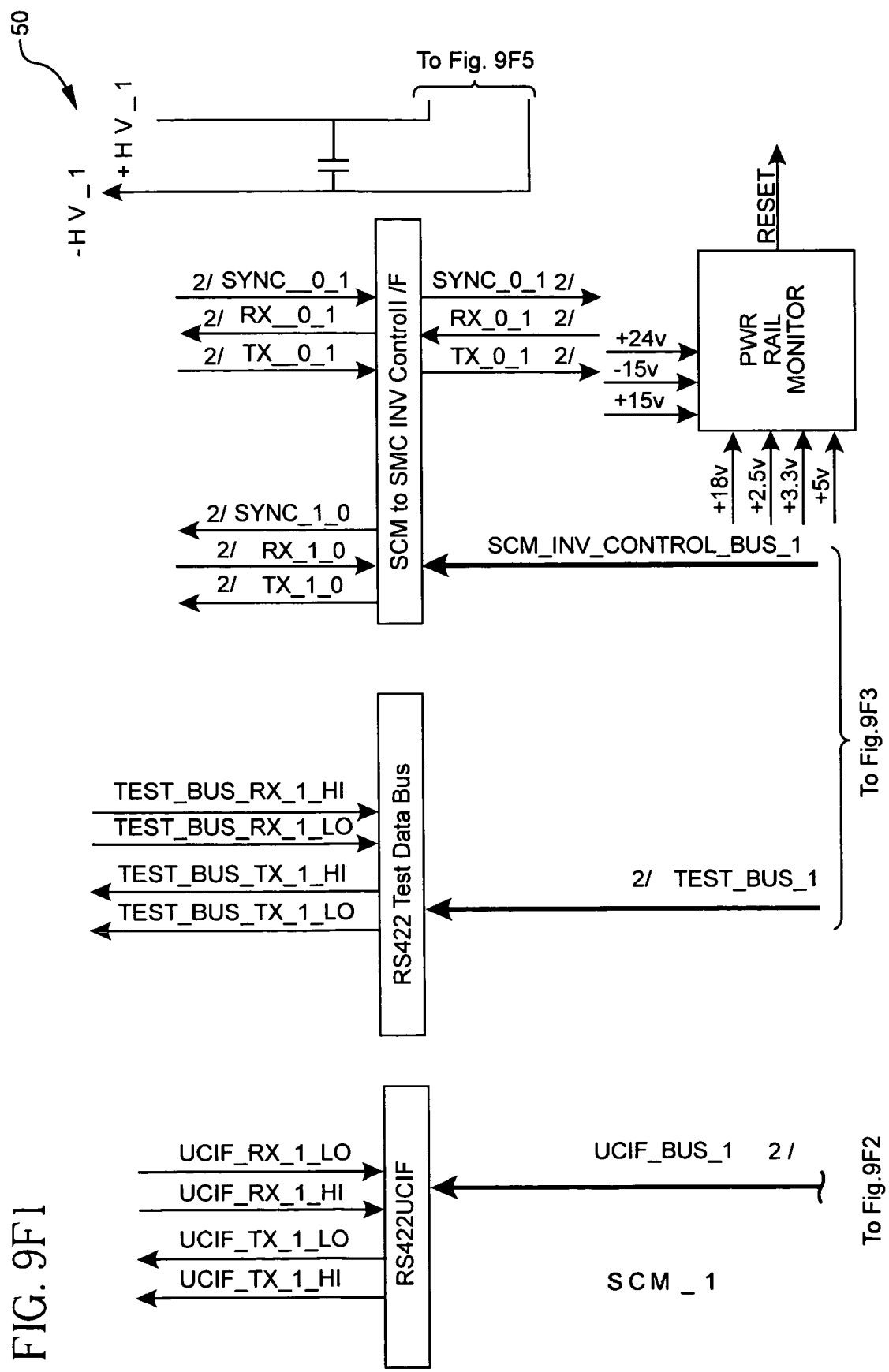
FIG. 9F1

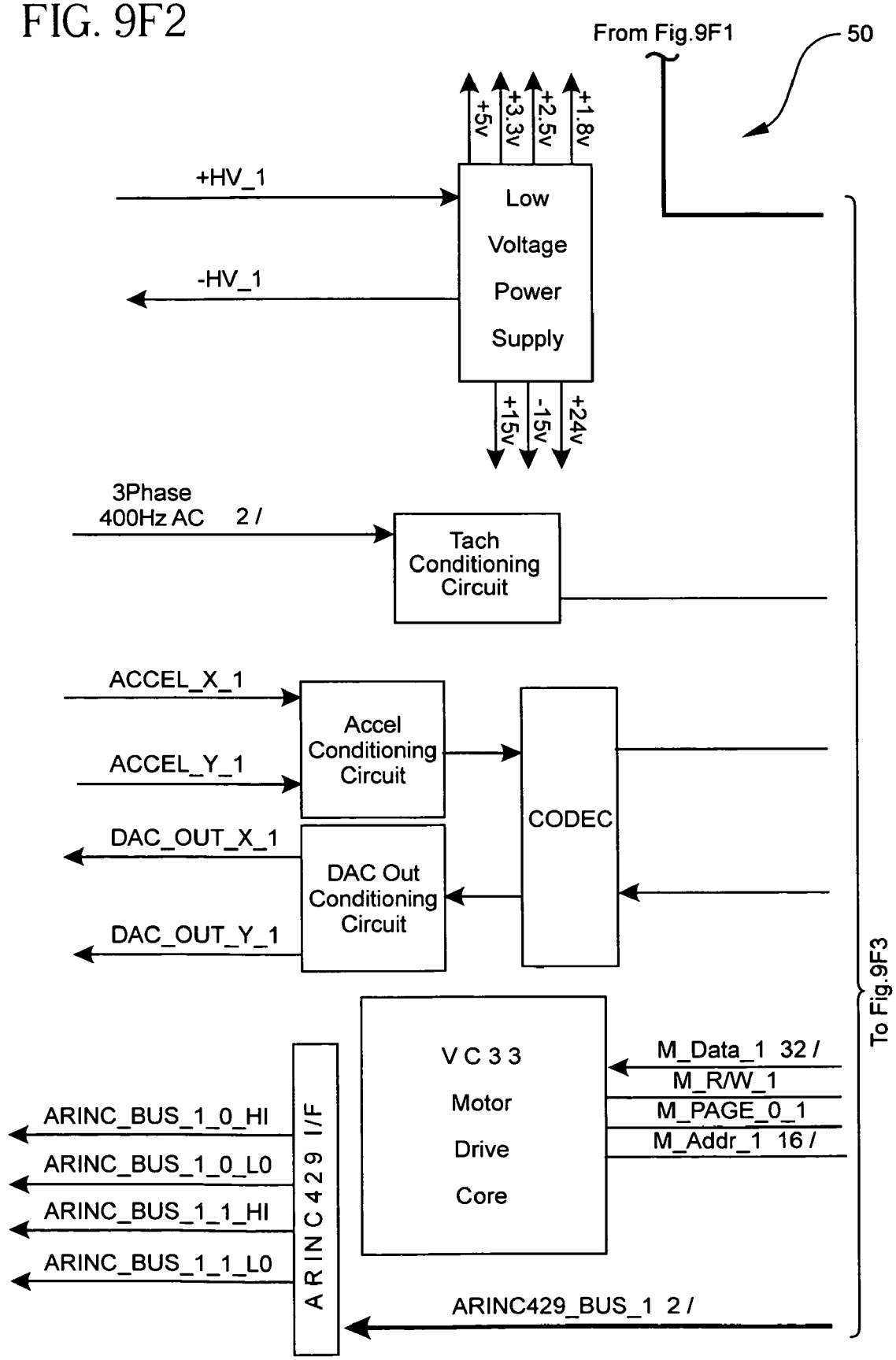
FIG. 9F2

FIG. 9F3
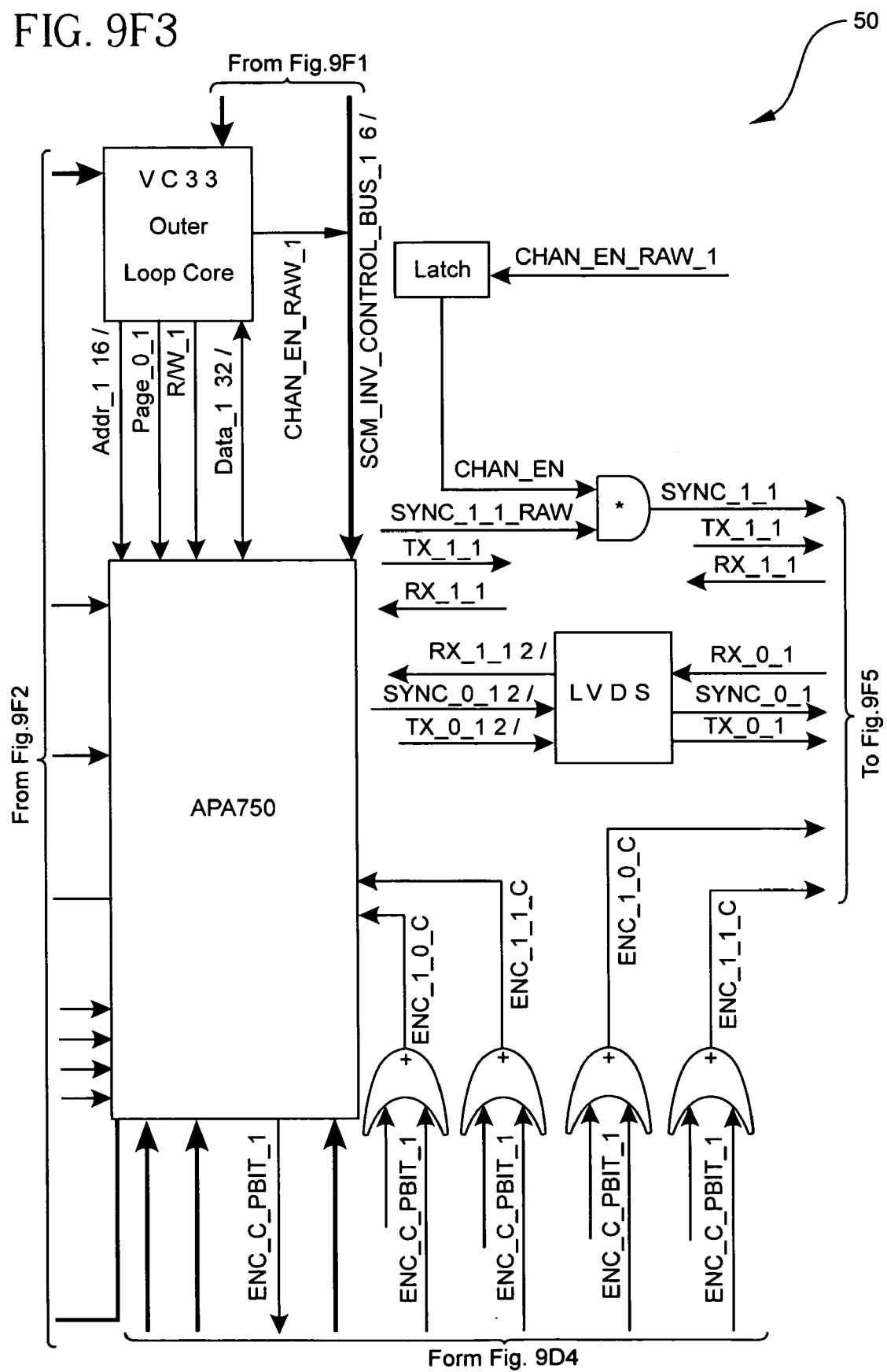

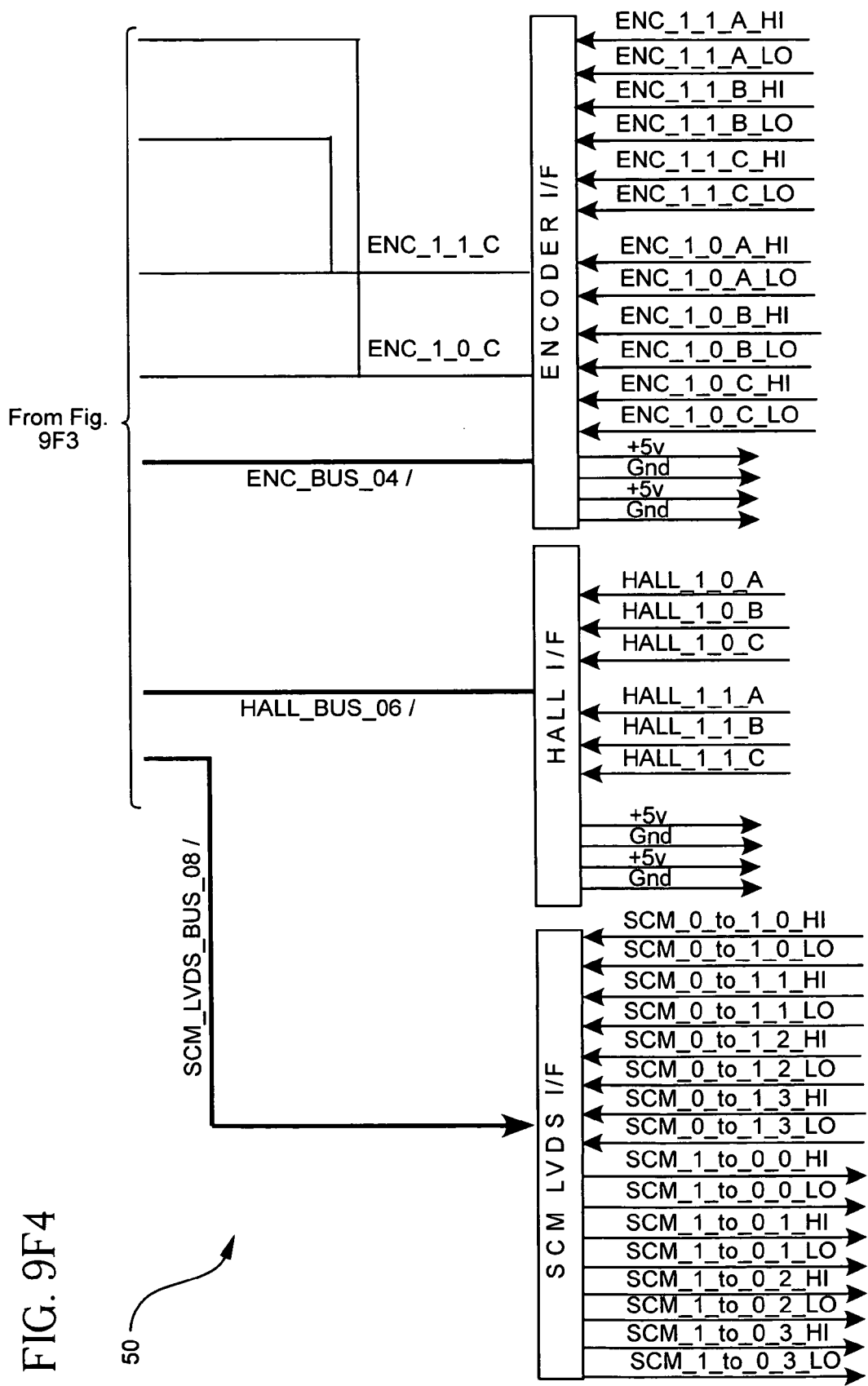

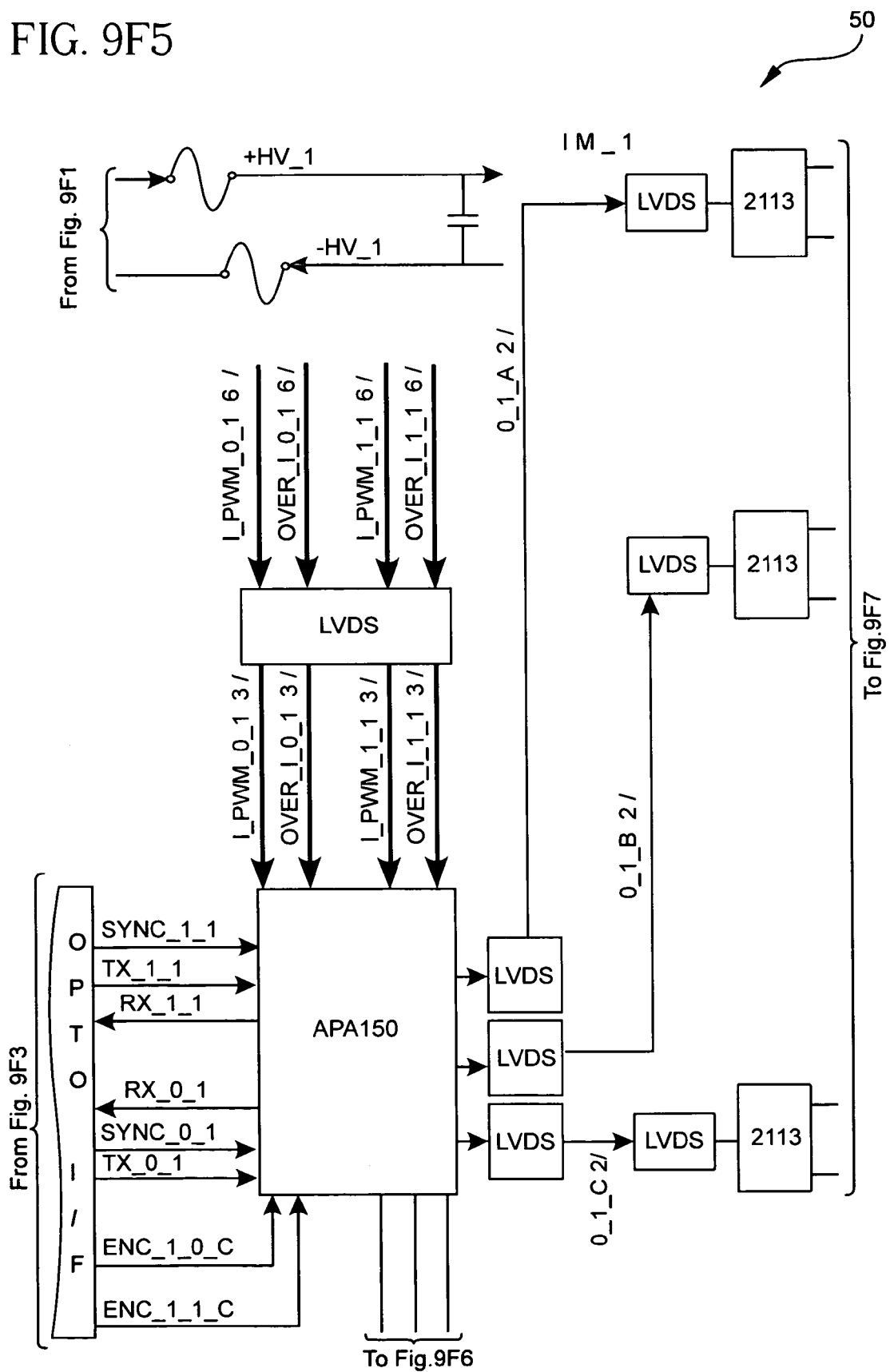
FIG. 9F5

FIG. 9F6
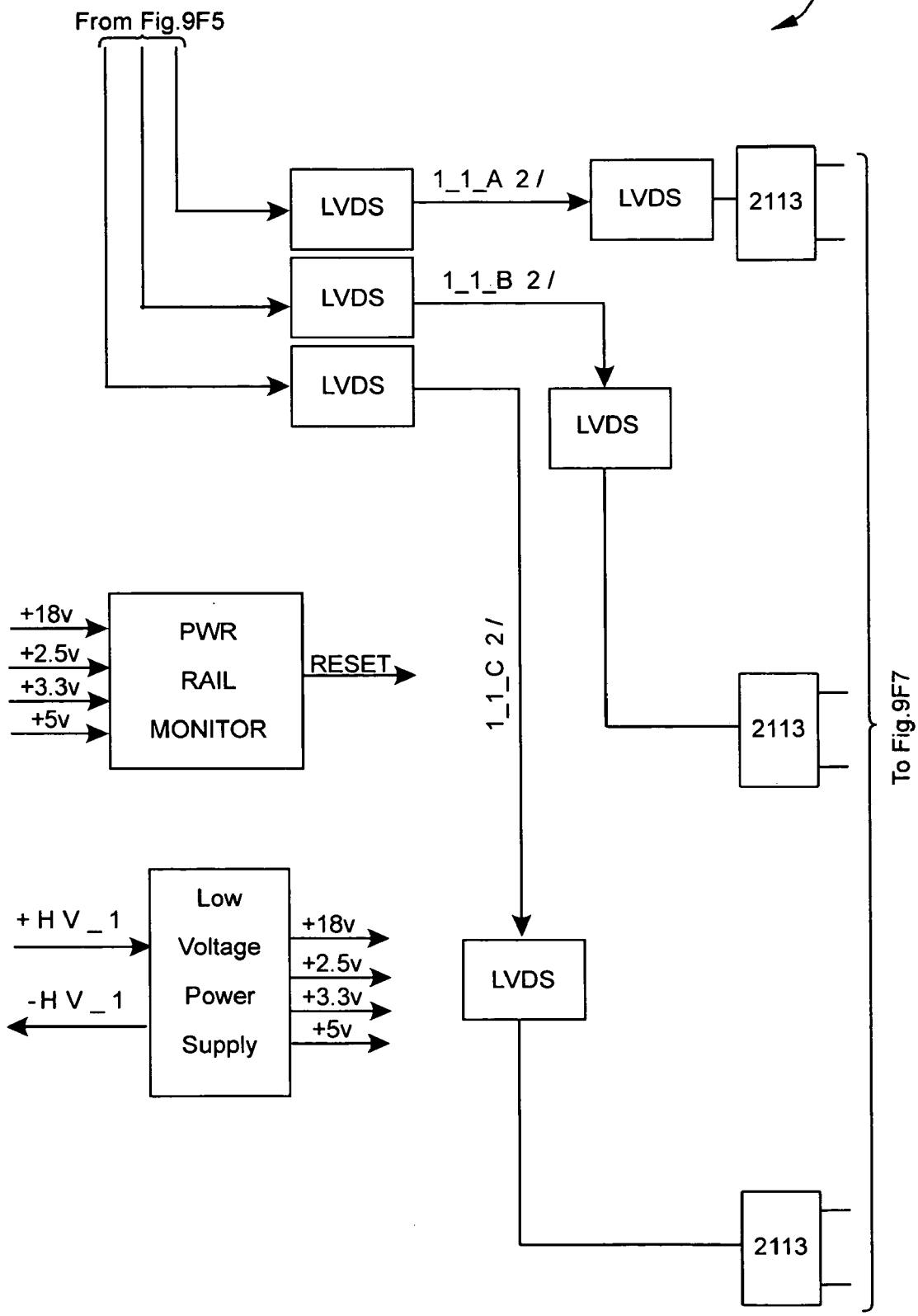

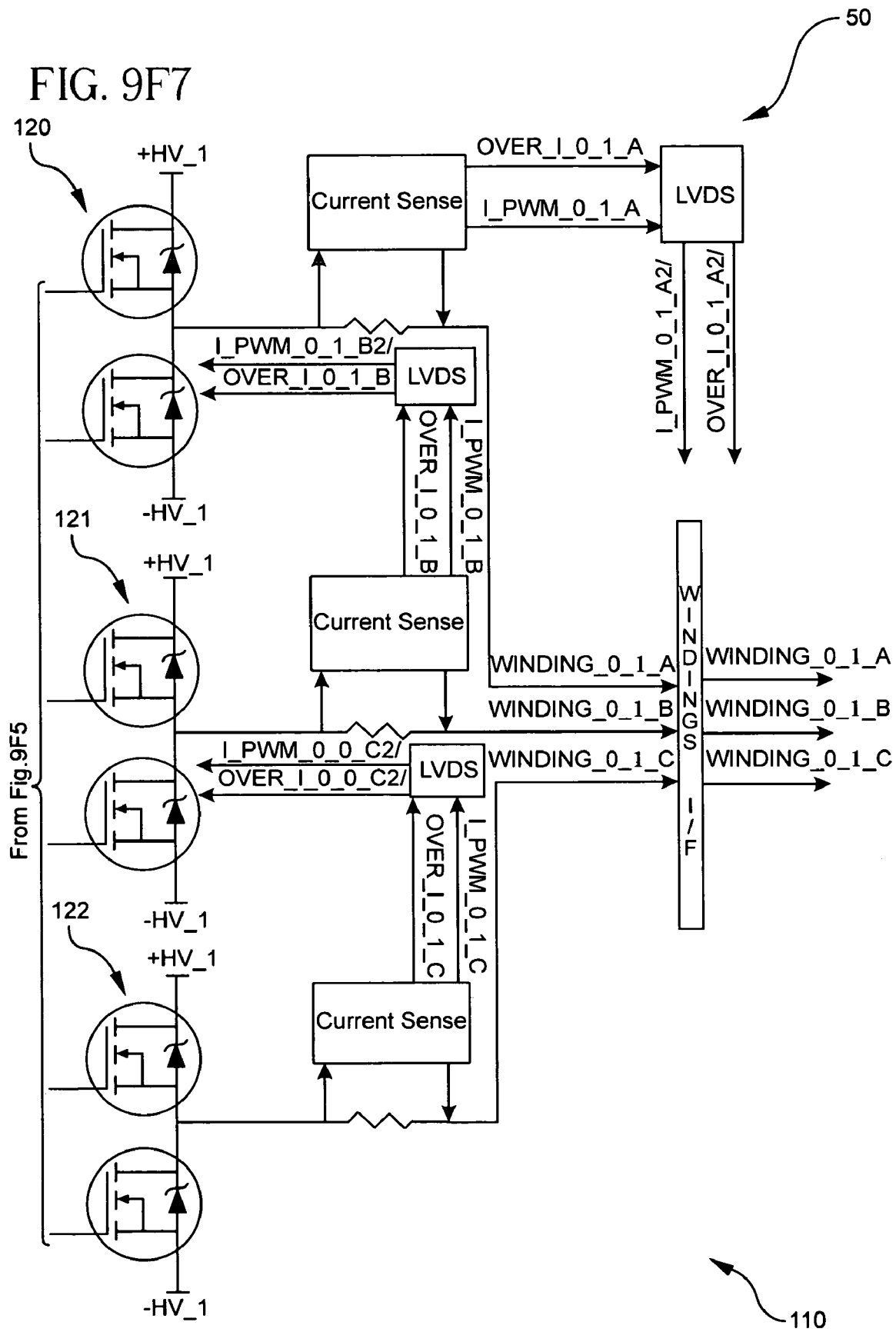
FIG. 9F7

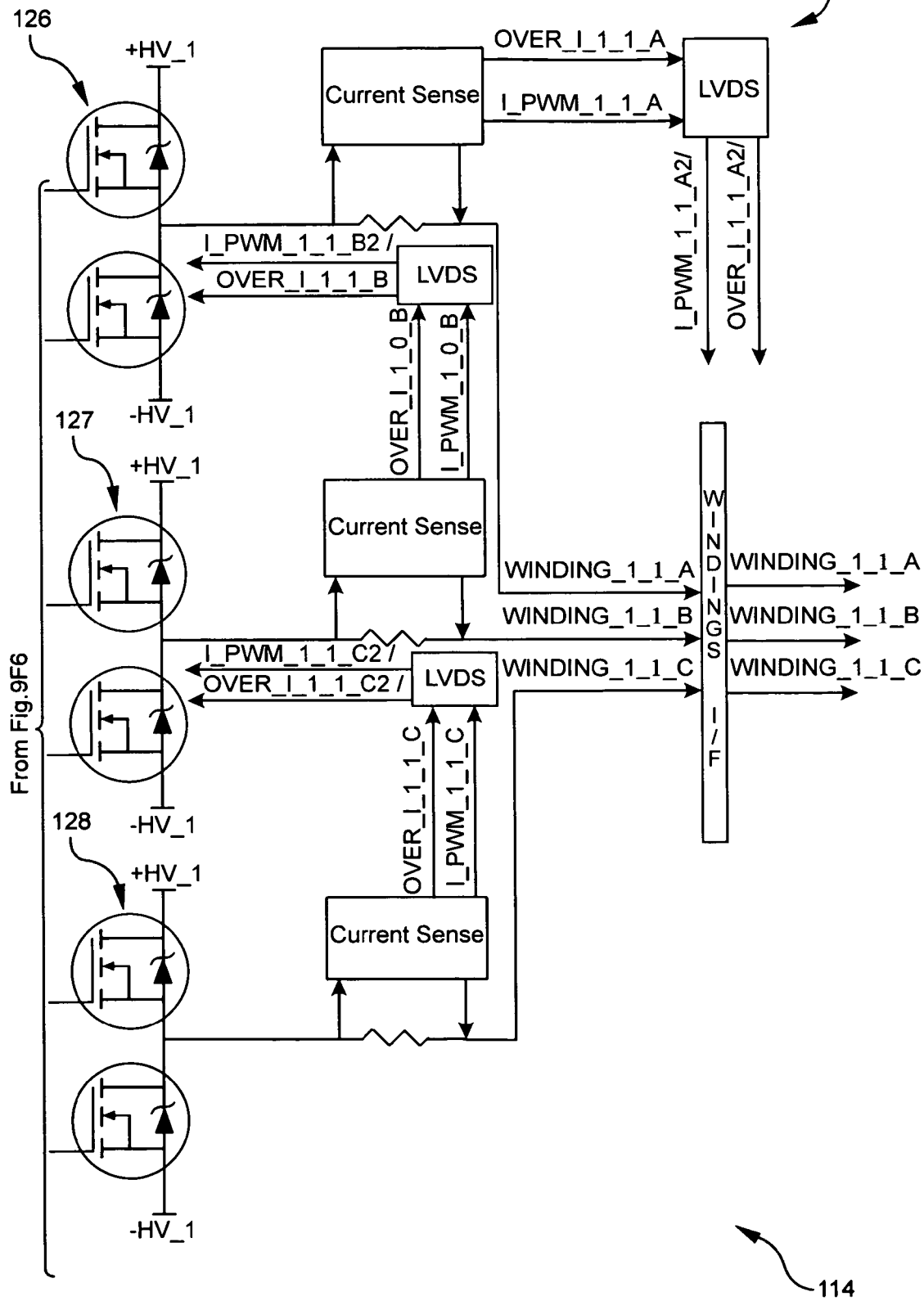
FIG. 9F8

HELICOPTER VIBRATION CONTROL SYSTEM AND ROTARY FORCE GENERATOR FOR CANCELING VIBRATIONS

CROSS REFERENCE

This application is a Continuation of U.S. patent application Ser. No. 11/215,388 filed on Aug. 30, 2005 now U.S. Pat. No. 7,448,854, which claims the benefit of U.S. Provisional Patent Application Ser. No. 60/605,470 filed on Aug. 30, 2004, both of which the benefit of are claimed and are incorporated by reference.

FIELD OF THE INVENTION

The invention relates to a method/system for controlling problematic rotary wing vibrations. More particularly the invention relates to a method and system for controlling helicopter vehicle vibrations, particularly a method and system for canceling problematic rotating helicopter vibrations.

BACKGROUND OF THE INVENTION

Helicopter vibrations are particularly troublesome in that they can cause fatigue and wear on the equipment and occupants in the aircraft. In vehicles such as helicopters, vibrations are particularly problematic in that they can damage the actual structure and components that make up the vehicle in addition to the contents of the vehicle.

There is a need for a system and method of accurately and economically canceling rotating vehicle vibrations. There is a need for a system and method of accurately controlling rotary wing vibrations in a weight efficient manner. There is a need for a method of controlling vibrations in a helicopter hub so that the vibrations are efficiently minimized. There is a need for a robust system of controlling vibrations in a helicopter so that the vibrations are efficiently minimized. There is a need for a method/system for controlling problematic helicopter vibrations.

SUMMARY OF THE INVENTION

In an embodiment the invention includes a rotary wing aircraft helicopter rotating hub mounted vibration control system for a helicopter rotary wing hub having a periodic vibration while rotating at a helicopter operational rotation frequency. The helicopter rotating hub mounted vibration control system includes an annular ring rotary housing attachable to the helicopter rotary wing hub and rotating with the helicopter rotary wing hub at the helicopter operational rotation frequency. The annular ring housing is centered about the rotary wing hub axis of rotation and has an electronics housing cavity subsystem and an adjacent coaxial rotor housing cavity subsystem. The rotor housing cavity subsystem contains a first coaxial frameless AC ring motor having a first rotor with a first imbalance mass and a second coaxial frameless AC ring motor having a second rotor with a second imbalance mass. The electronics housing cavity subsystem contains an electronics control system which receives sensor outputs and electrically controls and drives the first coaxial frameless AC ring motor and the second coaxial frameless AC ring motor such that the first imbalance mass and the second imbalance mass are directly driven at a vibration canceling rotation frequency greater than the helicopter operational rotation frequency wherein the helicopter rotary wing hub periodic vibration is reduced.

In an embodiment the invention includes a rotary wing aircraft helicopter rotating vibration control system for a helicopter rotary wing hub having a periodic vibration while rotating at a helicopter operational rotation frequency about a rotary wing axis of rotation. The helicopter rotating vibration control system includes a rotary housing centered about and encompassing the rotary wing axis of rotation with the rotary housing rotating at the helicopter operational rotation frequency. The rotating rotary housing contains a first coaxial ring motor coaxially centered about the rotary wing axis of rotation. The first coaxial ring motor has a first rotor with a first imbalance mass concentration. The rotating rotary housing contains a second coaxial ring motor coaxially centered about the rotary wing axis of rotation with the second coaxial ring motor having a second rotor with a second imbalance mass concentration. The rotating rotary housing contains an electronics control system which controls a speed and a phase of the first coaxial ring motor and the second coaxial ring motor such that the first imbalance mass concentration and the second imbalance mass concentration are directly driven at a whole number multiple vibration canceling rotation frequency greater than the helicopter operational rotation frequency wherein the helicopter rotary wing hub periodic vibration is reduced.

In an embodiment the invention includes a method of controlling a periodic vibration of a rotary wing aircraft helicopter with a helicopter rotary wing hub, which rotates at an operational rotation frequency. The method includes providing an annular ring housing having an electronics housing cavity subsystem and an adjacent coaxial rotor housing cavity subsystem. The rotor cavity subsystem contains a first coaxial ring motor coaxially centered about the rotary wing hub axis of rotation. The first coaxial ring motor has a first rotor with a first imbalance rotor eccentric mass concentration. The rotor cavity subsystem contains a second coaxial ring motor having a second rotor with a second imbalance rotor eccentric mass concentration, and a lubricant. The electronics housing cavity subsystem contains an electronics control system which controls the speed and phase of the first coaxial ring motor and the second coaxial ring motor. The method includes securing the annular ring housing to the helicopter rotary wing hub with the annular ring housing rotating at the operational rotation frequency. The method includes directly electromagnetically driving the first rotor and the second rotor at a whole number multiple vibration canceling rotation frequency greater than the operational rotation frequency while controlling the rotational phase position of the first imbalance rotor eccentric mass concentration and the second imbalance rotor eccentric mass concentration inorder to produce a rotating net force vector to inhibit and balances out the periodic vibration. The electronic control system processes sensor inputs, determines the orientation and speed of the rotors, and calculates and modifies the speed and orientation of the rotors inorder to cancel and balance out the unwanted vibrations.

In an embodiment the invention includes a method of making a helicopter rotating hub mounted vibration control system for a helicopter rotary wing hub having a periodic vibration while rotating at an operational rotation frequency. The method includes providing a rotary housing having an electronics housing cavity and a rotor housing cavity. The provided rotor housing cavity preferably contains a first coaxial frameless ring driver motor having a first rotor with a first imbalance rotor eccentric mass concentration, a second coaxial frameless ring driver motor having a second rotor with a second imbalance rotor eccentric mass concentration, with the rotor housing cavity including a circumferential surface. The provided electronics housing cavity preferably contains an electronics control system which controls and drives the speed and phase of the first coaxial frameless ring motor and the second coaxial brushless frameless ring motor. The method preferably includes sealing a lubricant inside the rotor housing cavity, wherein the lubricant collects along the circumferential surface when the annular ring housing rotates at the helicopter operational rotation frequency.

In an embodiment the invention includes a vibration control balancer system, which rotates about a center axis of rotation at an operational rotation frequency. The rotating vibration balancer includes a first stator having a plurality of electromagnets with the electromagnets periodically spaced around the center axis of rotation, and a first imbalance rotor having a mass concentration, the first imbalance rotor including magnets periodically spaced around the center axis of rotation with the first imbalance rotor adjacent the first stator. The rotating vibration balancer includes a second stator having a plurality of electromagnets periodically spaced around the center axis of rotation, and a second imbalance rotor having a having a mass concentration and a plurality of magnets periodically spaced around the center axis of rotation, with the second imbalance rotor adjacent the second stator. The first stator electromagnets generate magnetic fields to move and directly drive the first imbalance rotor magnets and the first imbalance rotor eccentric mass concentration around the center axis of rotation at a vibration canceling rotation frequency greater than the operational rotation frequency, and the second stator electromagnets directly drive and move the second imbalance rotor magnets and the second imbalance rotor eccentric mass concentration around the center axis of rotation at the vibration canceling rotation frequency.

In an embodiment the invention includes a method of controlling a periodic vibration of a helicopter with a helicopter rotary wing hub, which rotates about a center axis of rotation at an operational rotation frequency. The method includes providing a first stator having electromagnets periodically spaced around the center axis of rotation, and providing a first imbalance rotor having an eccentric mass concentration and a plurality of magnets periodically spaced around the center axis of rotation. The method includes disposing and coupling the first imbalance rotor around the first stator such that the first stator electromagnets directly drive the first imbalance rotor magnets and the first imbalance rotor eccentric mass concentration around the center axis of rotation. The method includes providing a second stator having a plurality of electromagnets periodically spaced around the center axis of rotation, and providing a second imbalance rotor having an eccentric mass concentration and a plurality of magnets periodically spaced around the center axis of rotation. The method includes disposing and coupling the second imbalance rotor around the second stator such that the second stator electromagnets directly drive the second imbalance rotor magnets and the second imbalance rotor eccentric mass concentration around the center axis of rotation. The method includes directly driving the first rotor and the second rotor at a whole number multiple vibration canceling rotation frequency greater than the operational rotation frequency while controlling the rotational position of the first imbalance rotor eccentric mass concentration and the rotational position of the second imbalance rotor eccentric mass concentration in order to produce a rotating net force vector to inhibit the periodic vibration.

In an embodiment the invention includes a method of making a vibration control device, which rotates about a center axis of rotation at an operational rotation frequency. The method includes providing a rotary housing. The method includes providing a first stator having a plurality of electromagnets periodically spaced around the center axis of rotation, and providing a first imbalance rotor having an eccentric mass concentration and a plurality of magnets periodically spaced around the center axis of rotation. The method includes coupling the first imbalance rotor around first stator such that the first stator electromagnets directly drive the first imbalance rotor magnets and the first imbalance rotor eccentric mass concentration around the center axis of rotation. The method includes providing a second stator having a plurality of electromagnets periodically spaced around the center axis of rotation and a second imbalance rotor having an eccentric mass concentration and a plurality of magnets periodically spaced around the center axis of rotation. The method includes coupling the second imbalance rotor around the second stator such that the second stator electromagnets directly drive the second imbalance rotor magnets and the second imbalance rotor eccentric mass concentration around the center axis of rotation. The method includes sealing the coupled first imbalance rotor and the first stator and the coupled second imbalance rotor and the second stator in the rotary housing with a liquid lubricant.

In an embodiment the invention includes a rotary wing aircraft rotating vibration control system for an aircraft rotary wing hub having a periodic vibration while rotating at a rotary wing aircraft operational rotation frequency about a rotary wing axis of rotation. The rotary wing aircraft rotating vibration control system includes a rotary housing, the housing centered about and encompassing the rotary wing axis of rotation and rotating with the rotary wing hub at the operational rotation frequency, the housing containing a first coaxial ring motor coaxially centered about the rotary wing axis of rotation, the first coaxial ring motor having a first rotor with a first imbalance mass concentration, the housing containing a second coaxial ring motor coaxially centered about the rotary wing axis of rotation, the second coaxial ring motor having a second rotor with a second imbalance mass concentration. The rotary wing aircraft rotating vibration control system includes an electronics control system which controls a speed and a phase of the first coaxial ring motor and a speed and a phase of the second coaxial ring motor to drive the first imbalance mass concentration and the second imbalance mass concentration wherein the rotary wing hub periodic vibration is reduced.

In an embodiment the invention includes a method of controlling a periodic vibration of an aircraft with a rotary hub which rotates at an operational rotation frequency. The method includes providing an annular ring housing having a coaxial rotor housing cavity subsystem, the rotor housing cavity subsystem containing a first coaxial ring motor having a first rotor with a first imbalance mass concentration, a second coaxial ring motor having a second rotor with a second imbalance mass concentration, and a lubricant. The method includes securing the annular ring housing to the rotary hub with the annular ring housing rotating at the operational rotation frequency with the rotary hub. The method includes directly driving the rotation of the first rotor and the second rotor by controlling the first coaxial ring motor and the second coaxial ring motor to control the rotational position of the first imbalance mass concentration and the second imbalance mass concentration inorder to inhibit the periodic vibration.

In an embodiment the invention includes a method of making a rotating hub mounted vibration control system for a rotary wing hub having a periodic vibration while rotating at an operational rotation frequency. The method includes providing a rotary housing having a rotor housing cavity, the rotor housing cavity containing a first coaxial ring motor having a first rotor with a first imbalance mass concentration, a second coaxial ring motor having a second rotor with a second imbalance mass concentration, the rotor housing cavity including a circumferential surface. The method includes providing an electronics control system which controls a speed and a phase of the first coaxial ring motor and a speed and a phase of the second coaxial ring motor. The method includes connecting the electronics control system with the first coaxial ring motor and the second coaxial ring motor. The method includes sealing a lubricant inside the rotor housing cavity, wherein the lubricant collects along the circumferential surface when the rotary housing rotates at the operational rotation frequency.

In an embodiment the invention includes a rotating vibration control system for a rotating machine having an operational rotation frequency which rotates about a center axis of rotation at the operational rotation frequency, the rotating vibration control system comprised of a rotating vibration control system rotary housing, the rotary housing centered about and encompassing the center axis of rotation, the rotary housing rotating about the center axis at the operational rotation frequency. The rotary housing includes a first stator having a plurality of electromagnets, the electromagnets periodically spaced around the center axis of rotation, a first imbalance rotor having a mass concentration, the first imbalance rotor including a plurality of magnets periodically spaced around the center axis of rotation, the first imbalance rotor adjacent the first stator, a second stator having a plurality of electromagnets, the electromagnets periodically spaced around the center axis of rotation, a second imbalance rotor having a mass concentration, the second imbalance rotor including a plurality of magnets periodically spaced around the center axis of rotation, the second imbalance rotor adjacent the second stator, wherein the first stator electromagnets directly drive the first imbalance rotor magnets and the first imbalance rotor mass concentration around the center axis of rotation at a first imbalance rotor controlled speed and phase, and the second stator electromagnets directly drive the second imbalance rotor magnets and the second imbalance rotor mass concentration around the center axis of rotation at a second imbalance rotor controlled speed and phase. The rotating vibration control system includes an electronics control system which controls a speed and a phase of the first rotor and the second rotor.

In an embodiment the invention includes a method of controlling a periodic vibration of an aircraft with a rotary wing hub which rotates about a rotary wing hub center axis of rotation at an operational rotation frequency. The method includes providing a first stator having a plurality of electromagnets, the electromagnets periodically spaced around the rotary wing hub center axis of rotation. The method includes providing a first imbalance rotor, the first imbalance rotor having an eccentric mass concentration, the first imbalance rotor including a plurality of magnets periodically spaced around the rotary wing hub center axis of rotation. The method includes disposing and coupling the first imbalance rotor around the first stator such that the first stator electromagnets directly drive the first imbalance rotor magnets and the first imbalance rotor eccentric mass concentration around the rotary wing hub center axis of rotation. The method includes providing a second stator having a plurality of electromagnets, the electromagnets periodically spaced around the rotary wing hub center axis of rotation. The method includes providing a second imbalance rotor, the second imbalance rotor having an eccentric mass concentration, the second imbalance rotor including a plurality of magnets periodically spaced around the rotary wing hub center axis of rotation. The method includes disposing and coupling the second imbalance rotor around the second stator such that the second stator electromagnets directly drive the second imbalance rotor magnets and the second imbalance rotor eccentric mass concentration around the rotary wing hub center axis of rotation. The method includes directly driving the first rotor at a first rotor controlling rotation frequency greater than the operational rotation frequency around the rotary wing hub center axis of rotation and directly driving the second rotor at a second rotor controlling rotation frequency greater than the operational rotation frequency around the rotary wing hub center axis of rotation while controlling a rotational position of the first imbalance rotor eccentric mass concentration around the rotary wing hub center axis of rotation and a rotational position of the second imbalance rotor eccentric mass concentration around the rotary wing hub center axis of rotation inorder to inhibit the periodic vibration.

In an embodiment the invention includes a rotating vibration control system which rotates about a center axis of rotation at an operational rotation frequency, the rotating vibration control system for balancing out a periodic vibration force. The rotating vibration control system includes a first motor having a plurality of electromagnets, the electromagnets periodically spaced around the center axis of rotation. The rotating vibration control system includes a first imbalance rotor having a mass concentration, the first imbalance rotor including a plurality of magnets periodically spaced around the center axis of rotation, the first imbalance rotor and the first motor centered about the axis of rotation, the first imbalance rotor driven by the first motor around the center axis of rotation at a vibration controlling rotation frequency greater than the operational rotation frequency. The rotating vibration control system includes a second imbalance rotor, the second imbalance rotor having a mass concentration, the second imbalance rotor centered about the axis of rotation wherein the second imbalance rotor mass concentration is movable relative to the first imbalance rotor mass concentration inorder to produce a rotating balancing net force to cancel out the periodic vibration force.

In an embodiment the invention includes a method of making a rotating vibration control device which rotates about a center axis of rotation at an operational rotation frequency. The method includes providing a rotary housing. The method includes providing a first stator having a plurality of electromagnets, the electromagnets periodically spaced around the center axis of rotation. The method includes providing a first imbalance rotor, the first imbalance rotor having an eccentric mass concentration, the first imbalance rotor including a plurality of magnets periodically spaced around the center axis of rotation. The method includes coupling the first imbalance rotor around first stator such that the first stator electromagnets directly drive the first imbalance rotor magnets and the first imbalance rotor eccentric mass concentration around the center axis of rotation. The method includes providing a second stator having a plurality of electromagnets, the electromagnets periodically spaced around the center axis of rotation. The method includes providing a second imbalance rotor, the second imbalance rotor having an eccentric mass concentration, the second imbalance rotor including a plurality of magnets periodically spaced around the center axis of rotation. The method includes coupling the second imbalance rotor around the second stator such that the second stator electromagnets directly drive the second imbalance rotor magnets and the second imbalance rotor eccentric mass concentration around the center axis of rotation. The method includes sealing the coupled first imbalance rotor and the first stator and the coupled second imbalance rotor and the second stator in the housing.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principals and operation of the invention.

BRIEF DESCRIPTION OF THE DRAWINGS

FIG. 2A-B show helicopter rotating hub mounted vibration control systems.

FIG. 9A-H show helicopter rotating hub mounted vibration control methods/systems.

DETAILED DESCRIPTION OF THE PREFERRED EMBODIMENTS

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes a rotary wing aircraft helicopter rotating hub mounted vibration balancing control system. The helicopter rotating hub mounted vibration control system includes an annular ring rotary housing for attachment with the helicopter with the housing rotating at the helicopter operational rotation frequency. The annular ring rotary housing is centered about the rotary wing hub axis of rotation. The housing preferably includes an electronics housing cavity and a rotor housing cavity. The rotor housing cavity contains a first coaxial frameless AC ring motor having a first rotor with a first imbalance rotor eccentric mass concentration and a second coaxial frameless AC ring motor having a second rotor with a second imbalance rotor eccentric mass concentration. The electronics housing cavity contains a electronics control system which controls the position and motion of the first coaxial frameless AC ring motor and the second coaxial frameless AC ring motor such that the first imbalance rotor eccentric mass concentration and the second imbalance rotor eccentric mass concentration are directly driven at a vibration canceling rotation frequency greater than the helicopter operational rotation frequency wherein the helicopter rotary wing hub periodic vibration is reduced. Preferably the annular ring rotary housing is centered about the rotary wing hub axis of rotation, with both the electronics housing cavity and the rotor housing cavity subsystems encompassing the helicopter rotary wing hub axis of rotation. Preferably the annular ring rotary housing, preferably with both the electronics housing cavity and the rotor housing cavity subsystems, encompasses the helicopter rotor shaft.

Figure 1A:
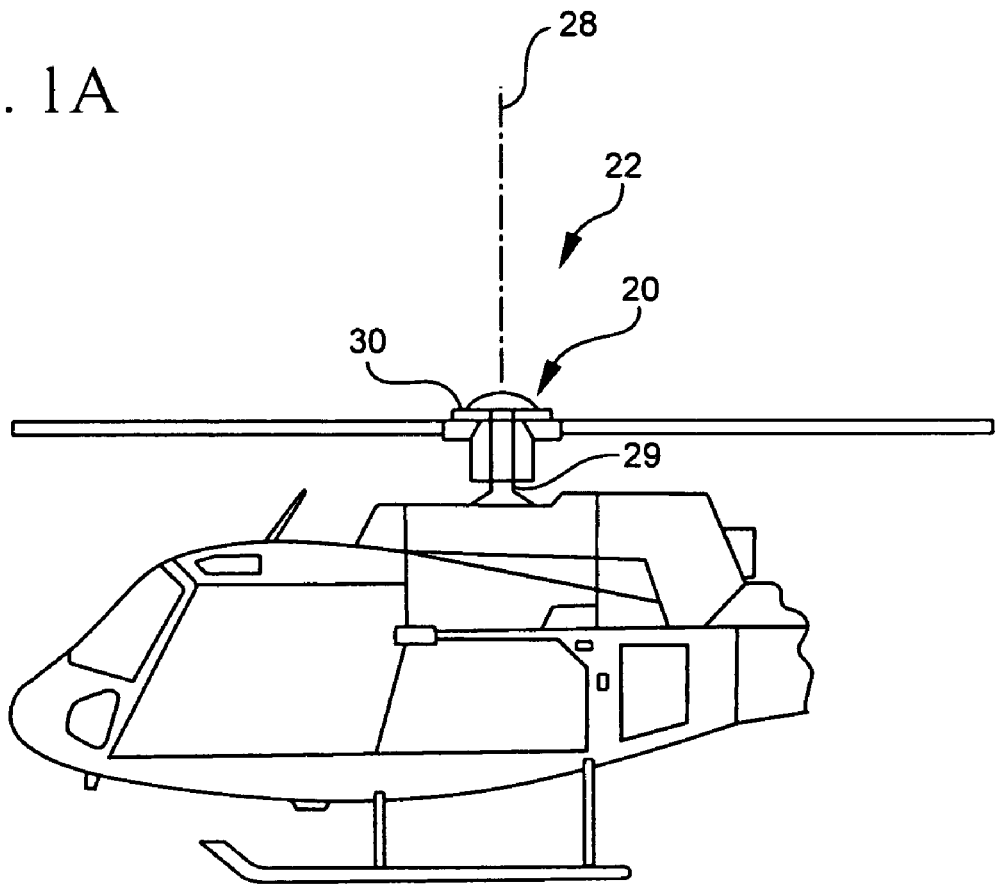
FIG. 1A-B show methods/systems for controlling helicopter vibrations.
Figure 1B:
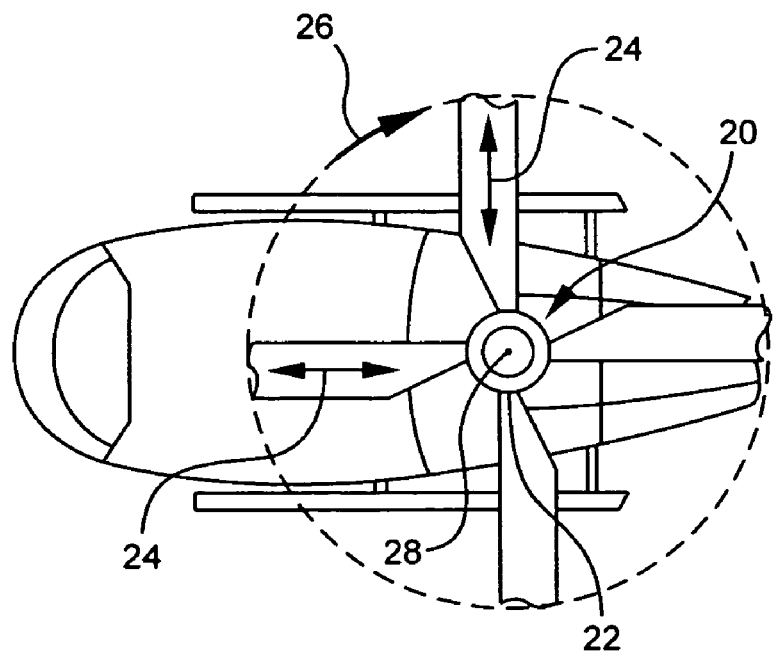
Figure 2B:
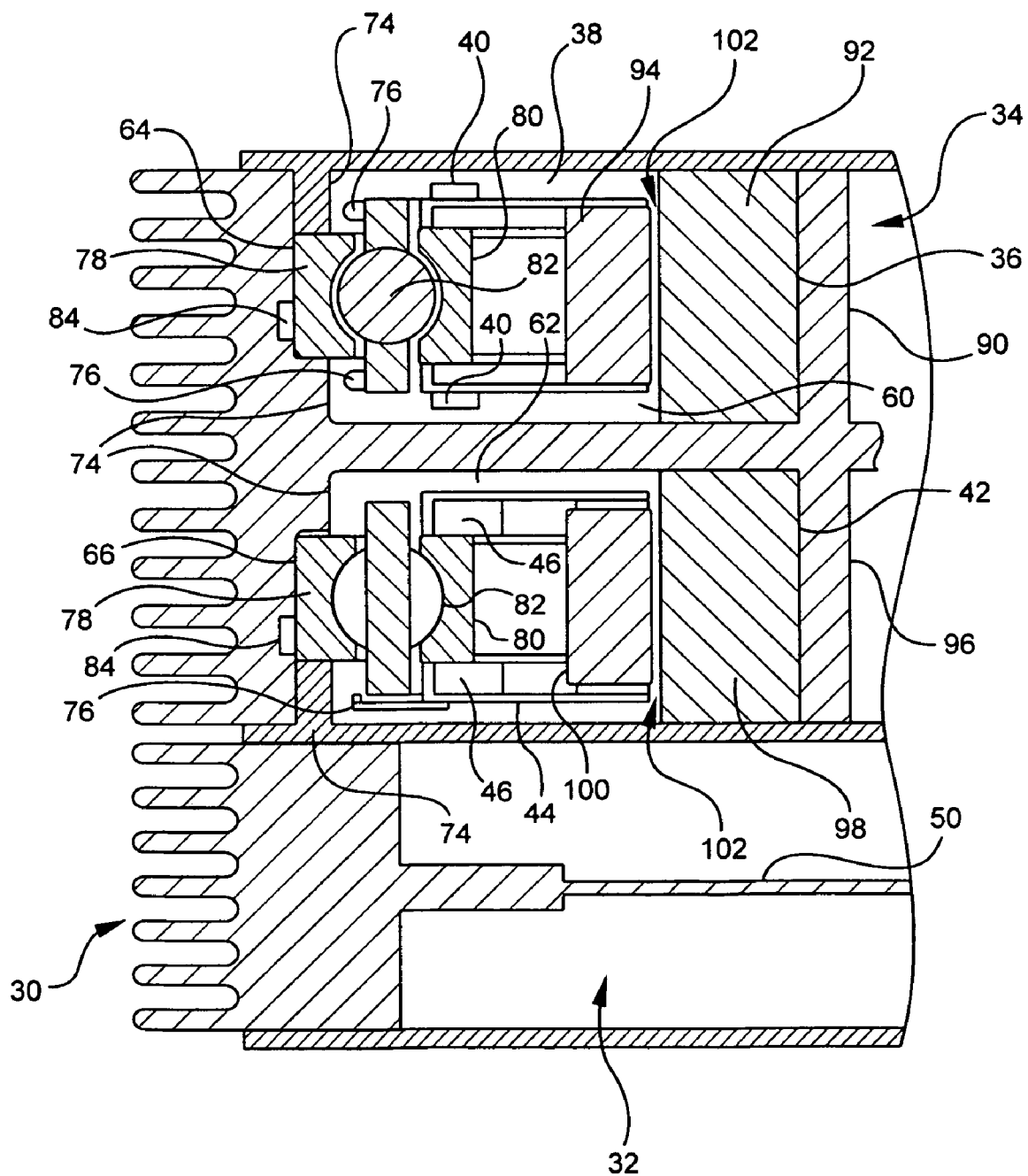
Figure 3A:
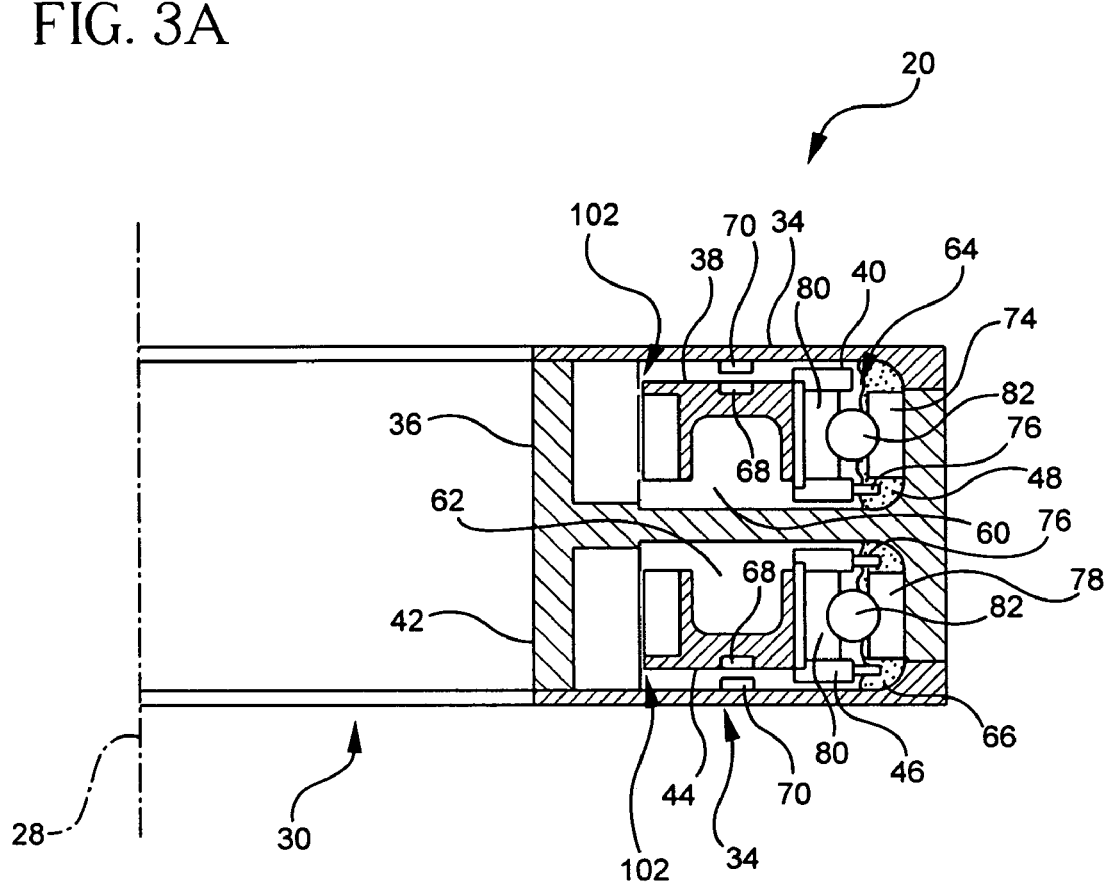
FIG. 3A-D show helicopter rotating hub mounted vibration control systems.
Figure 3B:
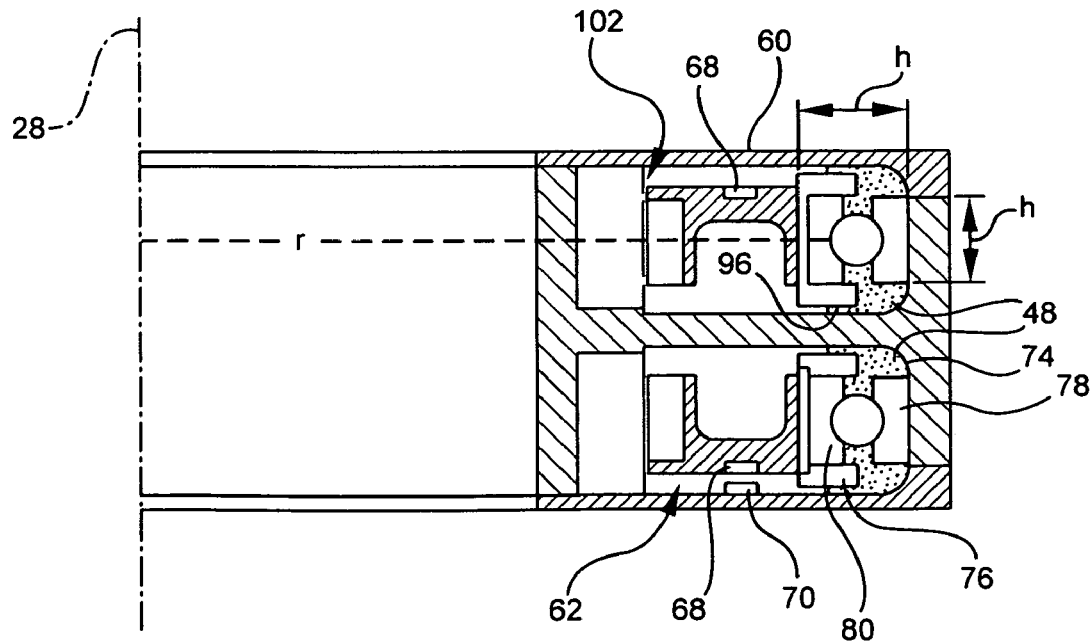
Figure 3C:
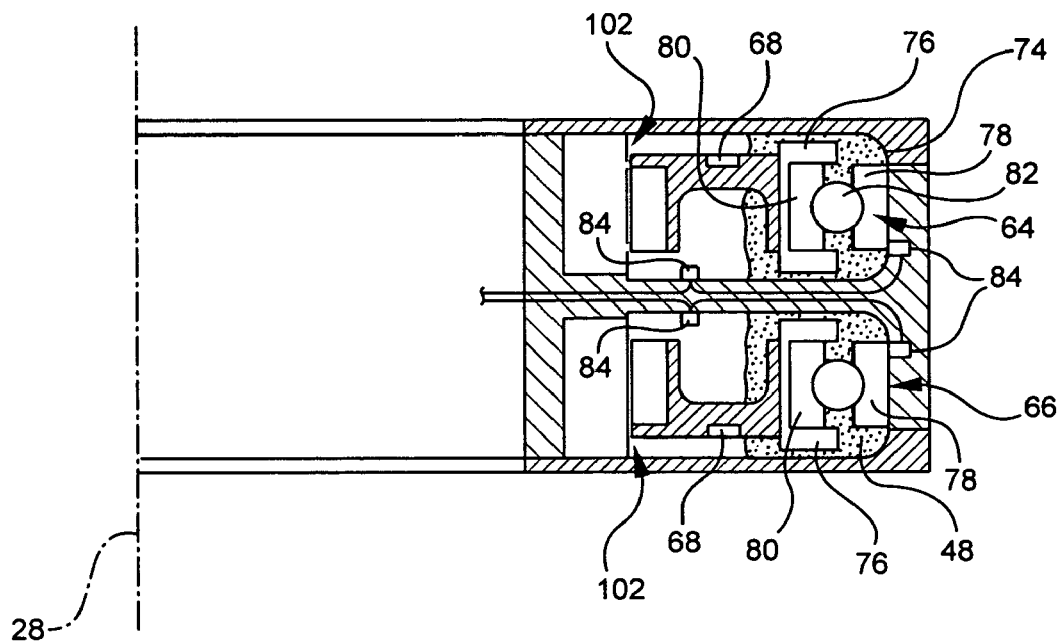
Figure 3D:
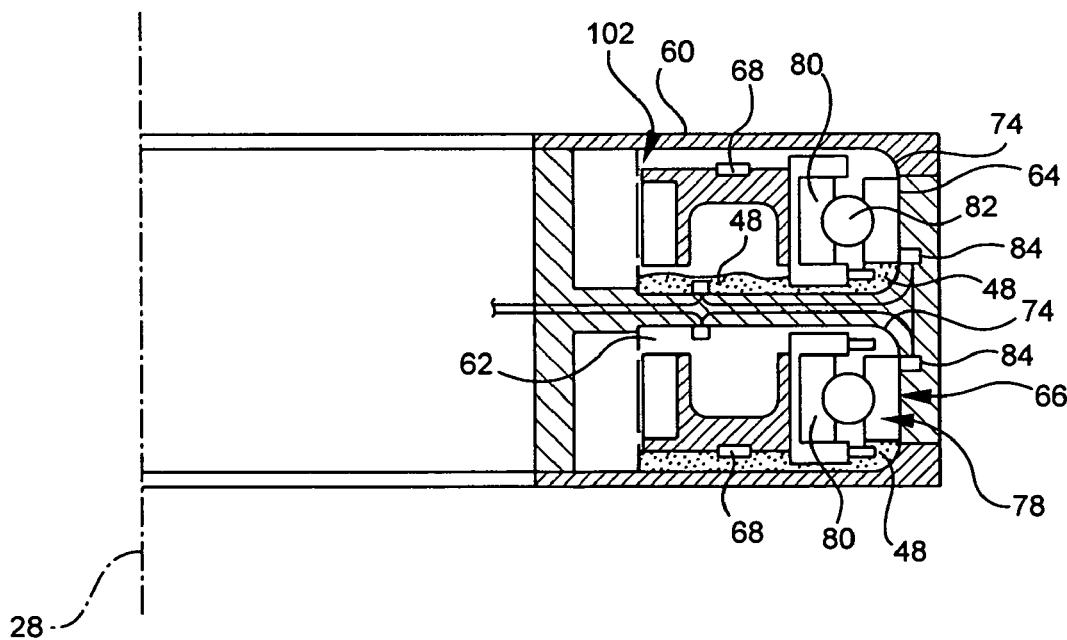
Figure 6:
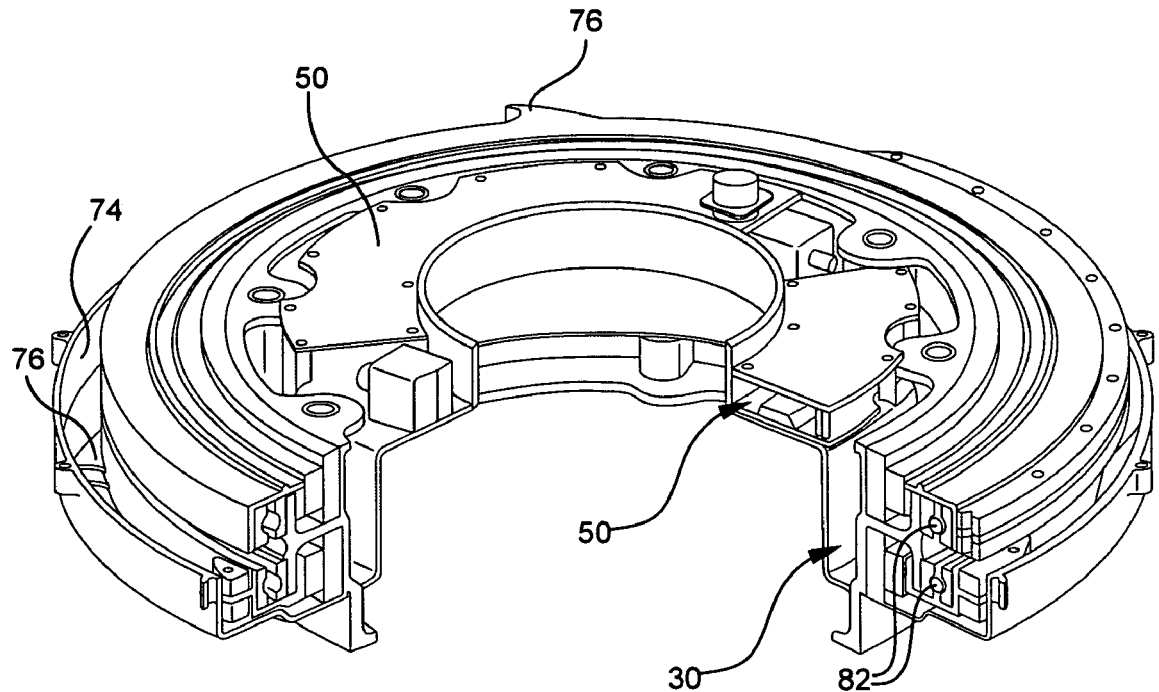
FIG. 6 shows a helicopter rotating hub mounted vibration control systems.
Figure 7:
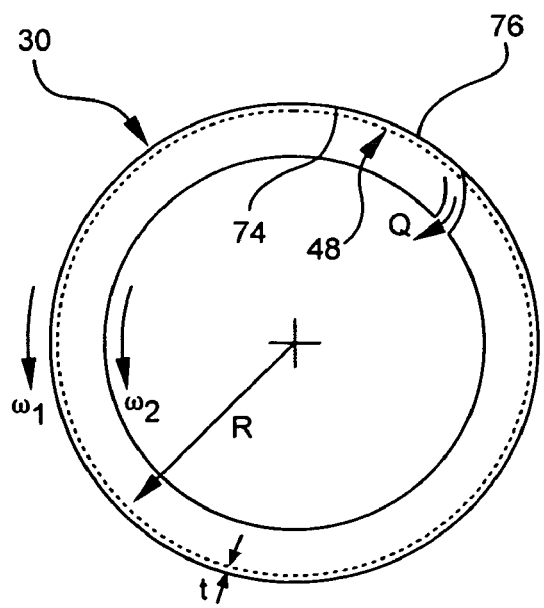
FIG. 7 shows a method/system for controlling helicopter vibrations.

FIG. 1 shows a rotary wing aircraft helicopter rotating hub mounted vibration control system 20 for a helicopter rotary wing hub 22 having a periodic vibration 24 while rotating at a helicopter operational rotation frequency 26. As shown in FIG. 2 helicopter rotating hub mounted vibration control system 20 includes an annular ring rotary housing 30. The annular ring rotary housing 30 is attached to the helicopter rotary wing hub 22 and rotates with the helicopter rotary wing hub 22 and rotor shaft 29 at the helicopter operational rotation frequency 26. The annular ring housing has an electronics housing cavity subsystem 32 and a rotor housing cavity subsystem 34. Preferably the housing 30 is centered about the rotary wing hub axis of rotation 28 with both the electronics housing cavity subsystem and the rotor housing cavity subsystem encompassing the helicopter rotary wing hub axis of rotation 28. The rotor housing cavity subsystem 34 contains a first coaxial brushless frameless AC ring motor 36 coaxially centered about the rotary wing hub axis of rotation 28 and having a first imbalance rotor 38 with a first imbalance rotor eccentric mass concentration 40. The rotor housing cavity subsystem 34 contains a second coaxial frameless AC ring motor 42 coaxially centered about the rotary wing hub axis of rotation 28 having a second rotor 44 with a second imbalance rotor eccentric mass concentration 46. Such as shown in FIG. 3, preferably the rotor housing cavity subsystem 34 contains a lubricant 48, preferably a liquid fluid lubricant. The electronics housing cavity subsystem 32 contains a electronics control system 50 which measures the periodic vibration 24 and controls the speed, relative phase and absolute phase of the first coaxial brushless frameless AC ring motor 36 and the second coaxial brushless frameless AC ring motor 42 such that the first imbalance rotor and eccentric mass concentration 40 and the second imbalance rotor and eccentric mass concentration 46 are directly driven at a whole number multiple vibration canceling rotation frequency 52 greater than the helicopter operational rotation frequency 26 wherein the helicopter rotary wing hub periodic vibration 24 is reduced. In a preferred embodiment the housing 30 is spinning at 1 per rev with the helicopter rotary wing hub 22 and the imbalance rotor eccentric mass concentrations 40 and 46 spinning at N per rev, with the motors 36, 42 directly driving the imbalance rotors 38 and 44 at (N-1) per rev relative to the housing 30 and in the same rotation direction as the housing. This preferred embodiment N=4 is particularly applicable to four bladed helicopters. As shown in FIG. 4, the first motor 36 produces a first rotating force 54 $\{F_1 = mr\, w_1^2$, where mr is the first rotor imbalance and $w_1$ is the first rotor spinning speed$\}$ and the second motor 42 produces a second rotating force 56 which combine to produce a rotating net force vector 58 to cancel the periodic vibration force 24. In preferred embodiments the rotor housing cavity subsystem 34 is comprised of a first rotor upper cavity 60 and a second rotor lower cavity 62, with the upper and lower rotor cavity 60 and 62 separated so that particle contaminates and spall debris from one rotor does not contaminate other rotor, preferably with the upper and lower liquid lubricated cavities 60 and 62 liquidly isolated from each other. Preferably the first coaxial frameless AC ring motor first rotor 38 has a lubricated bearing 64 for supporting the first rotor relative to the housing 30, the first rotor bearing 64 lubricated by a liquid lubricant 48, and the second coaxial frameless AC ring motor second rotor 44 has a lubricated bearing 66 for supporting the second rotor relative to the housing 30, with the second rotor bearing 66 lubricated by a lubricant 48. Preferably the bearings 64 and 66 are thin section bearings with the thickness, height, width of the bearing (h) much less than the radius of bearing r, h<<r. The first coaxial brushless frameless AC ring motor first rotor 38 has at least one target 68 and the second coaxial frameless AC ring motor second rotor 44 has at least one target 68, and the rotor cavity subsystem contains at least one target sensing read head 70 per rotor that senses the rotor targets 68, with the sensor targets and read heads providing for sensing the rotational position and movement of the rotors 38 and 44, preferably with each rotor having a plurality of targets, preferably a plurality of multi-pole magnetic targets. Preferably the targets 68 and the sensor read heads 70 are lubricant resistant and tolerate and operate in the liquid lubricant environment of the rotor housing cavity subsystem 34. In embodiments the sensor read heads 70 are chosen from the sensor group consisting of variable reluctance sensors, resolvers, encoders, and magnetic sensors that sense the separate target magnets 68 of the rotors and tolerate the bearing lubricant environment inside the rotor housing cavity subsystem 34, and have sensing operation that is lubricant resistant to the liquid oil splashing environment. In a preferred embodiment the sensor read heads 70 are Hall effect magnetic sensors for sensing rotor target magnets, with the Hall effect sensor positioned proximate the rotor and adapted to generate an output signal from the passing of the magnet with the Hall effect sensor output received by the electronic control system. The target sensing read heads 70 transmit and communicate with the electronics control system so the electronics control system tracks and has information on the angular position of the rotors 38 and 44, particularly the orientation rotors and the rotational angular position of the imbalance rotor eccentric mass concentrations 40 and 46. The rotational positions sensed by the target sensing read heads 70 is used to drive the rotors with the motors and as feedback for the motor's amplifiers, and also is used to position the imbalance concentrations 40 and 46 relative to the problematic rotor vibration as sensed by the accelerometers of the electronics control system. The sensed rotor position is fed back to the motor amplifiers inorder to commutate the motor and to control further driving of the rotor. Preferably at least two vibration sensor accelerometers 72 are utilized by the electronics control system to sense the vibration 24, and most preferably four orthogonally positioned vibration sensor accelerometers 72 are spaced around the axis of rotation 28 and sense the problematic periodic vibration 24, preferably with the vibration sensor accelerometers providing for an X and Y coordinate system description of the sensed vibration 24 (ACCEL X, ACCEL Y). Preferably the electronics control system receives input from the helicopter regarding the operation of the helicopter, preferably including a helicopter tachometer input with a signal synchronized with the rotation speed helicopter operational rotation frequency 26 of the helicopter rotary wing hub 22, and provides the electronics control system with the speed of rotor blades and a reference point for the phase of the helicopter rotary wing hub 22, such as a three phase 400 Hz AC signal into a Tach Conditioning Circuit. The electronics control system drives the imbalance rotors 38 and 44 at the N per rev vibration canceling rotation frequency 52, and positions the rotors eccentric masses 40 and 46 at relative rotational phases so the vibration 24 sensed by the accelerometers 72 is minimal, with rotors phase and speed controlled to produce the net sum vibration canceling force 58 to counteract the problem vibration 24, preferably using a gradient decent algorithm method. Preferably the electronics control system accelerometers 72 sense the problem vibration 24, and the imbalance rotors 38 and 44 rotational phase positions are controlled with each rotor producing a rotating force vector which add up to the net disturbance force vector 58 with a direction and magnitude that counteract the problem vibration 24 and minimizes the vibration sensed by the accelerometers 72. The electronic control system processor receives sensor outputs to determine the orientation and angular positions of the rotors relative to the problematic vibrations and calculates and modifies the movement of the rotors with generated magnetic fields inorder to change the amount of vibration sensed by the accelerometers. Preferably the rotor housing cavity 34 includes a circumferential surface 74 that constrains the liquid lubricant 48 while the housing 30 is rotating at the helicopter operational rotation frequency 26. With the rotation of the vibration control system housing 30 the liquid lubricant collects against the wall surface 74. Preferably the imbalance rotors include at least one lubricant mover 76 that disturbs the lubricant 48 collecting at the wall surface 74 inorder to circulate the lubricant for the bearings 64 and 66. The lubricant mover 76 may include the bearing and rotor members moving through the lubricant such that the liquid lubricant is moved and preferably circulated through and around the bearings 64 and 66. Preferably the lubricant movers 76 radially extend out from the imbalance rotors 38 and 44 rotors towards the circumferential surface 74 and with the lubricant movers 76 moving and disturbing the constrained liquid lubricant 48. As shown in FIG. 6-7, in an embodiment the lubricant movers 76 are radially extending scoops that scoop and direct the liquid lubricant towards the bearing. Preferably the lubricant movers 76 direct the lubricant 48 inward towards axis of rotation 28, with the lubricant circulating and moving through the bearings 64 and 66. Preferably the first rotor lubricated bearing 64 includes an outer race 78 secured to the housing 30 proximate the rotor housing cavity circumferential surface 74 and an inner race 80 secured to the first rotor 38, with the ball bearing moving rolling members 82 allowing the imbalance rotor 38 with inner race 80 to spin faster than housing 30 with outer race 78. Preferably the second rotor lubricated bearing 66 includes an outer race 78 secured to the housing 30 proximate the rotor housing cavity circumferential surface 74 and an inner race 80 secured to the second imbalance rotor 44, with the ball bearing moving rolling members 82 allowing the second imbalance rotor 44 with inner race 80 to spin faster than housing 30 with outer race 78. Preferably the bearing moving rolling members 82 are lubricated in the liquid lubricant 48 constrained against circumferential surface 74, most preferably bathed and submersed in the lubricant. In an embodiment the first and second rotor cavities are substantially completely filled with the liquid lubricant 48. In a preferred embodiment the first and second rotor cavities are partially filled with liquid lubricant 48, preferably such that when housing 30 rotates at helicopter operational rotation frequency 26 the lubricated bearings are lubricated by the liquid lubricant 48 but the rotors are not submerged in the liquid, preferably with the rotors rotating through a non-liquid gas. Preferably the liquid lubricant 48 is sealed inside the rotor housing cavity 34. In a preferred embodiment the electronics housing cavity subsystem 32 is fluidly isolated from rotor cavity subsystem 34, with the lubricant only in rotor cavities 60 and 62.

Figure 4A:
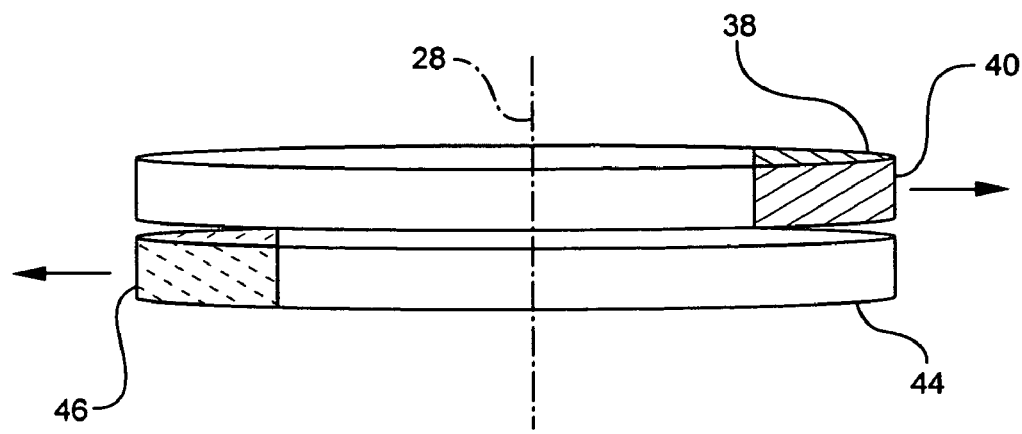
FIG. 4A-F show methods/systems for controlling helicopter vibrations.
Figure 4B:
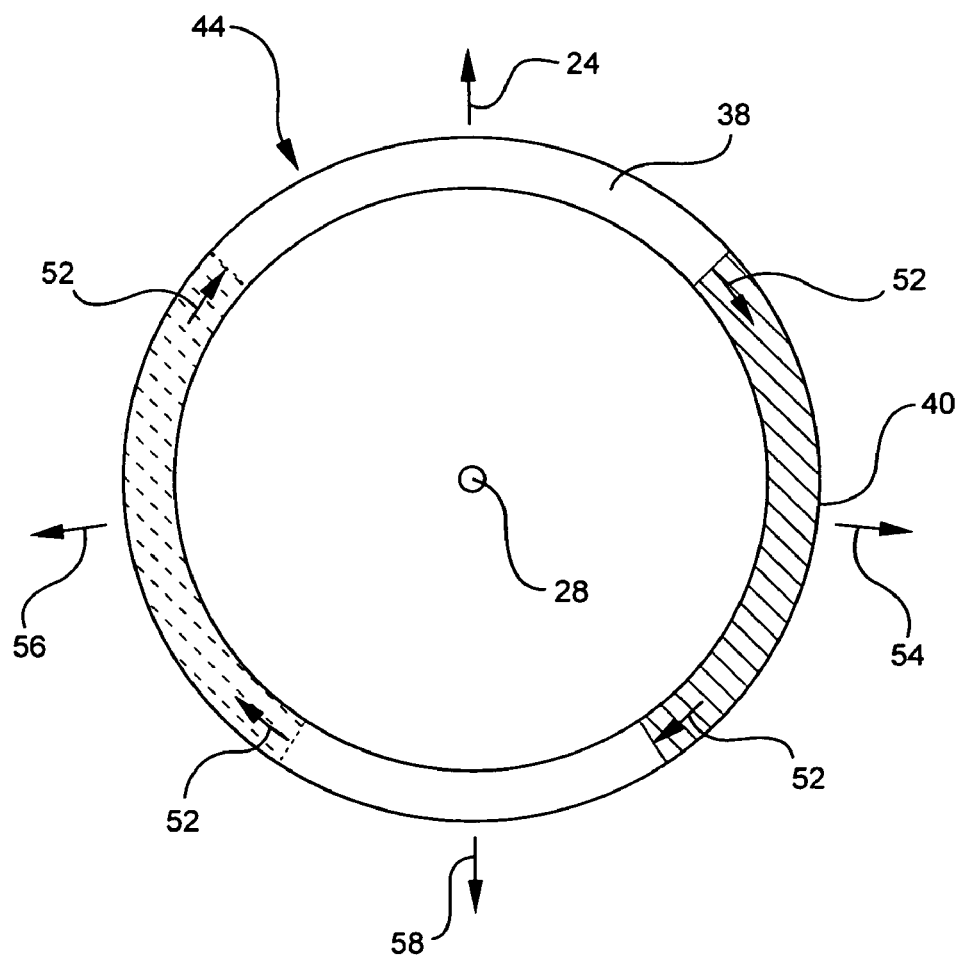
Figure 4C:
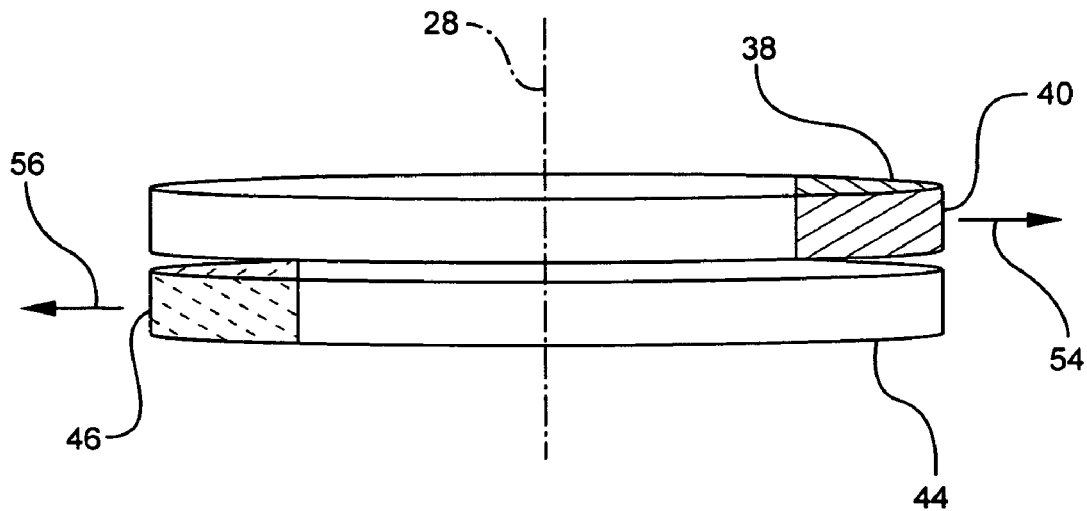
Figure 4D:
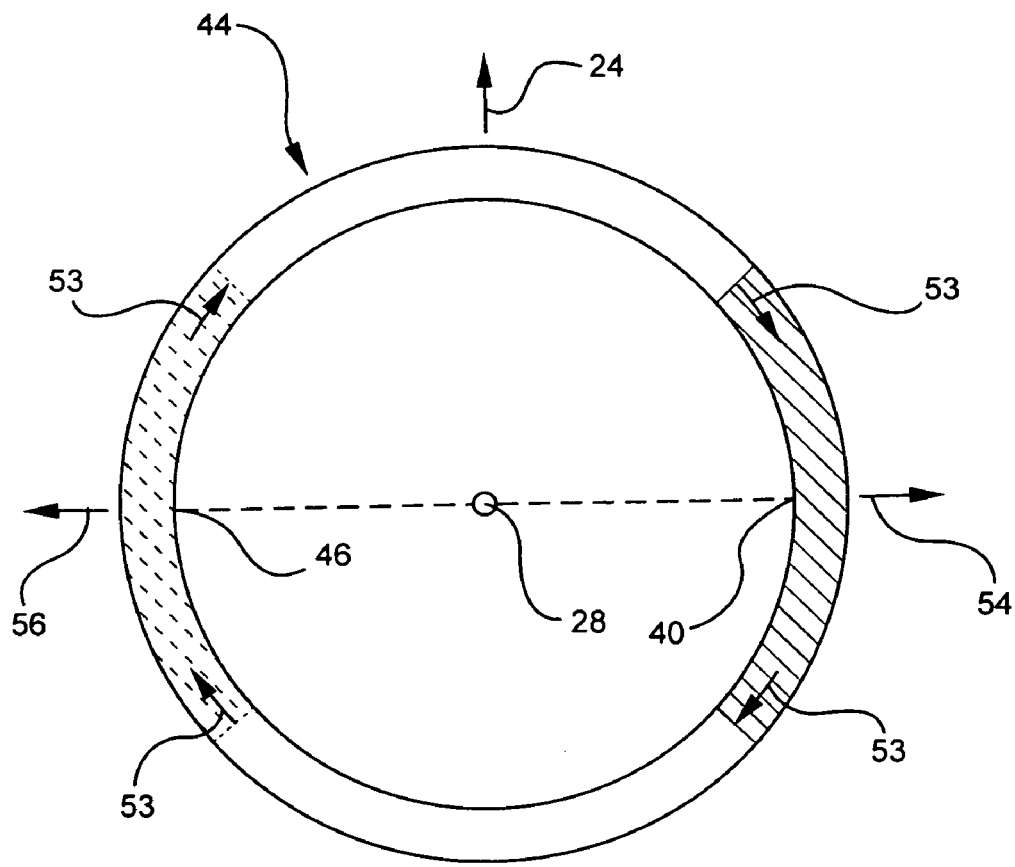
Figure 4E:
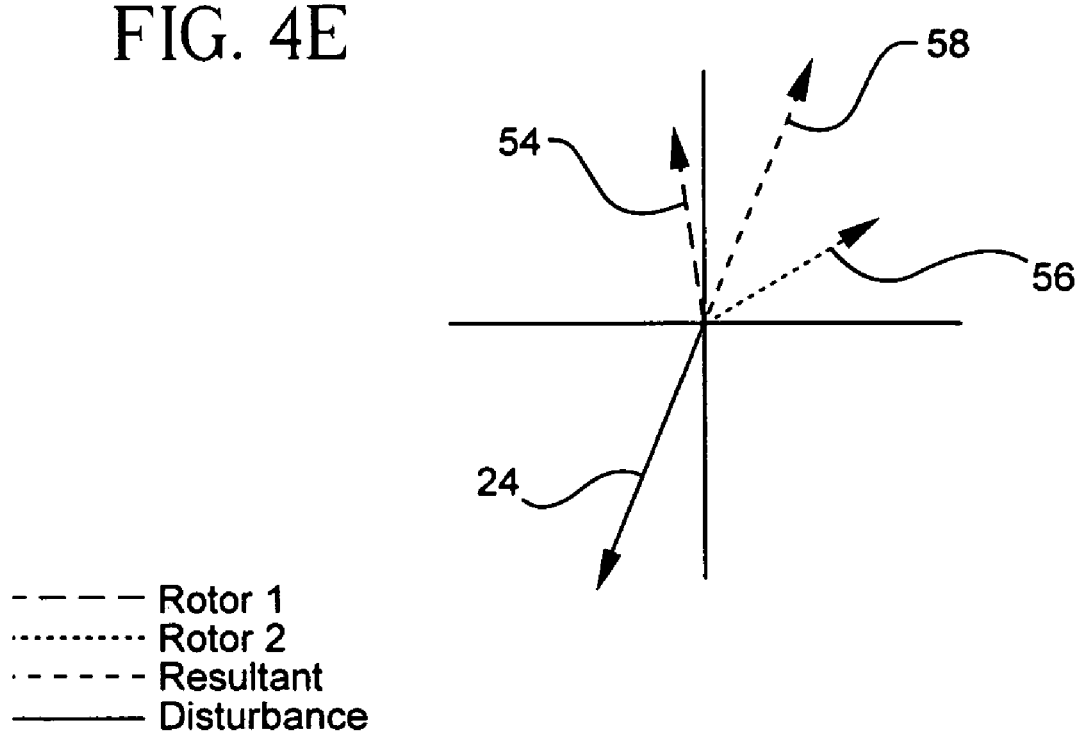
Figure 4F:
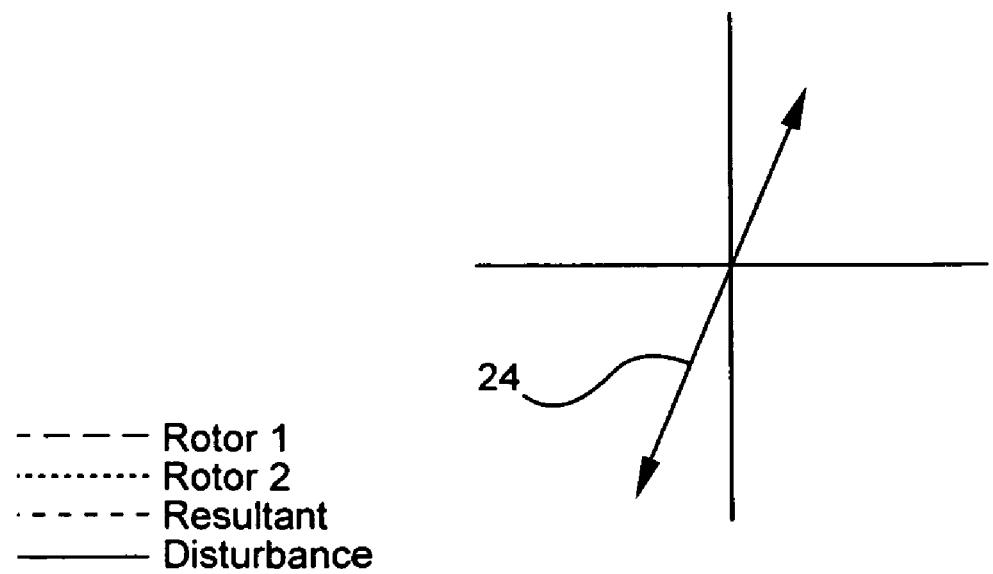
Figure 5:
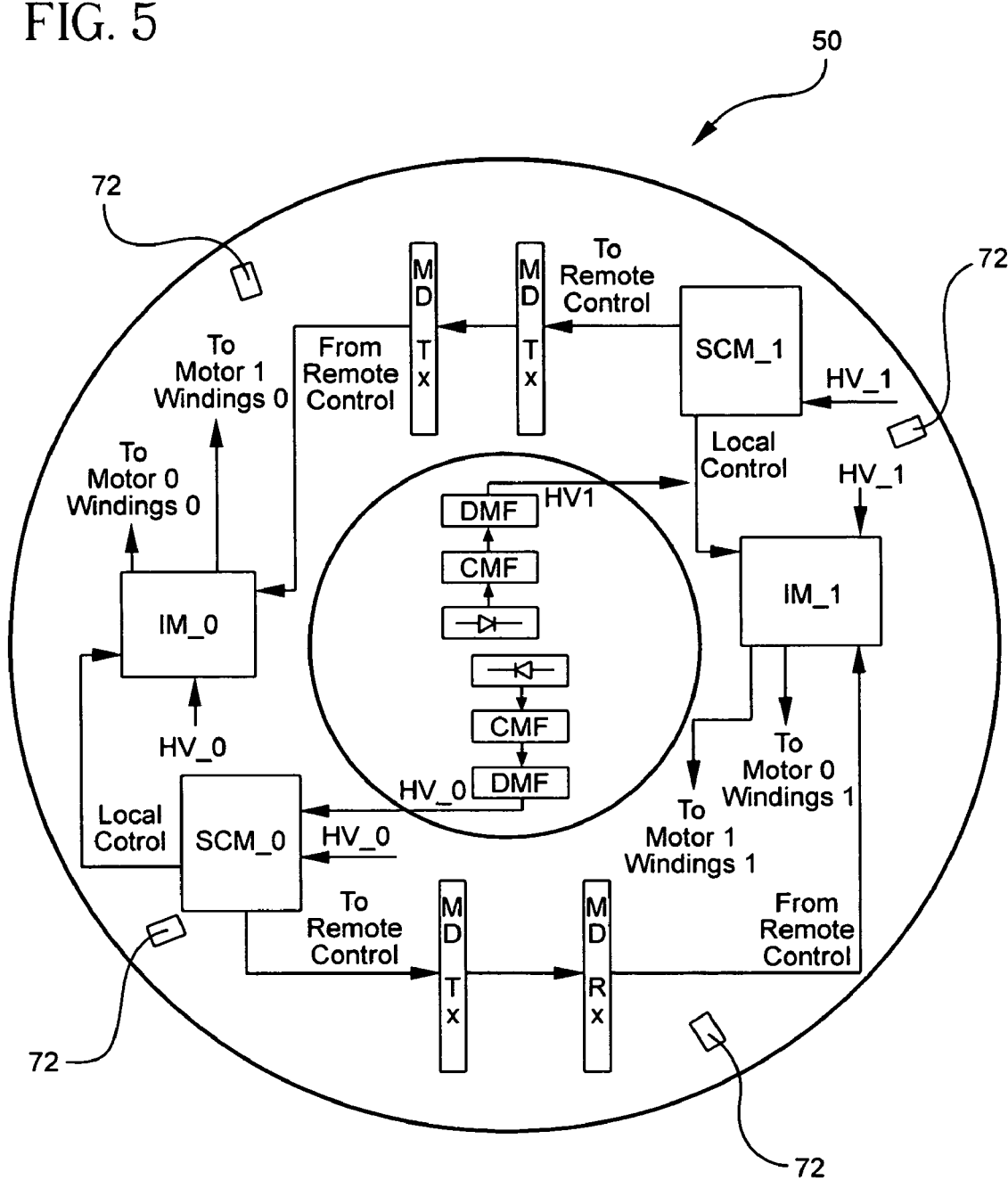
FIG. 5 shows helicopter rotating hub mounted vibration control methods/systems.
Figure 9A:
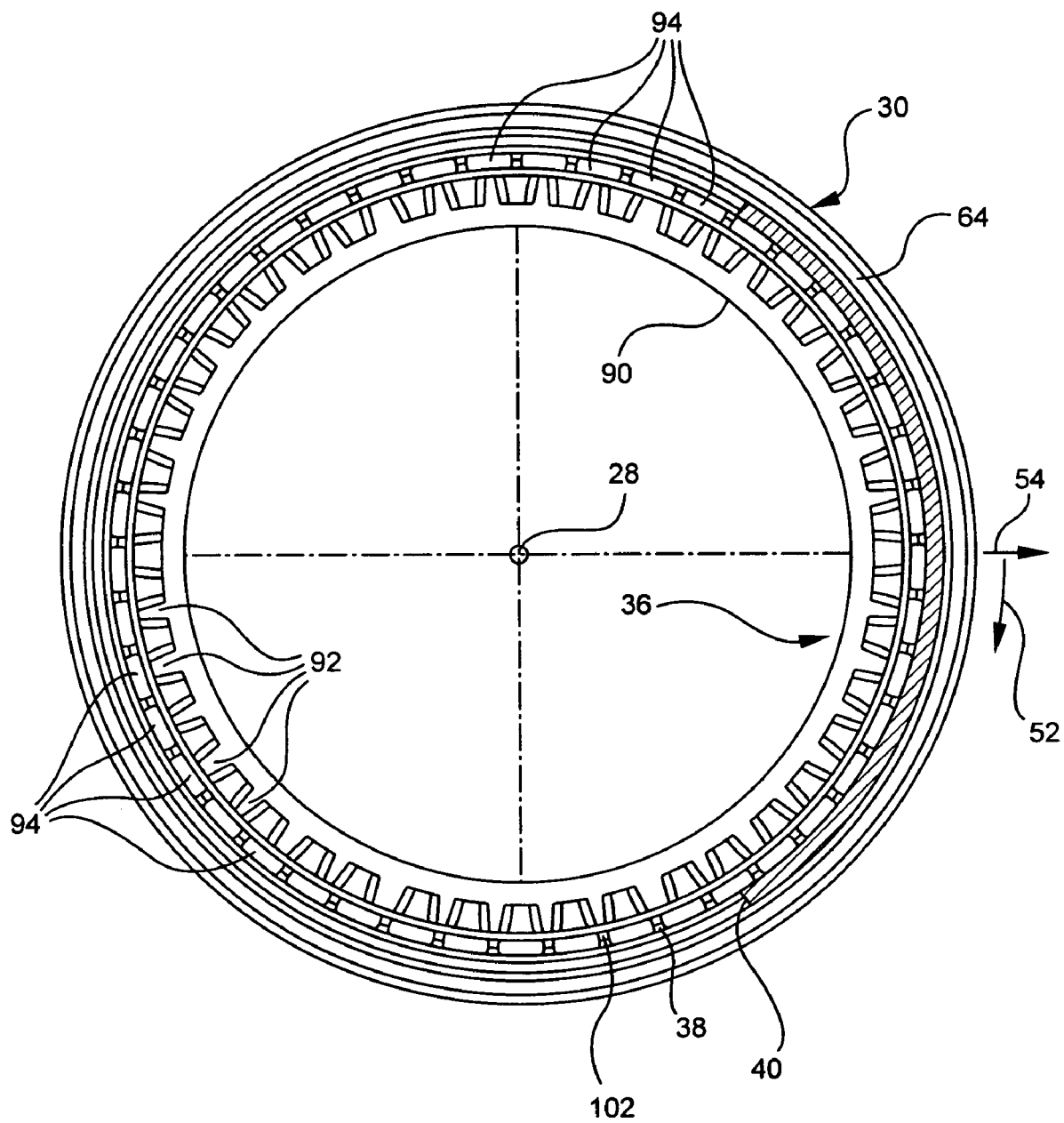
Figure 9B:
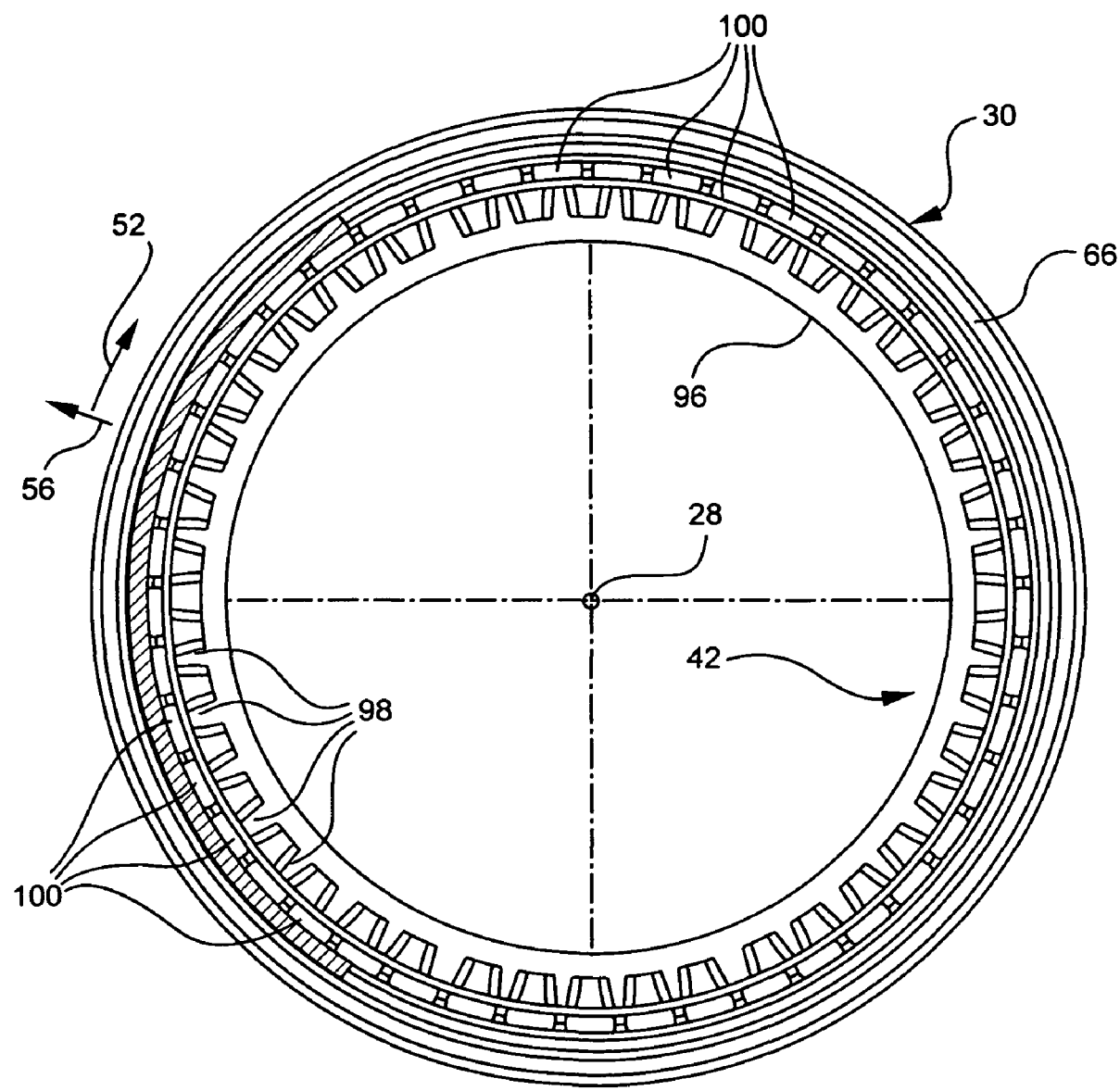
Figure 9C:
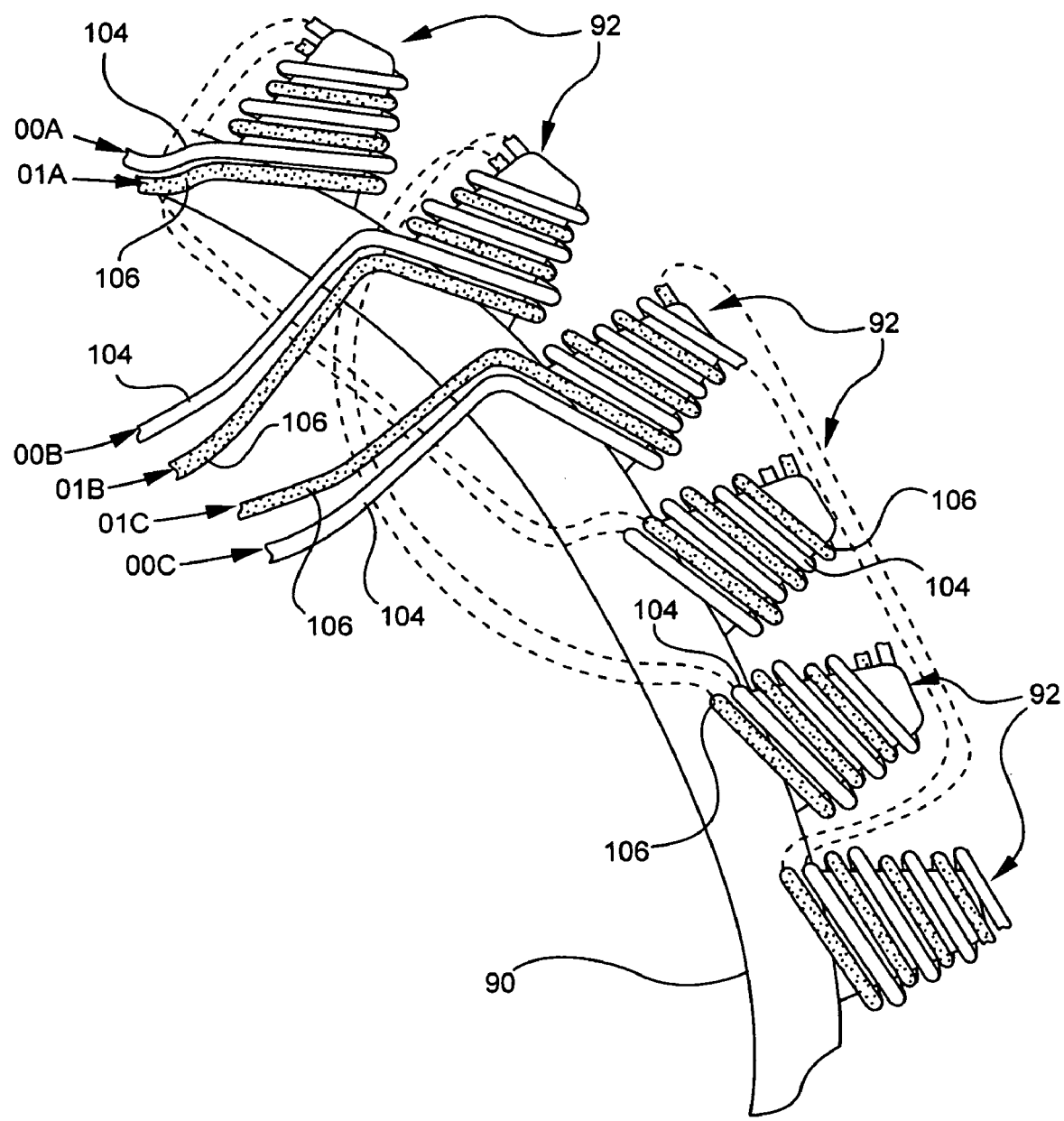
Figure 9E:
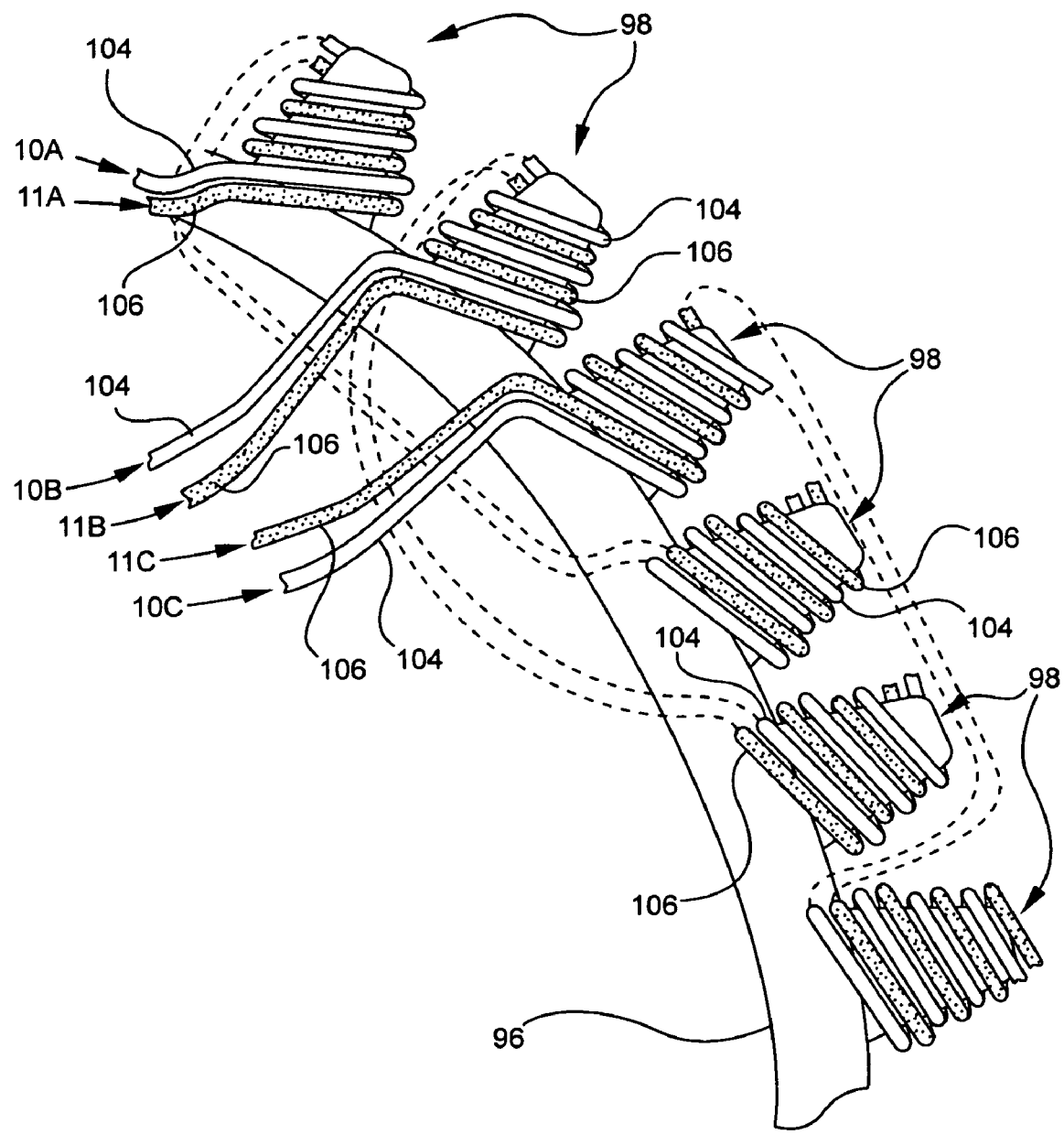
Figure 9G:
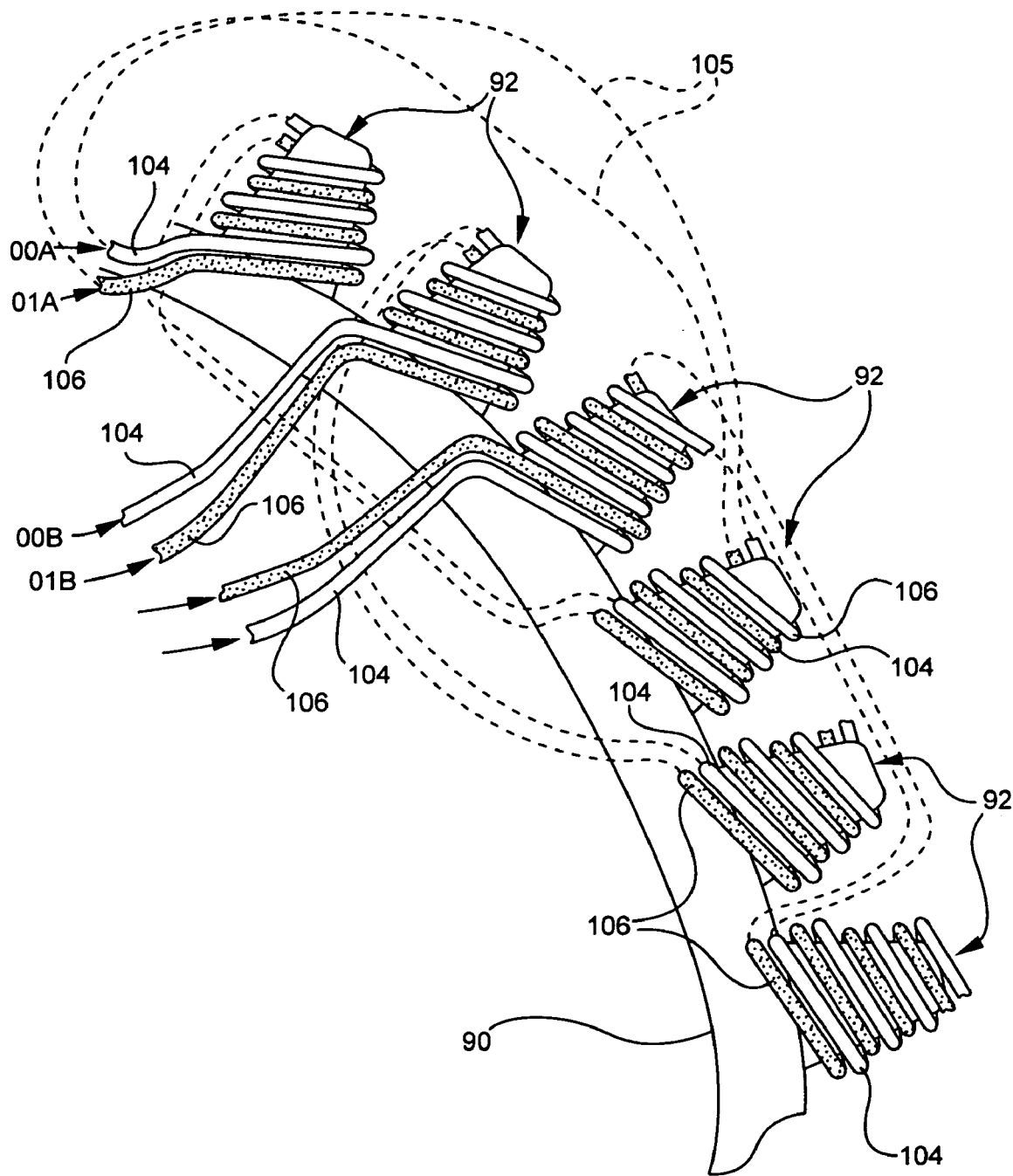
Figure 9H:
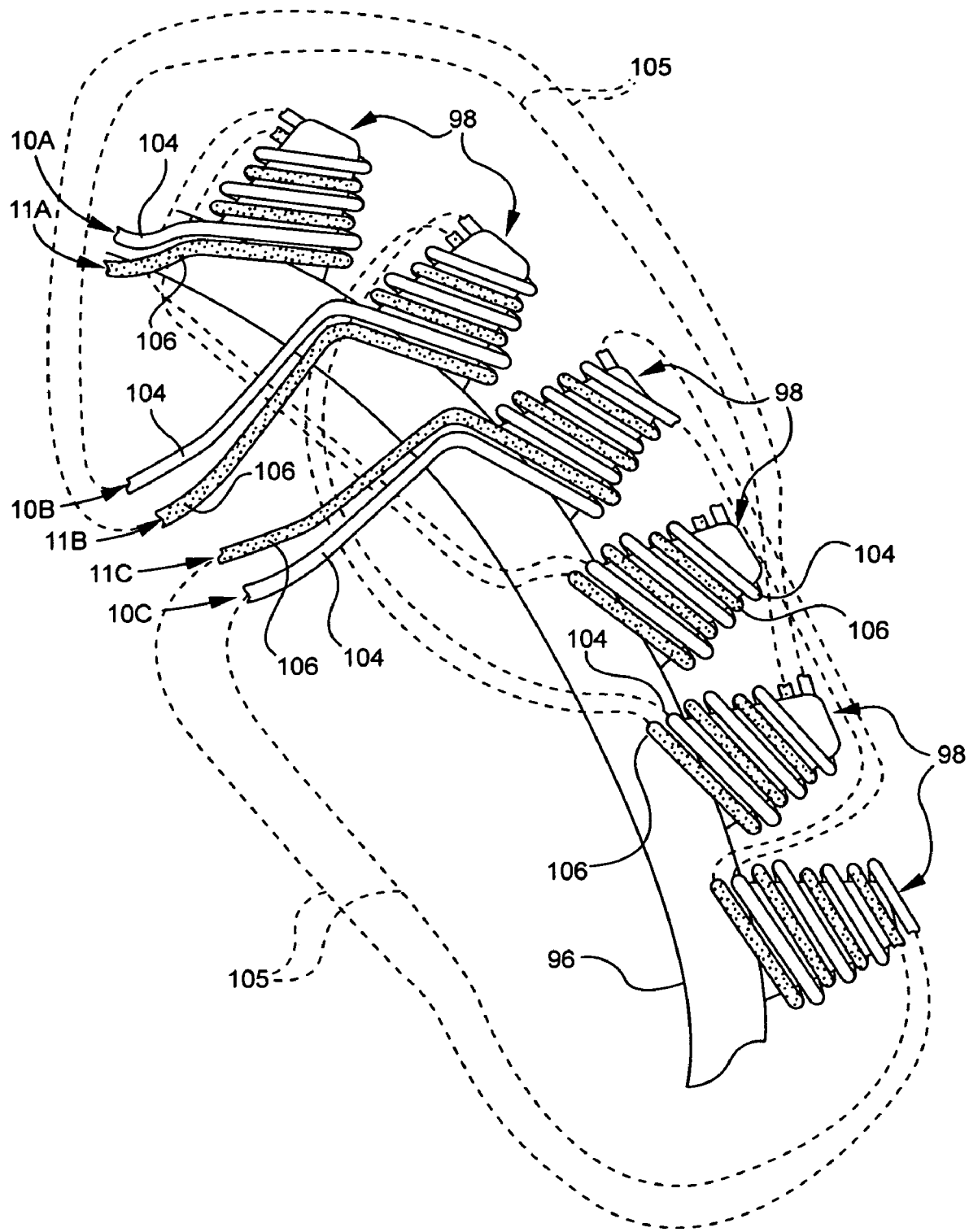

Preferably the helicopter rotating vibration electronics control system opposingly orients the first imbalance mass concentration and the second imbalance mass concentration at a transitioning rotation speed 53 less than the whole number multiple vibration canceling rotation frequency. As shown in FIG. 4C-D, preferably the invention includes opposingly orienting the first imbalance mass concentration 40 and the second imbalance mass concentration 46 at a transitioning rotation speed 53 less than the whole number multiple vibration canceling rotation frequency 52, preferably when the transitioning rotation speed is a startup speed less than the whole number multiple vibration canceling rotation frequency with the system starting from a shutdown stop and spinning up towards the whole number multiple vibration canceling rotation frequency or when the transitioning rotation speed is a shutting down speed less that the whole number multiple vibration canceling rotation frequency with the system shutting and slowing down from the full speed whole number multiple vibration canceling rotation frequency down to shutdown stop. Preferably the first imbalance rotor eccentric mass concentration and the second imbalance rotor eccentric mass concentration are oriented opposed such that the vectors 56 and 54 are opposed and cancel each other out while the transitioning rotation speed is no more than ninety percent of the whole number multiple vibration canceling rotation frequency, preferably when the transitioning rotation speed is no more than eighty percent of the whole number multiple vibration canceling rotation frequency, to provide a soft start and stop for the system. When a failure occurs with the rotation of one of the imbalance rotors, such that a soft stop of the system is not achievable, the still operating non-failed imbalance rotor is positioned and driven to oppose the disturbance force vector 24, with the failed rotor slowing down to a stop, preferably by electromagnetically braking the rotation of the failed rotor. As shown in FIG. 4E-F, in the event of a motor failure, the functioning motor is driven and commanded to the angle of the resultant correction force vector 58 just prior to the motor failure, with the still functioning motor responding by positioning its imbalance rotor eccentric mass concentration to oppose the disturbance force vector 24, preferably with the failed motor's imbalance rotor eccentric mass concentration motion braked to a rest state. Just prior to failure both imbalance rotor eccentric mass concentrations are angularly positioned in order to create a resultant force vector 58 of magnitude and phase (desired phase phi) such that the disturbance force vector 24 is cancelled, upon failure the still functioning motor drives its imbalance rotor eccentric mass concentration to the desired phase phi. Preferably the helicopter rotating vibration electronics control system includes an electromagnetic braking circuit for electromagnetically braking a rotation of the rotors. Preferably the invention includes electromagnetically braking a rotation of the first imbalance rotor or the second imbalance rotor, preferably when the operation of the motor of the imbalance rotor has failed. As shown in FIG. 9G-H, electromagnetic braking circuits 105 preferably complete the electric circuits of electromagnet windings 104 and 106 to electromagnetically brake the spinning imbalance rotor of the failed motor. Preferably the failed rotor/motor is electromagnetically braked by the electromagnetic braking circuit 105 shorting the electromagnet windings 104 and 106, so induced currents produced in the shorted electromagnet windings act to resist permanent magnets 94 moving around the axis of rotation 28. The shorting of the electromagnet windings 104 and 106 completes the electromagnetic braking circuit such that the rotation of the failed imbalance rotor is stopped. Preferably electromagnetically braking the failed rotor by shorting the electromagnet windings 104 and 106, includes utilizing a switch, relay, solid state switch, or FET (Field Effect Transistor), that is preferably open when powered, such that the shorting of the windings with electromagnetic braking circuits 105 is controlled and utilized only for a motor failure.

In an embodiment the invention includes a rotary wing aircraft helicopter rotating vibration control system 20 for a helicopter rotary wing hub 22 having a periodic vibration 24 while rotating at a helicopter operational rotation frequency 26 about a rotary wing axis of rotation 28. The helicopter rotating vibration control system 20 includes a rotary housing 30 centered about and encompassing the rotary wing axis of rotation 28 with the rotary housing 30 rotating at the helicopter operational rotation frequency 26. The rotating rotary housing 30 contains a first coaxial ring motor 36 coaxially centered about the rotary wing axis of rotation 28. The first coaxial ring motor 36 has a first imbalance rotor 38 with a first imbalance rotor eccentric mass concentration 40. The rotating rotary housing 30 contains a second coaxial ring motor 42 coaxially centered about the rotary wing axis of rotation 28 with the second coaxial ring motor having a second imbalance rotor 44 with a second imbalance rotor eccentric mass concentration 46. The rotating rotary housing 30 contains an electronics control system 50 which controls a speed and a phase of the first coaxial ring motor 36 and the second coaxial ring motor 42 such that the first imbalance rotor eccentric mass concentration and the second imbalance rotor eccentric mass concentration are directly driven at a whole number multiple vibration canceling rotation frequency 52 greater than the helicopter operational rotation frequency 26 wherein the helicopter rotary wing hub periodic vibration 24 is reduced and minimized. Preferably the rotating rotary housing 30 is comprised of an annular ring shape centered about and encompassing the rotary wing axis of rotation 28. Preferably the rotating rotary housing 30 encompasses the rotor shaft 29, and preferably is attached to and rotates with the helicopter rotary wing hub 22 at the helicopter operational rotation frequency. Preferably the rotary housing 30 has an electronics housing cavity subsystem 32 and an adjacent coaxial rotor housing cavity subsystem 34, preferably the annular ring rotary housing 30 centered about the rotary wing hub axis of rotation 28, with both cavity subsystems encompassing and centered about helicopter rotary wing hub axis of rotation 28. Preferably the first and second coaxial ring motors 36 and 42 are brushless ring motors, and most preferably frameless AC ring motors. Preferably the electronics control system 50 measures the periodic vibration 24, preferably with accelerometers 72, with the electronics control system controlling the speed, relative phase, and absolute phase of the imbalance rotors eccentric mass concentrations to minimize the measured vibration with the rotors gearlessly directly electromagnetically driven at a vibration canceling rotation frequency greater than the helicopter operational rotation frequency. In a preferred embodiment the housing 30 is spinning at 1 per rev (the operational rotation frequency) and the imbalance rotor eccentric mass concentrations 40 and 46 are spinning at 4 per rev, which is 3 per rev relative to housing 30 which is rotating at 1 per rev. The first motor 36 produces a first rotating force 54, the second motor 42 produces a second rotating force 56, which combine to produce a rotating net force vector 58 to cancel the periodic vibration force 24. Preferably the rotary housing 30 confines a fluid liquid lubricant 48. In a preferred embodiment the rotary housing 30 is comprised of a first rotor upper cavity 60 and a second rotor lower cavity 62. Preferably the upper and lower rotor housing cavities are separated so that particle contaminates and spall debris from one imbalance rotor does not contaminate the other imbalance rotor, preferably with upper and lower liquid lubricated cavities liquidly isolated from each other. Preferably the imbalance rotors 38 and 44 have lubricated bearings 64 and 66 for supporting the rotors relative to the housing 30 and providing for the imbalance rotors to spin at a faster rotational speed than the housing 30, preferably with the bearings lubricated by liquid lubricant 48. Preferably the bearings are thin section bearings having bearing dimensions considerably less than the radius of the bearing (h<<r; h=thickness, height, width of bearing much less than radius of bearing). Preferably the housing 30 includes a circumferential wall surface 74 that constrains the lubricant 48 while the housing is rotating at the helicopter operational rotation frequency. Preferably the first rotor lubricated bearing 64 includes an outer race 78 secured to the housing 30 proximate the rotor housing cavity circumferential surface 74 and an inner race 80 secured to the first rotor 38, with the ball bearing moving rolling members 82 allowing the imbalance rotor 38 with inner race 80 to spin faster than housing 30 with outer race 78. Preferably the second rotor lubricated bearing 66 includes an outer race 78 secured to the housing 30 proximate the rotor housing cavity circumferential surface 74 and an inner race 80 secured to the second imbalance rotor 44, with the ball bearing moving rolling members 82 allowing the second imbalance rotor 44 with inner race 80 to spin faster than housing 30 with outer race 78. Preferably the bearing moving rolling members 82 are lubricated in the liquid lubricant 48 constrained against circumferential surface 74, most preferably bathed and submersed in the lubricant. In an embodiment the first and second rotor cavities are substantially completely filled with the liquid lubricant 48. In a preferred embodiment the first and second rotor cavities are partially filled with liquid lubricant 48, preferably such that when housing 30 rotates at helicopter operational rotation frequency 26 the lubricated bearings are lubricated by the liquid lubricant 48 but the rotors are not submerged in the liquid thus minimizing steady-state torque requirements that would arise from viscous drag torque imposed by the liquid lubricant, preferably with the rotors rotating through a non-liquid gas. Preferably the liquid lubricant 48 is sealed inside the rotor housing cavity 34. Preferably the vibration control system housing contains a health monitoring sensor 84 for monitoring a change in an operational characteristic of the vibration control system, preferably with the health monitoring sensor and health monitoring system incorporated into the electronics control system. The health monitoring system with sensors 84 measure operational performance characteristics of the vibration control system 20, most preferably operational performance characteristics of the first and second rotors 38 and 44 and their rotation. Preferably the sensors 84 monitor the health of the rotor bearings 64 and 66. In an embodiment the sensors 84 are temperature sensors that monitor the temperature of the bearings for a change in bearing operation temperature that signals a bearing heat up and degradation in the operation of the bearing that may result from the onset of spalling. Preferably the health monitoring system with sensors 84 includes at least two temperature sensors, such as thermocouples, preferably with at least one adjacent the bearing to monitor the bearing temperature. Preferably the health monitoring system utilizes a reference temperature to determine when the bearing temperature is rising above the ambient temperature of the vibration control system 20. The health monitoring system sensors 84 monitor the bearing temperature differences to determine if a bearing is heating up too much in its operation, and when the measured temperature difference exceeds a measured operational performance characteristic limitation, the vibration control system preferably through the electronics control system provides for a correction change in the vibration control system, such as communicating and warning the helicopter user and maintainers that bearing maintenance and/or replacement should be performed so that the bearing operation is corrected prior to failure of the bearing and failure of the rotation of the rotor. The health monitoring system sensors 84 catches the operation problem at the performance degradation stage, and provides a warning notification to the helicopter operator or maintenance crew, to warn about replacement prior to bearing operation failure. The health monitoring system is preferably linked with the helicopter avionics system, with a warning maintenance signal transmitted to the avionics system and operator. In an embodiment the health monitoring system sensors 84 monitors trends, with the system storing the sensor data and prior to failure of vibration control system operation identifying an approaching failure. In an embodiment the health monitoring system sensors 84 are accelerometers and monitor vibration signal levels at ball pass frequency bands to pickup on a deteriorating bearing race. Health monitoring system sensors 84 may be the accelerometers 72, or preferably separate accelerometer sensors 84 that monitor the ball pass frequency from each time the ball rolls over a bearing race problem spot and makes a vibration. Additionally in embodiments the health monitoring system senses, monitors, and warns about the vibration control system operation including the motor's 36 and 42 currents, torques, and temperature. Preferably health monitoring system sensors 84 input data into a health monitoring system algorithm, with the algorithm outputting a notification to effect a change/correction to the vibration control system 20 such as service or replacement. In an embodiment the output of the health monitoring system algorithm is a log of collected sensor data that is downloaded and analyzed for performance and operation issues.

In an embodiment the invention includes a method of controlling a periodic vibration 24 of a rotary wing aircraft helicopter with a helicopter rotary wing hub 22, which rotates at an operational rotation frequency 26. The method includes providing an annular ring rotary housing 30 having an electronics housing cavity subsystem 32 and an adjacent coaxial rotor housing cavity subsystem 34. The rotor cavity subsystem 34 contains a first coaxial ring motor 36 coaxially centered about the rotary wing hub axis of rotation 28. The first coaxial ring motor has a first imbalance rotor 38 with a first imbalance rotor eccentric mass concentration 40. The rotor cavity subsystem 34 contains a second coaxial ring motor 42 having a second imbalance rotor 44 with a second imbalance rotor eccentric mass concentration 46, and a lubricant 48. The electronics housing cavity subsystem 32 contains an electronics control system 50 which controls the speed and phase of the first coaxial ring motor 36 and the second coaxial ring motor 42. The method includes securing the annular ring rotary housing 30 to the helicopter rotary wing hub 22 with the annular ring rotary housing rotating at the operational rotation frequency 26. The method includes directly driving the first imbalance rotor 38 and the second imbalance rotor 44 at a whole number multiple vibration canceling rotation frequency 52 greater than the operational rotation frequency 26 while controlling the rotational phase position of the first imbalance rotor eccentric mass concentration and the second imbalance rotor eccentric mass concentration inorder to produce a rotating net force vector 58 to inhibit the periodic vibration 24. Preferably the lubricant 48 is a liquid lubricant. Preferably the electronics control system 50 measures the periodic vibration 24 and controls the speed, the relative phase and the absolute phase of the first coaxial brushless frameless AC ring motor imbalance rotor 38 and the second coaxial brushless frameless AC ring motor imbalance rotor 44. Preferably the provided housing 30 includes a circumferential surface 74 that constrains the liquid lubricant 48, and the method includes rotating the rotary housing 30 with the helicopter rotary wing hub at the operational rotation frequency 26 with the liquid lubricant collecting at the circumferential surface 74. Preferably the method includes moving the liquid lubricant 48 inward from the circumferential surface 74 towards the axis of rotation 28. Preferably the first rotor 38 has a lubricated bearing 64 for supporting the first rotor relative to the housing 30 and the second rotor 44 has a lubricated bearing 66 for supporting the second rotor relative to the housing 30, and the method includes moving the lubricant collecting at the circumferential surface 74 through lubricated bearings. Preferably the method includes sealing the liquid lubricant 48 in the rotor cavities of housing 30. As shown in an embodiment in FIG. 8, the first and second imbalance rotors 38 and 44 are coupled together with a plurality of rotor detents 86, preferably detent magnets, such that the rotors can rotate together in the event of one of the motors failing. In an embodiment the method includes magnetically coupling the first rotor with the second rotor, preferably with magnetic detents 86 such that the magnetically coupled rotors slip relative to each other at a prescribed torque. The method preferably includes that in the event of a motor failure the other motor spins both rotors, with the relative position of the two rotor eccentric mass concentrations 40 and 46 varied by controlling acceleration impulses to the working motor to cause the rotors to slip relative to each other. In preferred embodiments the method includes isolating the first rotor 38 in a first rotor upper rotor cavity 60 from the second rotor 44 in a second rotor lower rotor cavity 62. Preferably the upper and lower outer cavities 60 and 62 are separated so that particles, contaminates, and spall debris from one rotor does not contaminate the other, preferably with the upper and lower liquid lubricated outer cavities 60 and 62 liquidly isolated from each other. In an embodiment the housing rotor cavities are substantially completely filled with liquid lubricant 48. In an embodiment the housing rotor cavities are partially filled with liquid lubricant 48, preferably such that when housing 30 rotates at the helicopter operational rotation frequency the lubricated bearings 64 and 66 are lubricated by the liquid lubricant 48 but the rotor is not submerged in the liquid, preferably with the rotors rotating through a nonliquid gas. Preferably the method includes providing at least one health monitoring sensor 84 and monitoring a change in an operational characteristic of the rotors and the vibration control system sensed by the health monitoring sensors. Preferably the health monitoring sensor 84 and its health monitoring system is incorporated into the electronics control system 50. The health monitoring includes measuring operational performance characteristics of the vibration control system 20 with sensors 84, most preferably operational performance characteristics of the first and second rotors 38 and 44 and their rotation, and particularly the performance of bearings 64 and 66. Preferably the method includes monitoring the health of the rotor bearings 64 and 66 with at least one sensor 84. In an embodiment the sensors 84 are temperature sensors that monitor the temperature of the bearings for a change in bearing operation temperature that signals a bearing heat up and degradation in the operation of the bearing. Preferably the health monitoring system with sensors 84 includes at least two temperature sensors, such as thermocouples, preferably with at least one adjacent the bearing to monitor the bearing temperature. Preferably health monitoring the vibration control system includes utilizing a reference temperature to determine when the bearing temperature is rising above the ambient temperature of the vibration control system 20. The health monitoring system sensors 84 monitor the bearing temperature differences to determine if a bearing is heating up too much in its operation, and when the measured temperature difference exceeds a measured operational performance characteristic limitation, the vibration control system, preferably through the electronics system, provides for a correction change in the vibration control system, such as communicating and warning the helicopter user and maintainers that bearing maintenance and/or replacement should be performed so that the bearing operation is corrected prior to failure of the bearing and its rotor. The health monitoring system sensors 84 preferably catches the operation problem at the performance degradation stage, and provides a warning notification to the helicopter operator or maintenance crew, to warn about replacement prior to bearing operation failure. The health monitoring system is preferably linked with the helicopter avionics system, with a warning maintenance signal transmitted to the avionics system and operator. In an embodiment the health monitoring method monitors operation trends and stores the sensor data, and prior to failure of vibration control system operation identifies an approaching failure. In an embodiment the provided health monitoring system sensors 84 are accelerometers and the method monitors vibration signal levels at ball pass frequency bands to pickup on a deteriorating bearing race. Health monitoring system sensors 84 may be the accelerometers 72, or preferably separate accelerometer sensors 84 that monitor the ball pass frequency from each time a ball rolls over a bearing race problem spot and makes a vibration. Additionally in embodiments the health monitoring method includes sensing, monitoring, and warning about the vibration control system operation including the currents, torques, and temperatures of motors 36 and 42. Preferably the health monitoring system sensors 84 input data into a health monitoring system algorithm, with the algorithm outputting a notification to affect a change/correction to the vibration control system 20 such as service or replacement. In an embodiment the health monitoring system algorithm outputs a log of collected sensor data that is downloaded and analyzed for performance and operation issues.

In an embodiment the invention includes a method of making a helicopter rotating hub mounted vibration control system 20 for a helicopter rotary wing hub 22 having a periodic vibration 24 while rotating at a helicopter operational rotation frequency 26. The method includes providing a rotary annular ring housing 30 having an electronics housing cavity subsystem 32 and a rotor housing cavity subsystem 34. The provided rotary annular ring housing 30 provides a structural means for rotating about the axis of rotation 28 at the helicopter operational rotation frequency 26. The housing 30 is centered about the rotary wing hub axis of rotation 28. The rotary housing contains a first coaxial brushless frameless AC ring motor centered about and coaxially with the rotary wing hub axis of rotation 28. The provided first coaxial ring motor has a first rotor 38 with a first imbalance rotor eccentric mass concentration 40. The rotary housing contains a second coaxial brushless frameless AC ring motor centered about and coaxial with the rotary wing hub axis of rotation 28. The second ring motor 42 has a second rotor 44 with a second imbalance rotor eccentric mass concentration 46. Preferably the rotary housing 30 has a circumferential surface 74. Preferably an electronics control system 50 is contained in the rotary annular ring housing 30 with the electronics control system 50 rotating with the housing 30 about the axis of rotation 28 at the helicopter operational rotation frequency 26. The electronics control system 50 measures the periodic vibration and controls a speed, a relative phase and an absolute phase of the first coaxial frameless ring motor and the second coaxial ring motor while rotating with the housing 30 about the axis of rotation 28 at the helicopter operational rotation frequency 26. The method includes sealing a liquid lubricant 48 inside the housing 30, wherein the liquid lubricant 48 collects along the circumferential surface 74 when the housing rotates at the helicopter operational rotation frequency. Preferably the electronics control system is disposed in the housing so that the electronics control system 50 rotates with the housing 30. Preferably providing the housing 30 includes providing a housing 30 with a rotor housing cavity 34 comprised of a first rotor upper cavity 60 and a second rotor lower cavity 62, and the method includes isolating the first rotor 38 in the first rotor upper cavity 60 from the second rotor 44 in the second rotor lower cavity 62. Preferably the method includes providing a health monitoring sensor 84 for monitoring a change in an operational characteristic of the vibration control system and disposing the health monitoring sensor 84 in the rotary housing. Preferably the health monitoring sensor 84 and its health monitoring system is incorporated into the electronics control system 50. The health monitoring sensor 84 measures an operational performance characteristic of the vibration control system 20. Most preferably the sensors 84 are disposed proximate the rotors so the operational performance characteristics of the first and second rotors 38 and 44, and particularly the performance of bearings 64 and 66 are monitored. Preferably the sensors 84 monitor the health of the rotor bearings 64 and 66. In an embodiment the sensors 84 are temperature sensors, preferably thermocouples that monitor the temperature of the bearings for a change in bearing operation temperature that signals a bearing heat up and degradation in the operation of the bearing. Preferably temperature sensors 84 are disposed adjacent the bearings 64 and 66. Preferably the health monitoring sensors 84 are linked with the electronics control system 50 and the helicopter avionics system such that when a measured characteristic exceeds a measured operational performance characteristic limitation, a warning is transmitted to provide for a correction change in the vibration control system, such as communicating and warning the helicopter user and maintainers that bearing maintenance and/or replacement should be performed so that the bearing operation is corrected prior to failure of the bearing and its rotor. In an embodiment the provided health monitoring system sensors 84 are accelerometers that monitor the ball pass frequency from each time a ball rolls over a bearing race problem spot and makes a vibration. Additionally in embodiments the health monitoring sensors are sensors for monitoring and warning about the vibration control system operation including the currents, torques, and temperatures of motors 36 and 42.

In an embodiment the invention includes a vibration control helicopter rotating hub mounted vibration balancer 20, which rotates about a center axis of rotation 28 at an operational rotation frequency 26. Preferably the vibration balancer is detachably attached to the helicopter rotor hub with the balancer rotating with the rotor shaft for controlling problematic helicopter vibrations. As shown in FIG. 9, the vibration balancer 20 is comprised of a first stator 90 having a plurality of electromagnets 92 periodically spaced around the center axis of rotation 28. The vibration balancer 20 is comprised of a first imbalance rotor 38 having an eccentric mass concentration 40 and a plurality of permanent magnets 94 periodically spaced around the center axis of rotation 28. The first imbalance rotor 38 is disposed around and adjacent to the first stator 90 with a bearing 64 providing for rotation of the rotor relative to the housing 30. The vibration balancer 20 is comprised of a second stator 96 having a plurality of electromagnets 98 periodically spaced around the center axis of rotation 28. The vibration balancer 20 is comprised of a second imbalance rotor 44 having an eccentric mass concentration 46 and a plurality of permanent magnets 100 periodically spaced around the center axis of rotation 28. The second imbalance rotor 44 is disposed around and adjacent to the second stator 96 with a bearing 66 providing for rotation of the rotor relative to the housing 30. The permanent magnets 94 are adjacent to and separated from the electromagnets 92 with an air gap 102 wherein the first stator electromagnets 92 directly drive the first imbalance rotor magnets 94 and the first imbalance rotor eccentric mass concentration 40 around the center axis of rotation 28 at a vibration canceling rotation frequency 52 greater than the operational rotation frequency 26. The permanent magnets 100 are adjacent to and separated from the electromagnets 98 with an air gap 102 wherein the second stator electromagnets 98 directly drive the second imbalance rotor magnets 100 and the second imbalance rotor eccentric mass concentration 46 around the center axis of rotation 28 at the vibration canceling rotation frequency 52. Preferably the first and second stators directly drive the first and second imbalance rotors at a vibration canceling rotation frequency 52 that is a whole number multiple of the operational rotation frequency, preferably with the whole number multiple >1, more preferably with the whole number multiple >3 and most preferably with a whole number multiple N where N equals the number of blades on the helicopter. The imbalance rotor eccentric mass concentrations are electromagnetically directly driven with controlled periodically modulated EM fields from the electromagnets which repel/attract the surrounding permanent magnets. The stators directly drive the imbalance rotors with their eccentric mass concentrations, in that the rotors are gearlessly directly driven by the electromagnetic fields generated by the electromagnets without mechanical gears coupling and transmitting the motion. Preferably the housing 30 spins at the operational rotation frequency of 1 per rev and the imbalance rotors are spinning at 4 per rev, which is 3 per rev relative to the housing 30 which is at 1 per rev. The directly driven rotor 38 produces a first rotating force 54, and the second directly driven rotor 44 produces a second rotating force 56, which combine to produce a rotating net force vector 58 to balance out and cancel the periodic rotating vibration force 24. The first imbalance rotor 38 encompasses the first stator 90, and the second imbalance rotor 44 encompasses the second stator 96, with the first imbalance rotor 44 and the first stator 90 adjacent the second imbalance rotor 44 and the second stator 96 stacked and aligned coaxially. In an embodiment the first imbalance rotor eccentric mass concentration 40 is comprised of a first imbalance mass arc and the second imbalance rotor eccentric mass concentration 46 is comprised of a second imbalance mass arc. Preferably the imbalance mass arcs are made of a dense metal such as tungsten. In an embodiment the imbalance mass arcs is incorporated into the structure of the rotor itself, such as with an arc section of the rotor formed from a dense metal structural material and the majority remainder of the rotor formed from a relatively less dense metal structural material. Preferably the rotating vibration balancer includes a liquid lubricant 48 contained by a rotary housing 30, preferably in a lubricated rotor housing cavity subsystem 34. In a preferred embodiment the rotating vibration hub balancer 20 includes an electronics housing cavity subsystem 32 for containing a electronics control system 50, preferably with the electronics housing cavity subsystem 32 unlubricated and fluidly sealed from the lubricated rotor housing cavity subsystem 34. Preferably the electronics control system 50 includes a plurality of control electronics and sensors for controlling the movement of the imbalance rotors 38 and 44. Preferably the stator electromagnet windings are comprised of three phase motor windings. As shown in FIG. 9, preferably the first stator plurality of electromagnets 92 include a first set of electromagnet windings 104 and a parallel adjacent second set of electromagnet windings 106 and the second stator plurality of electromagnets 98 include a first set of electromagnet windings 104 and a parallel adjacent second set of electromagnet windings 106. For example, winding 104 and 106 are wound in a bifilar fashion. Preferably the electronics control system 50 is comprised of a first stator first amplifier 110 and a first stator second amplifier 112, with the first stator first amplifier 110 driving the first set of electromagnet windings 104 and the first stator second amplifier 112 driving the adjacent second set of electromagnet windings 106. Preferably the electronics control system 50 is comprised of a second stator first amplifier 114 and a second stator second amplifier 116, with the second stator first amplifier 114 driving the first set of electromagnet windings 104 and the second stator second amplifier 116 driving the adjacent second set of electromagnet windings 106. Preferably the first amplifiers and the second amplifiers are independently powerable and independently controllable. Preferably each stator (90, 96) has two sets of electromagnetic windings (104 and 106), with each of the sets of winding having its own amplifier (110 and 112) (114 and 116). Preferably the electronics control system includes four amplifiers, with the preferred vibration control system operation utilizing two amplifiers driving each imbalance rotor, with each amplifier and its set of stator electromagnetic windings capable of driving the rotor by itself independent of the other amplifier and its windings. Preferably each amplifier is comprised of a three-phase inverter. Preferably each amplifier is comprised of three switching Amps, as shown in FIG. 9D first stator first amplifier 110 is comprised of its first switching Amp 120, second switching Amp 121, third switching Amp 122. As shown in FIG. 9F first stator second amplifier 112 is comprised of its first switching Amp 123, second switching Amp 124, and third switching Amp 125. As shown in FIG. 9D second stator first amplifier 114 is comprised of its first switching Amp 126, second switching Amp 127, and third switching Amp 128. As shown in FIG. 9F second stator second amplifier 116 is comprised of its first switching Amp 129, second switching Amp 130, and third switching Amp 131. Preferably the rotary housing lubricated rotor housing cavity subsystem 34 has an outer circumferential internal cavity subsystem wall surface 74 with the first imbalance rotor 38 and the second imbalance rotor 44 rotating around the center axis of rotation 28 at the vibration canceling rotation frequency 52 while the outer circumferential internal cavity subsystem wall surface 74 rotates around the center axis of rotation 28 at the operational rotation frequency 26 with centrifugal forces collecting the liquid lubricant 48 along the wall 74. Preferably the first imbalance rotor 38 includes a lubricant mover 76 for moving the lubricant 48, preferably a plurality of protrusions 76 that radially extend out into lubricant 48 held against housing cavity wall surface 74. Preferably the second imbalance rotor 44 includes a lubricant mover 76 for moving the lubricant 48, preferably a plurality of protrusions 76 that radially extend out into lubricant 48 held against housing cavity wall surface 74. Preferably the vibration balancer includes a plurality of lubricant movers 76 for moving the lubricant 48, preferably a plurality of radially extending protrusions 76 that radially extend out into lubricant 48 held against housing cavity wall surface 74. The protrusions form a fluid disturbing wake in the lubricant and cause it to splash into the bearings. In an embodiment the lubricant movers 76 are anchored on the rotors. In an embodiment the lubricant movers 76 are anchored on the ball separators of the bearings 64 and 66. Preferably a first imbalance rotor bearing assembly 64 provides for the rotational movement of the first imbalance rotor 38 relative to the housing 30, and a second imbalance rotor bearing assembly 66 provides for the rotational movement of the second imbalance rotor 44 relative to the housing 30. Preferably the first imbalance rotor bearing assembly 64 has an inner race 80 on the first imbalance rotor 38, an outer race 78 proximate the outer circumferential internal wall 74, and a plurality of rolling members 82 between the inner race 80 and the outer race 78. Preferably the second imbalance rotor bearing assembly 66 has an inner race 80 on the second imbalance rotor 44, an outer race 78 proximate the outer circumferential internal wall 74, and a plurality of rolling members 82 between the inner race 80 and the outer race 78. Preferably the housing cavity, the volume of the lubricant, and the bearing assemblies are sized and oriented such that at the operational rotation frequency 26 the lubricant collects against the wall with the lubricant at least contacting the inside diameter of the outer race. Preferably the operational rotation frequency 26 drives lubricant liquid 48 against the walls 74 and into contact with the rolling members 82. In an embodiment the operational rotation frequency 26 drives lubricant liquid 48 against the walls 74 with the rolling members 82 bathed and preferably partially submerged in the lubricant liquid 48. In an embodiment the housing cavity, the volume of the lubricant, and the bearing assemblies are sized and oriented such that at the operational rotation frequency 26 the lubricant collects against the wall with the lubricant submerging the bearing outer race but not the bearing inner race. In an embodiment the housing cavity, the volume of the lubricant, and the bearing assemblies are sized and oriented such that at the operational rotation frequency 26 the lubricant collects against the wall with the lubricant submerging the bearing outer race but not the bearing ball separators. Preferably the vibration control rotating hub 20 includes an annular ring rotary housing 30 centered about and encompassing the center axis of rotation 28, and more preferably encompassing the rotor shaft 29 and rotating at the operational rotation frequency. Preferably the annular ring rotary housing 30 contains the electronics control system 50, which rotates with the housing around the center axis of rotation 28 with the rotor shaft 29 at the operational rotation frequency. Preferably the vibration control rotating hub 20 includes a health monitoring sensor 84 for monitoring a change in an operational characteristic of the vibration control rotating hub. Preferably the health monitoring sensors 84 and their health monitoring system are incorporated into the electronics control system 50. The health monitoring system sensors 84 measure operational performance characteristics of the vibration control rotating hub system 20, most preferably the operational performance characteristics of the first and second rotors 38 and 44 and their rotation. Preferably the sensors 84 monitor the health of the rotor bearings 64 and 66. In an embodiment the sensors 84 are temperature sensors that monitor the temperature of the bearings for a change in bearing operation temperature that signals a bearing heat up and degradation in the operation of the bearing. Preferably the health monitoring system with sensors 84 includes at least two temperature sensors, such as thermocouples, preferably with at least one adjacent the bearing to monitor the bearing temperature. Preferably the health monitoring system utilizes a reference temperature to determine when the bearing temperature is rising above the ambient temperature of the vibration control rotating hub system 20. The health monitoring system sensors 84 monitor the bearing temperature differences to determine if a bearing is heating up too much in its operation, and when the measured temperature difference exceeds a measured operational performance characteristic limitation, the vibration control system preferably through the electronics system provides for a correction change in the vibration control rotating hub, such as communicating and warning the helicopter user and maintainers that bearing maintenance and/or replacement should be performed so that the bearing operation is corrected prior to failure of the bearing and rotation of the rotor. The health monitoring system sensors 84 catches the operation problem at the performance degradation stage, and provides a warning notification to the helicopter operator or maintenance crew, to warn about replacement prior to bearing operation failure. The health monitoring system is preferably linked with the helicopter avionics system, with a warning maintenance signal transmitted to the avionics system and operator. In an embodiment the health monitoring system sensors 84 monitors trends, with the system storing the sensor data and prior to failure of vibration control rotating hub operation identify an approaching failure. In an embodiment the health monitoring system sensors 84 are accelerometers and monitor vibration signal levels at the ball pass frequency bands to pickup on a deteriorating bearing race. Health monitoring system sensors 84 may be the accelerometers 72, or preferably separate accelerometer sensors 84 that monitor the ball pass frequency from each time a bearing ball rolls over a bearing race problem spot and makes a vibration. Additionally in embodiments the health monitoring system senses, monitors, and warns about the vibration control rotating hub operation including the currents, torques, and temperature of the stators and windings. Preferably the health monitoring system sensors 84 inputs data into a health monitoring system algorithm, with the algorithm outputting a notification to effect a change/correction to the vibration control rotating hub 20 such as service or replacement. In an embodiment the output of the health monitoring system algorithm is a log of collected sensor data that is downloaded and analyzed for performance and operation issues.

Preferably the invention includes a method of controlling a periodic vibration of a helicopter with a helicopter rotary wing hub, which rotates about a center axis of rotation at an operational rotation frequency. The method includes providing a first stator 90 having a plurality of electromagnets 92 periodically spaced around the center axis of rotation 28. The method includes providing a first imbalance rotor 38 having an eccentric mass concentration 40 and including a plurality of permanent magnets 94 periodically spaced around the center axis of rotation 28. The method includes disposing and coupling the first imbalance rotor 38 around the first stator 90 such that the first stator electromagnets 92 gearlessly directly drive the first imbalance rotor magnets 94 and the first imbalance rotor eccentric mass concentration 40 around the center axis of rotation. The method includes providing a second stator 96 having a plurality of electromagnets 98 periodically spaced around the center axis of rotation 28. The method includes providing a second imbalance rotor 44 having an eccentric mass concentration 46, and a plurality of magnets 100 periodically spaced around the center axis of rotation 28. The method includes disposing and coupling the second imbalance rotor 44 around the second stator 96 such that the second stator electromagnets 98 directly drive the second imbalance rotor magnets 100 and the second imbalance rotor eccentric mass concentration 46 around the center axis of rotation 28. The method includes directly driving the first rotor 38 and the second rotor 44 at a whole number multiple vibration canceling rotation frequency greater than the operational rotation frequency while controlling the rotational position of the first imbalance rotor eccentric mass concentration 40 and the rotational position of the second imbalance rotor eccentric mass concentration 46 in order to produce a rotating net force vector 58 to inhibit the problematic periodic vibration. The first imbalance rotor encompasses the first stator, and the second imbalance rotor encompasses the second stator, with the first imbalance rotor and the first stator stacked adjacent to the second imbalance rotor and the second stator and aligned coaxially. The rotors are preferably contained in an operational rotation frequency rotary housing 30 spinning at the operational rotation frequency 26, with the imbalance mass concentrations electromagnetically driven at the vibration canceling rotation frequency. The first imbalance rotor eccentric mass concentration produces a first rotating force, and the second imbalance rotor eccentric mass concentration produces a second rotating force, which combine to produce a rotating net force vector to cancel the periodic vibration force. Preferably providing the first stator 90 with a plurality of electromagnets 92 includes providing a first stator 90 with a first set of electromagnet windings 104 and an adjacent parallel second set of electromagnet windings 106. Preferably providing the second stator 96 having a plurality of electromagnets 98 includes providing a second stator 96 with a first set of electromagnet windings 104 and a second set of electromagnet windings 106. Preferably the method includes providing an electronics control system 50, with the electronics control system including a first stator first amplifier 110, a first stator second amplifier 112, a second stator first amplifier 114 and a second stator second amplifier 116. Preferably the first stator first amplifier 110 drives the first stator first set of electromagnet windings 104 and the first stator second amplifier 112 drives the adjacent second set of electromagnet windings 106. Preferably the second stator first amplifier 114 drives the second stator first set of electromagnet windings 104 and the second stator second amplifier 116 drives the adjacent second set of electromagnet windings 106. Preferably in operation two amplifiers drive each imbalance rotor, most preferably with each amplifier and its set of stator electromagnetic windings capable of driving the rotor by itself independent of the other amplifier and its windings. Preferably each amplifier is comprised of three switching Amps. Preferably the method includes driving an imbalance rotor with just one set of windings and one amplifier, preferably when the other set of windings and/or amplifier fails or encounters problems. Preferably the method includes sealing the disposed and coupled first imbalance rotor and first stator and the disposed and coupled second imbalance rotor and second stator in a housing 30 with a liquid lubricant 48. Preferably the housing 30 is comprised of a first rotor upper cavity 60 and a second rotor lower cavity 62, and the method includes isolating the first rotor in the first rotor upper cavity from the second rotor in the second rotor lower cavity, preferably with the upper and lower liquid lubricated cavities liquidly isolated from each other. Preferably the method includes providing a health monitoring sensor 84 and monitoring a change in an operational characteristic of the rotors sensed by the health monitoring sensor. Preferably the health monitoring sensor 84 and its health monitoring system is incorporated into the electronics control system 50. The health monitoring includes measuring operational performance characteristics of the vibration control system 20 with sensors 84, most preferably operational performance characteristics of the first and second rotors 38 and 44 and their rotation, and particularly the performance of bearings 64 and 66. Preferably the method includes monitoring the health of the rotor bearings 64 and 66 with at least one sensor 84. In an embodiment the sensors 84 are temperature sensors that monitor the temperature of the bearings for a change in bearing operation temperature that signals a bearing heat up and degradation in the operation of the bearing. Preferably the health monitoring system with sensors 84 includes at least two temperature sensors, such as thermocouples, preferably with at least one adjacent the bearing to monitor the bearing temperature. Preferably health monitoring the vibration control system includes utilizing a reference temperature to determine when the bearing temperature is rising above the ambient temperature of the vibration control system 20. The health monitoring system sensors 84 monitor the bearing temperature differences to determine if a bearing is heating up too much in its operation, and when the measured temperature difference exceeds a measured operational performance characteristic limitation, the vibration control system preferably through the electronics system provides for a correction change in the vibration control system, such as communicating and warning the user and maintainers that bearing maintenance and/or replacement should be performed so that the bearing operation is corrected prior to failure of the bearing and its rotor. The health monitoring system sensors 84 preferably catches the operation problem at the performance degradation stage, and provides a warning notification to the operator or maintenance crew, to warn about replacement prior to bearing operation failure. The health monitoring system is preferably linked with a warning maintenance signal transmitted to the operator. In an embodiment the health monitoring method monitors operation trends and stores the sensor data, and prior to failure of vibration control system operation identifies an approaching failure. In an embodiment the provided health monitoring system sensors 84 are accelerometers and the method monitors vibration signal levels at ball pass frequency bands to pickup on a deteriorating bearing race. Health monitoring system sensors 84 may be the accelerometers 72, or preferably separate accelerometer sensors 84 that monitor the ball pass frequency from each time a ball rolls over a bearing race problem spot and makes a vibration. Additionally in embodiments the health monitoring method includes sensing, monitoring, and warning about the vibration control system operation including the motor's currents, torques, and temperatures. Preferably the health monitoring system sensors 84 input data into a health monitoring system algorithm, with the algorithm outputting a notification to affect a change/correction to the vibration control system 20 such as service or replacement. In an embodiment the health monitoring system algorithm outputs a log of collected sensor data that is downloaded and analyzed for performance and operation issues.

Figure 8A:
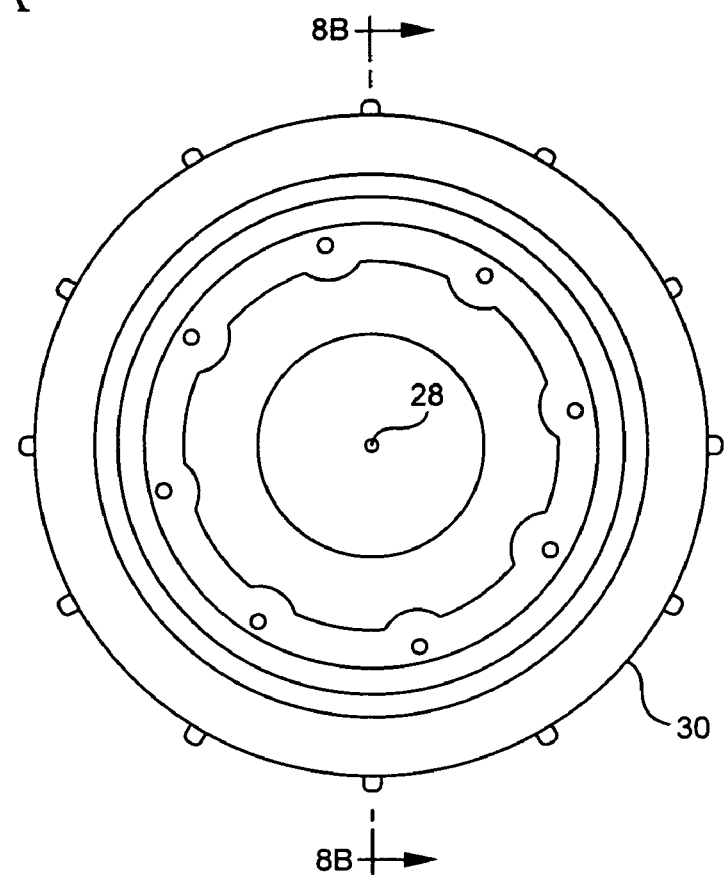
FIG. 8A-E show helicopter rotating hub mounted vibration control methods/systems.
Figure 8B:
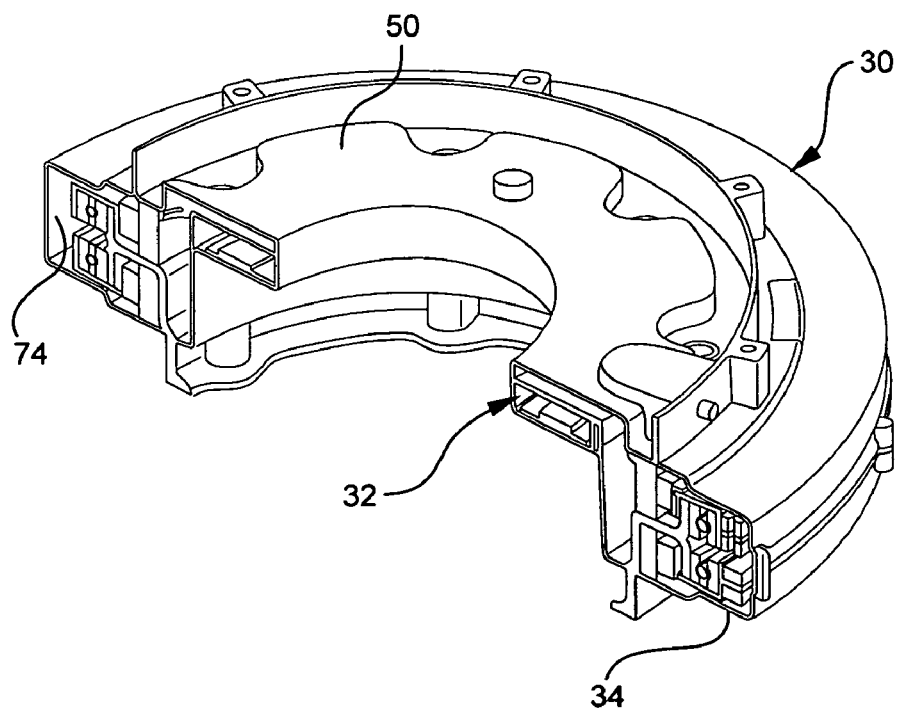
Figure 8C:
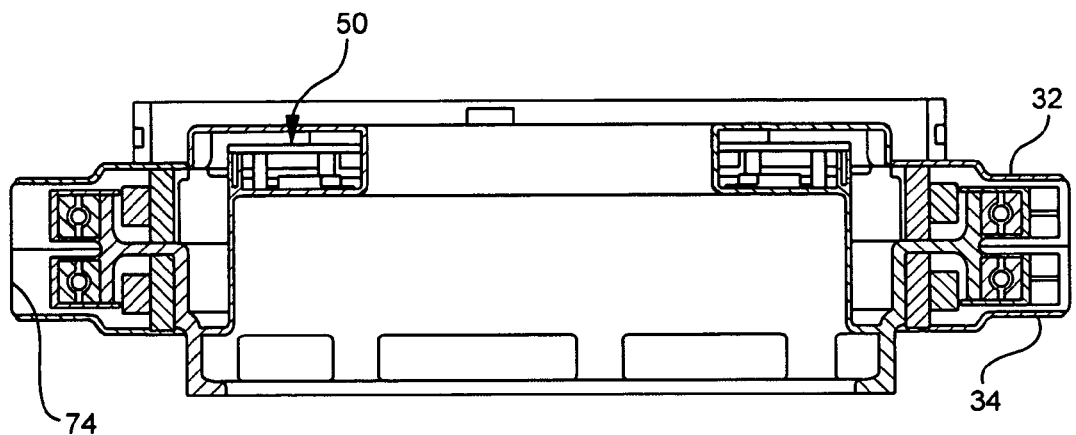
Figure 8D:
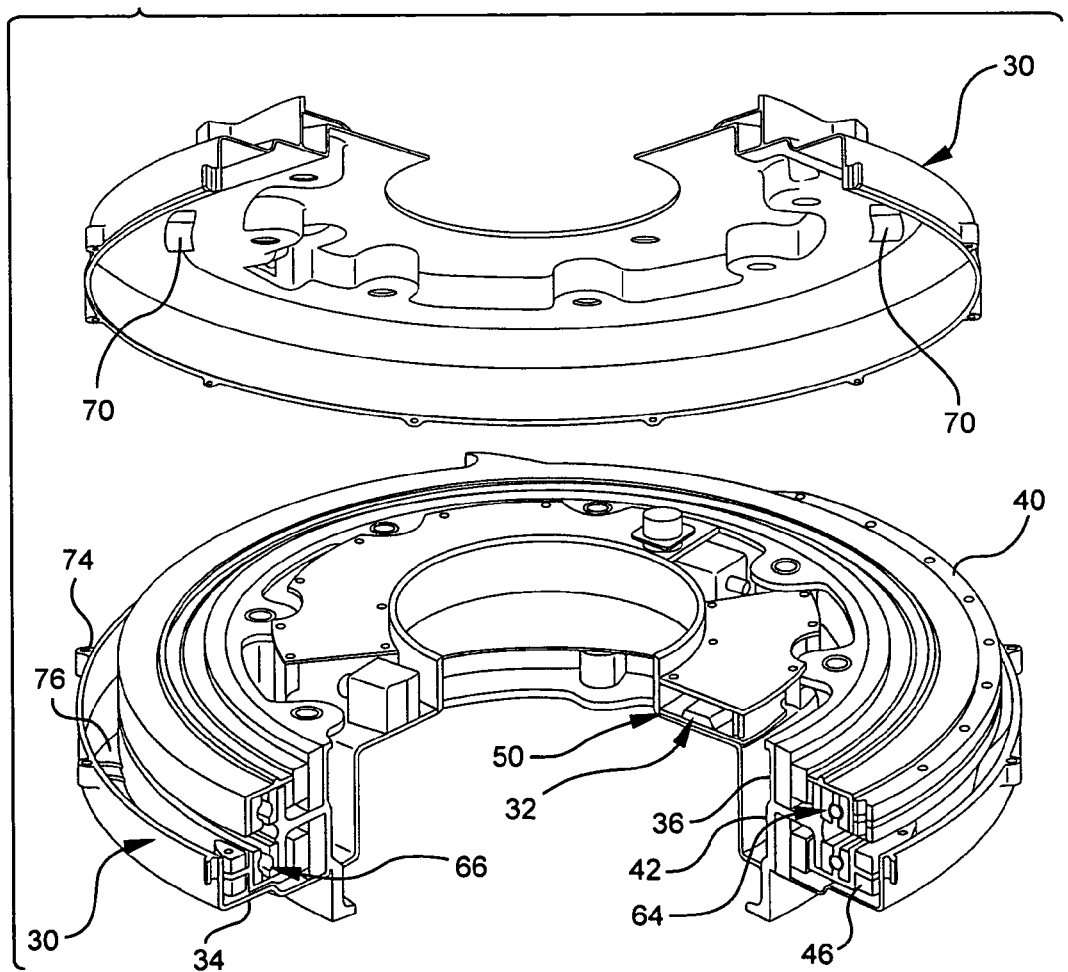
Figure 8E:
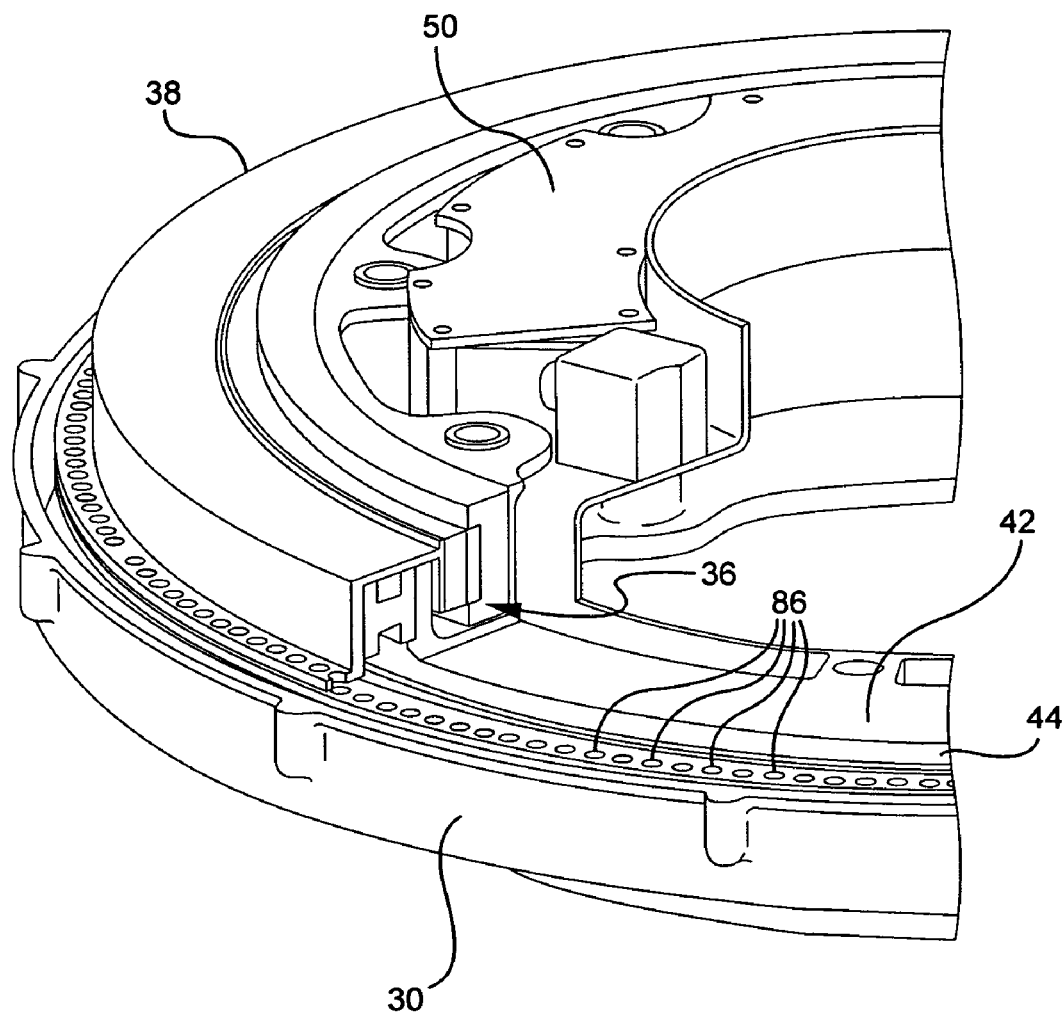
Figure 10A:
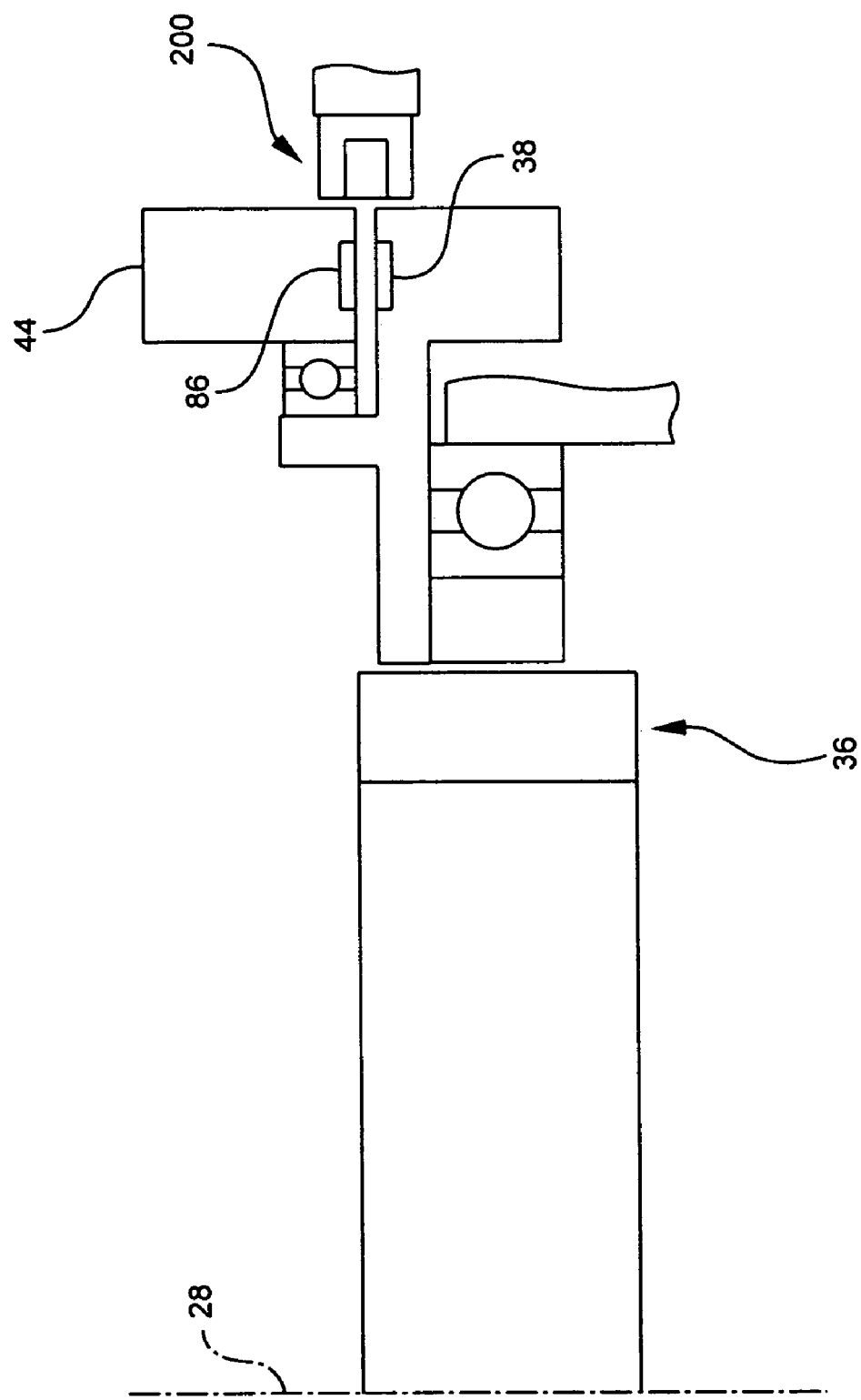
FIG. 10A-C show helicopter rotating hub mounted vibration control methods/systems.
Figure 10B:
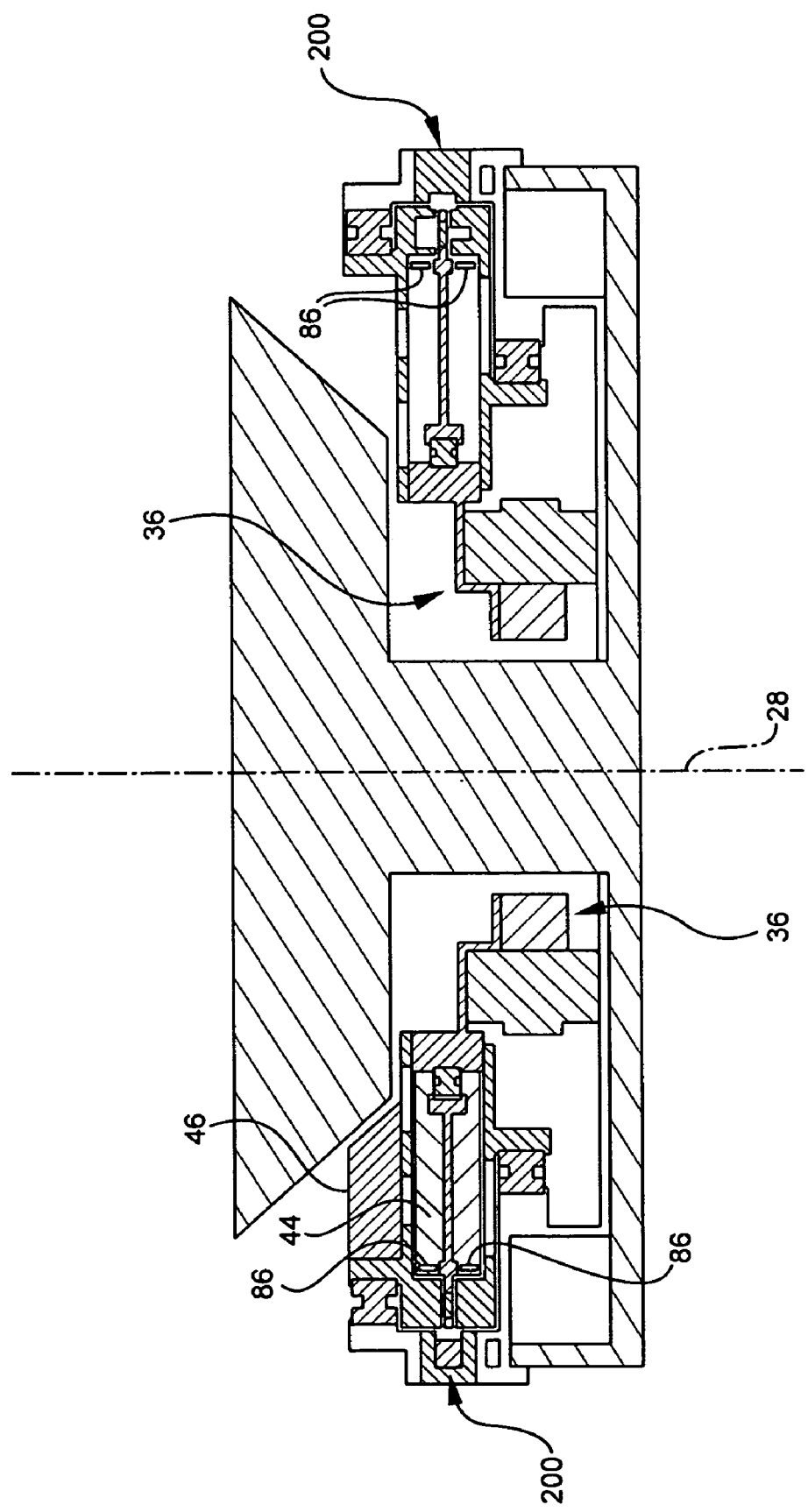
Figure 10C:
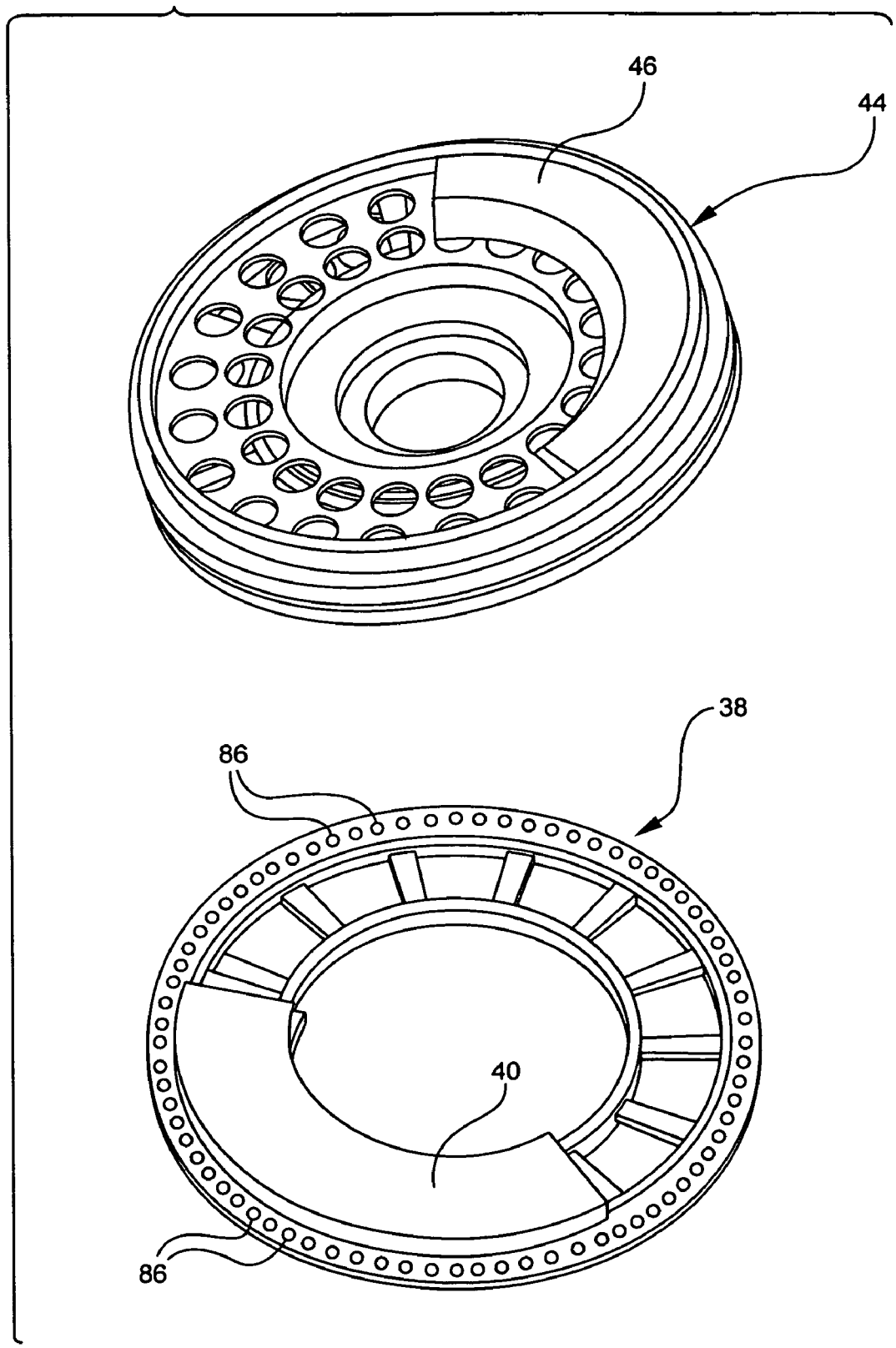

In an embodiment the invention includes a rotating vibration balancer control system for a rotating machine having an operational rotation frequency. The rotating vibration control system provides for controlling a rotating periodic disturbance vibration force of the rotating machine. The rotating vibration balancer control system rotates about a center axis of rotation 28 at the operational rotation frequency 26. The rotating vibration control system includes a first motor 36 with electromagnets periodically spaced around the center axis of rotation 28, preferably the first motor 36 is a brushless frameless AC ring motor. The balancer includes a first imbalance rotor 38 with a mass concentration 40, with the first imbalance rotor including a plurality of magnets periodically spaced around said center axis of rotation 28. Preferably the plurality of magnets include a plurality of rotor detent magnets 86 periodically spaced along the circumference of the rotor. The first imbalance rotor 38 and the first motor 36 are centered about said axis of rotation 28, with the first imbalance rotor driven by the first motor around the center axis of rotation at a vibration controlling rotation frequency 52 greater than said operational rotation frequency 26. The rotating vibration control system includes a second imbalance rotor 44 having a mass concentration 46, with the second imbalance rotor 44 centered about the axis of rotation 28 with the second imbalance rotor 44 proximate the first imbalance rotor 38 wherein the second imbalance rotor mass concentration 46 is movable relative to the first imbalance rotor inorder to produce a rotating balancing net force to minimize and cancel out the periodic vibration force. In an embodiment the second imbalance rotor mass concentration 46 is movable relative to the first imbalance rotor with a second motor 42 that moves the second imbalance rotor 44. In an embodiment such as shown in FIG. 8E, the first and second imbalance rotors 38 and 44 are coupled together with a plurality of rotor detent magnets 86, such that the rotors can rotate together in the event of one of the motors failing. The first rotor is magnetically coupled to the second rotor with the magnetic detents 86 such that the magnetically coupled rotors slip relative to each other at a prescribed torque. The relative position of the two rotor eccentric mass concentrations 40 and 46 can be varied by controlling acceleration impulses to the motor to cause the rotors to slip relative to each other. In an embodiment such as shown in FIG. 10, an electromagnetic coil 200 controllably generates a magnetic field that creates a magnetic circuit between the rotor detent magnets 86 along the circumference of the first and second imbalance rotors 38 and 44 that provides for the relative motion between the first and second rotors. As shown in FIG. 4, the first rotor produces a first rotating force 54 and the second rotor produces a second rotating force 56 which combine to produce a rotating net force vector 58 rotating multiples faster than the operational rotation frequency 26 to balance out the periodic vibration force 24. The invention includes a method of making a rotating vibration control device, which rotates about a center axis of rotation at an operational rotation frequency. The rotating vibration control device for a rotating machine having a rotating periodic disturbance vibration when rotating at the operational rotation frequency. The method includes providing an annular ring rotary housing 30. Preferably the housing 30 includes an electronics housing cavity subsystem 32 and a rotor housing cavity subsystem 34. Preferably the housing 30 is centered about the hub axis of rotation 28 with the electronics housing cavity subsystem 32 centered about the axis of rotation 28 and the rotor cavity subsystem 34 preferably adjacent and coaxial with the electronics cavity 32. Preferably the method includes providing a first stator 90 having a plurality of electromagnets 92 periodically spaced around the center axis of rotation 28, and providing a first imbalance rotor 38 having an eccentric mass concentration 40 and including a plurality of permanent magnets 94 periodically spaced around the center axis of rotation 28. Preferably the method includes coupling the first imbalance rotor with the first stator such that the first stator electromagnets 92 directly drive the first imbalance rotor magnets 94 and the first imbalance rotor eccentric mass concentration 40 around the center axis of rotation 28. Preferably the method includes providing a second stator 96 having a plurality of electromagnets 98 periodically spaced around the center axis of rotation 28. Preferably the method includes providing a second imbalance rotor 44 having an eccentric mass concentration 46 and including a plurality of magnets 100 periodically spaced around the center axis of rotation 28. Preferably the method includes coupling the second imbalance rotor with the second stator such that the second stator electromagnets 98 directly drive the second imbalance rotor magnets 100 and the second imbalance rotor eccentric mass concentration 46 around the center axis of rotation 28. Preferably the method includes sealing the coupled first imbalance rotor and the first stator and the coupled second imbalance rotor and the second stator in the housing 30, most preferably with a liquid lubricant in the housing with the rotors, wherein the imbalance rotors are directly driven at a vibration canceling rotation frequency greater than the rotating machine operational rotation frequency. Preferably the imbalance rotors are directly driven at a vibration canceling rotation frequency that is a whole number multiple of the rotating machine operational rotation frequency. Preferably the housing 30 is comprised of a first rotor upper cavity 60 and a second rotor lower cavity 62, and the method includes isolating the first rotor 38 in the first rotor upper cavity 60 from the second rotor 44 in the second rotor lower cavity 62. Preferably providing the first stator having a plurality of electromagnets includes providing a first stator 90 with a first set of electromagnet windings 104 and an adjacent parallel second set of electromagnet windings 106 and providing the second stator having a plurality of electromagnets includes providing a second stator 96 with a first set of electromagnet windings 104 and a parallel second set of electromagnet windings 106. Preferably the method includes providing an electronics control system 50, with the electronics control system including a first stator first amplifier 110, a first stator second amplifier 112, a second stator first amplifier 114 and a second stator second amplifier 116, with the first stator first amplifier 110 driving the first stator first set of electromagnet windings 104, the first stator second amplifier 112 driving the parallel first stator second set of electromagnet windings 106, and with the second stator first amplifier 114 driving the second stator first set of electromagnet windings 104 and the second stator second amplifier 116 driving the parallel second set of electromagnet windings 106. Preferably the electronics control system 50 rotates about the center axis of rotation 28 along with the housing 30 at the operational rotation frequency 26. Preferably each stator has two sets of windings and connected amplifiers, with each set capable of driving the imbalance, with preferred operation having two amplifiers/two sets of windings driving each rotor, with a rotor driven with just one set of windings when an operation problem is encountered with the other set of windings and its amplifier. The method preferably includes providing a health monitoring sensor 84 for monitoring a change in an operational characteristic of the rotating machine and disposing the health monitoring sensor in the rotary housing 30. The method preferably includes providing the health monitoring sensor 84 and preferably incorporating the sensor 84 into the electronics control system 50 to provide a health monitoring sensor system. The health monitoring sensor 84 measures operational performance characteristics of the vibration control system 20. Most preferably the sensors 84 are disposed proximate the rotors so the operational performance characteristics of the first and second rotors 38 and 44, and particularly the performance of bearings 64 and 66 are monitored. Preferably the sensors 84 monitor the health of the rotor bearings 64 and 66. In an embodiment the sensors 84 are temperature sensors, preferably thermocouples that monitor the temperature of the bearings for a change in bearing operation temperature that signals a bearing heat up and degradation in the operation of the bearing. Preferably temperature sensors 84 are disposed adjacent the bearings 64 and 66. Preferably the health monitoring sensors 84 are linked with the electronics control system 50 such that when a measured characteristic exceeds a measured operational performance characteristic limitation, a warning is transmitted to provide for a correction change in the vibration control system, such as communicating and warning the rotating machine user and maintainers that bearing maintenance and/or replacement should be performed so that the bearing operation is corrected prior to failure of the bearing and its rotor. In an embodiment the provided health monitoring system sensors 84 are accelerometers that monitor the ball pass frequency from each time a ball rolls over a bearing race problem spot and makes a vibration. Additionally in embodiments the health monitoring sensors are sensors for monitoring and warning about the vibration control system operation such as operational currents, torques, and temperatures.

In an embodiment the invention includes a method of making a helicopter rotating vibration balancer, which rotates about a center axis of rotation at an operational rotation frequency. The method includes providing an annular ring rotary housing 30. Preferably the housing 30 includes an electronics housing cavity subsystem 32 and a rotor housing cavity subsystem 34. Preferably the housing 30 is centered about the rotary wing hub axis of rotation 28 with the electronics housing cavity subsystem 32 centered about axis of rotation 28 and the rotor cavity subsystem 34 adjacent and coaxial with the electronics cavity 32. Preferably the method includes providing a first stator 90 having a plurality of electromagnets 92 periodically spaced around the center axis of rotation 28, and providing a first imbalance rotor 38 having an eccentric mass concentration 40 and including a plurality of permanent magnets 94 periodically spaced around the center axis of rotation 28. Preferably the method includes coupling the first imbalance rotor around first stator such that the first stator electromagnets 92 directly drive the first imbalance rotor magnets 94 and the first imbalance rotor eccentric mass concentration 40 around the center axis of rotation 28. Preferably the method includes providing a second stator 96 having a plurality of electromagnets 98 periodically spaced around the center axis of rotation 28. Preferably the method includes providing a second imbalance rotor 44 having an eccentric mass concentration 46 and including a plurality of magnets 100 periodically spaced around the center axis of rotation 28. Preferably the method includes coupling the second imbalance rotor around the second stator such that the second stator electromagnets 98 directly drive the second imbalance rotor magnets 100 and the second imbalance rotor eccentric mass concentration 46 around the center axis of rotation 28. Preferably the method includes sealing the coupled first imbalance rotor and the first stator and the coupled second imbalance rotor and the second stator in the housing 30, most preferably with a liquid lubricant in the housing with the rotors. Preferably the housing 30 is comprised of a first rotor upper cavity 60 and a second rotor lower cavity 62, and the method includes isolating the first rotor 38 in the first rotor upper cavity 60 from the second rotor 44 in the second rotor lower cavity 62. Preferably providing the first stator having a plurality of electromagnets includes providing a first stator 90 with a first set of electromagnet windings 104 and an adjacent parallel second set of electromagnet windings 106 and providing the second stator having a plurality of electromagnets includes providing a second stator 96 with a first set of electromagnet windings 104 and a parallel second set of electromagnet windings 106. Preferably the method includes providing an electronics control system 50, with the electronics control system including a first stator first amplifier 110, a first stator second amplifier 112, a second stator first amplifier 114 and a second stator second amplifier 116, with the first stator first amplifier 110 driving the first stator first set of electromagnet windings 104, the first stator second amplifier 112 driving the parallel first stator second set of electromagnet windings 106, and with the second stator first amplifier 114 driving the second stator first set of electromagnet windings 104 and the second stator second amplifier 116 driving the parallel second set of electromagnet windings 106. Preferably the electronics control system 50 rotates about the center axis of rotation 28 along with the housing 30 at the operational rotation frequency 26. Preferably each stator has two sets of windings and connected amplifiers, with each set capable of driving the imbalance, with preferred operation of the helicopter rotating hub 20 having two amplifiers/two sets of windings driving each rotor, with a rotor driven with just one set of windings when a operation problem is encountered with the other set of windings and its amplifier. The method preferably includes providing a health monitoring sensor 84 for monitoring a change in an operational characteristic of the helicopter rotating hub and disposing the health monitoring sensor in the rotary housing 30. The method preferably includes providing the health monitoring sensor 84 and preferably incorporating the sensor 84 into the electronics control system 50 to provide a health monitoring sensor system. The health monitoring sensor 84 measures an operational performance characteristic of the vibration control system 20. Most preferably the sensors 84 are disposed proximate the rotors so the operational performance characteristics of the first and second rotors 38 and 44, and particularly the performance of bearings 64 and 66 are monitored. Preferably the sensors 84 monitor the health of the rotor bearings 64 and 66. In an embodiment the sensors 84 are temperature sensors, preferably thermocouples that monitor the temperature of the bearings for a change in bearing operation temperature that signals a bearing heat up and degradation in the operation of the bearing. Preferably temperature sensors 84 are disposed adjacent the bearings 64 and 66. Preferably the health monitoring sensors 84 are linked with the electronics control system 50 and the helicopter avionics system such that when a measured characteristic exceeds a measured operational performance characteristic limitation, a warning is transmitted to provide for a correction change in the vibration control system, such as communicating and warning the helicopter user and maintainers that bearing maintenance and/or replacement should be performed so that the bearing operation is corrected prior to failure of the bearing and its rotor. In an embodiment the provided health monitoring system sensors 84 accelerometers that monitor the ball pass frequency from each time a ball rolls over a bearing race problem spot and makes a vibration. Additionally in embodiments the health monitoring sensors are sensors for monitoring and warning about the vibration control system operation such as operational currents, torques, and temperatures.

It will be apparent to those skilled in the art that various modifications and variations can be made to the invention without departing from the spirit and scope of the invention. Thus, it is intended that the present invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A rotary wing aircraft rotating vibration control system for an aircraft rotary wing hub having a periodic vibration while rotating at a rotary wing aircraft operational rotation frequency about a rotary wing axis of rotation, said rotary wing aircraft rotating vibration control system comprised of:
    a rotary housing, said housing centered about and encompassing said rotary wing axis of rotation and rotating with said rotary wing hub at said operational rotation frequency, said housing containing a first coaxial ring motor coaxially centered about said rotary wing axis of rotation, said first coaxial ring motor having a first rotor with a first imbalance mass concentration, said housing containing a second coaxial ring motor coaxially centered about said rotary wing axis of rotation, said second coaxial ring motor having a second rotor with a second imbalance mass concentration; and
    an electronics control system which controls a speed and a phase of said first coaxial ring motor and a speed and a phase of said second coaxial ring motor to drive
    said first imbalance mass concentration and said second imbalance mass concentration wherein said rotary wing hub periodic vibration is reduced.

2. A rotating vibration control system as claimed in claim 1 wherein said rotary housing confines a lubricant.

3. A rotating vibration control system as claimed in claim 1 wherein said housing is comprised of a first upper cavity and a second lower cavity.

4. A rotating vibration control system as claimed in claim 1 wherein said first coaxial ring motor first rotor has a lubricated bearing for supporting said first rotor relative to said housing, said first rotor bearing lubricated by a lubricant, and said second coaxial ring motor second rotor has a lubricated bearing for supporting said second rotor relative to said housing, said second rotor bearing lubricated by a lubricant.

5. A rotating vibration control system as claimed in claim 4, wherein said housing includes a circumferential surface that constrains said lubricant.

6. A rotating vibration control system as claimed in claim 5, said first rotor lubricated bearing including an outer race secured to said housing proximate said housing circumferential surface and an inner race secured to said first rotor, said second rotor lubricated bearing including an outer race secured to said housing proximate said housing circumferential surface and an inner race secured to said second rotor.

7. A rotating vibration control system as claimed in claim 1 including a health monitoring sensor for monitoring a change in an operational characteristic of said vibration control system.

8. A rotating vibration control system as claimed in claim 1 wherein said electronics control system includes an electromagnetic braking circuit for electromagnetically braking a rotation of said rotors.

9. A rotating vibration control system as claimed in claim 1 wherein said electronics control system opposingly orients said first imbalance mass concentration and said second imbalance mass concentration at a transitioning rotation speed.

10. A method of controlling a periodic vibration of an aircraft with a rotary hub which rotates at an operational rotation frequency,
    said method including providing an annular ring housing having a coaxial rotor housing cavity subsystem, said rotor housing cavity subsystem containing a first coaxial ring motor having a first rotor with a first imbalance mass concentration, a second coaxial ring motor having a second rotor with a second imbalance mass concentration, and a lubricant,
    securing said annular ring housing to said rotary hub with said annular ring housing rotating at said operational rotation frequency with said rotary hub,
    directly driving the rotation of said first rotor and said second rotor by controlling said first coaxial ring motor and said second coaxial ring motor to control the rotational position of said first imbalance mass concentration and said second imbalance mass concentration inorder to inhibit said periodic vibration.

11. A method as claimed in claim 10 wherein said rotor housing cavity subsystem includes a circumferential surface that constrains said lubricant, and said method includes rotating said annular ring housing with said rotary hub at said operational rotation frequency with said lubricant collecting at said circumferential surface.

12. A method as claimed in claim 11 including moving said lubricant inward from said circumferential surface.

13. A method as claimed in claim 11 wherein said first rotor has a lubricated bearing for supporting said first rotor relative to said housing and said second rotor has a lubricated bearing for supporting said second rotor relative to said housing, and said method include moving said lubricated bearings through said lubricant collecting at said circumferential surface.

14. A method as claimed in claim 10 including sealing said lubricant in said rotor cavity subsystem.

15. A method as claimed in claim 10, said method including isolating said first rotor in a first rotor upper rotor cavity from said second rotor in a second rotor lower rotor cavity.

16. A method as claimed in claim 10, said method including providing a health monitoring sensor and monitoring a change in an operational characteristic sensed by said health monitoring sensor.

17. A method as claimed in claim 10 wherein said method includes electromagnetically braking a rotation of said rotors.

18. A method as claimed in claim 10 wherein said method includes opposingly orienting said first imbalance mass concentration and said second imbalance mass concentration at a transitioning rotation speed less.

19. A method of making a rotating hub mounted vibration control system for a rotary wing hub having a periodic vibration while rotating at an operational rotation frequency, said method including: providing a rotary housing having a rotor housing cavity, said rotor housing cavity containing a first coaxial ring motor having a first rotor with a first imbalance mass concentration, a second coaxial ring motor having a second rotor with a second imbalance mass concentration, said rotor housing cavity including a circumferential surface,
providing an electronics control system which controls a speed and a phase of said first coaxial ring motor and a speed and a phase of said second coaxial ring motor,
connecting said electronics control system with said first coaxial ring motor and said second coaxial ring motor,
and sealing a lubricant inside said rotor housing cavity, wherein said lubricant collects along said circumferential surface when said rotary housing rotates at said operational rotation frequency.

20. A method as claimed in claim 19, wherein said rotor housing cavity is comprised of a first rotor upper cavity and a second rotor lower cavity, and said method includes isolating said first rotor in said first rotor upper cavity from said second rotor in said second rotor lower cavity.

21. A method as claimed in claim 19, said method including providing a health monitoring sensor for monitoring a change in an operational characteristic and disposing said health monitoring sensor in said rotary housing.

22. A rotating vibration control system for a rotating machine having an operational rotation frequency which rotates about a center axis of rotation at said operational rotation frequency, said rotating vibration control system comprised of a rotating vibration control system rotary housing,
said rotary housing centered about and encompassing said center axis of rotation, said rotary housing rotating about said center axis at said operational rotation frequency, said rotary housing including a first stator having a plurality of electromagnets, said electromagnets periodically spaced around said center axis of rotation, a first imbalance rotor having a mass concentration, said first imbalance rotor including a plurality of magnets periodically spaced around said center axis of rotation, said first imbalance rotor adjacent said first stator, a second stator having a plurality of electromagnets, said electromagnets periodically spaced around said center axis of rotation, a second imbalance rotor having a mass concentration, said second imbalance rotor including a plurality of magnets periodically spaced around said center axis of rotation, said second imbalance rotor adjacent said second stator,
wherein said first stator electromagnets directly drive said first imbalance rotor magnets and said first imbalance rotor mass concentration around said center axis of rotation at a first imbalance rotor vibration controlling rotation frequency greater than said operational rotation frequency, and said second stator electromagnets directly drive said second imbalance rotor magnets and said second imbalance rotor mass concentration around said center axis of rotation at a second imbalance rotor vibration controlling rotation frequency; and
a electronics control system which controls a speed and a phase of said first rotor and said second rotor.

23. A rotating vibration control system as claimed in claim 22 including a health monitoring sensor for monitoring a change in an operational characteristic of said rotating vibration control system.

24. A method of controlling a periodic vibration of an aircraft with a rotary wing hub which rotates about a rotary wing hub center axis of rotation at an operational rotation frequency, said method including:
providing a first stator having a plurality of electromagnets, said electromagnets periodically spaced around said rotary wing hub center axis of rotation,
providing a first imbalance rotor, said first imbalance rotor having an eccentric mass concentration, said first imbalance rotor including a plurality of magnets periodically spaced around said rotary wing hub center axis of rotation,
disposing and coupling said first imbalance rotor around said first stator such that said first stator electromagnets directly drive said first imbalance rotor magnets and said first imbalance rotor eccentric mass concentration around said rotary wing hub center axis of rotation,
providing a second stator having a plurality of electromagnets, said electromagnets periodically spaced around said rotary wing hub center axis of rotation,
providing a second imbalance rotor, said second imbalance rotor having an eccentric mass concentration, said second imbalance rotor including a plurality of magnets periodically spaced around said rotary wing hub center axis of rotation,
disposing and coupling said second imbalance rotor around said second stator such that said second stator electromagnets directly drive said second imbalance rotor magnets and said second imbalance rotor eccentric mass concentration around said rotary wing hub center axis of rotation,
directly driving said first rotor at a first rotor controlling rotation frequency greater than said operational rotation frequency around said rotary wing hub center axis of rotation and directly driving said second rotor at a second rotor controlling rotation frequency greater than said operational rotation frequency around said rotary wing hub center axis of rotation while controlling a rotational position of said first imbalance rotor eccentric mass concentration around said rotary wing hub center axis of rotation and a rotational position of said second imbalance rotor eccentric mass concentration around said rotary wing hub center axis of rotation inorder to inhibit said periodic vibration.

25. A method as claimed in claim 24 wherein providing said first stator having a plurality of electromagnets includes providing a first stator with a first set of electromagnet windings and a second set of electromagnet windings
and providing said second stator having a plurality of electromagnets includes providing a second stator with a first set of electromagnet windings and a second set of electromagnet windings.

26. A method as claimed in claim 24 including providing an electronics control system, with said electronics control system including a first stator first amplifier, a first stator second amplifier, a second stator first amplifier and a second stator second amplifier, and providing said first stator having a plurality of electromagnets includes providing a first stator with a first set of electromagnet windings and a second set of electromagnet windings, with said first stator first amplifier driving said first set of electromagnet windings and said first stator second amplifier driving said second set of electromagnet windings, and providing said second stator having a plurality of electromagnets includes providing a second stator with a first set of electromagnet windings and a second set of electromagnet windings, with said second stator first amplifier driving said first set of electromagnet windings and said second stator second amplifier driving said second set of electromagnet windings.

27. A method as claimed in claim 24, said method including sealing said disposed and coupled first imbalance rotor and first stator and said disposed and coupled second imbalance rotor and second stator in a housing with a liquid lubricant.

28. A method as claimed in claim 27, wherein said housing is comprised of a first rotor upper cavity and a second rotor lower cavity, and said method includes isolating said first rotor in said first rotor upper cavity from said second rotor in said second rotor lower cavity.

29. A method as claimed in claim 24, said method including providing a health monitoring sensor and monitoring a change in an operational characteristic sensed by said health monitoring sensor.

30. A rotating vibration control system which rotates about a center axis of rotation at an operational rotation frequency, said rotating vibration control system for balancing out a periodic vibration force, said rotating vibration control system comprised of
- a first motor having a plurality of electromagnets, said electromagnets periodically spaced around said center axis of rotation,
- a first imbalance rotor having a mass concentration, said first imbalance rotor including a plurality of magnets periodically spaced around said center axis of rotation, said first imbalance rotor and said first motor centered about said axis of rotation, said first imbalance rotor driven by said first motor around said center axis of rotation at a vibration controlling rotation frequency greater than said operational rotation frequency, and a second imbalance rotor, said second imbalance rotor having a mass concentration, said second imbalance rotor centered about said axis of rotation wherein said second imbalance rotor mass concentration is movable relative to said first imbalance rotor mass concentration inorder to produce a rotating balancing net force to cancel out said periodic vibration force.

31. A method of making a rotating vibration control device which rotates about a center axis of rotation at an operational rotation frequency, said method comprised of:
- providing a rotary housing,
- providing a first stator having a plurality of electromagnets, said electromagnets periodically spaced around said center axis of rotation,
- providing a first imbalance rotor, said first imbalance rotor having an eccentric mass concentration, said first imbalance rotor including a plurality of magnets periodically spaced around said center axis of rotation,
- coupling said first imbalance rotor around first stator such that said first stator electromagnets directly drive said first imbalance rotor magnets and said first imbalance rotor eccentric mass concentration around said center axis of rotation,
- providing a second stator having a plurality of electromagnets, said electromagnets periodically spaced around said center axis of rotation,
- providing a second imbalance rotor, said second imbalance rotor having an eccentric mass concentration, said second imbalance rotor including a plurality of magnets periodically spaced around said center axis of rotation,
- coupling said second imbalance rotor around said second stator such that said second stator electromagnets directly drive said second imbalance rotor magnets and said second imbalance rotor eccentric mass concentration around said center axis of rotation,
- sealing said coupled first imbalance rotor and said first stator and said coupled second imbalance rotor and said second stator in said housing.

32. A method as claimed in claim 31, wherein said housing is comprised of a first rotor upper cavity and a second rotor lower cavity, and said method includes isolating said first rotor in said first rotor upper cavity from said second rotor in said second rotor lower cavity.

33. A method as claimed in claim 31 wherein providing said first stator having a plurality of electromagnets includes providing a first stator with a first set of electromagnet windings and a second set of electromagnet windings and providing said second stator having a plurality of electromagnets includes providing a second stator with a first set of electromagnet windings and a second set of electromagnet windings.

34. A method as claimed in claim 31 including providing an electronics control system, with said electronics control system including a first stator first amplifier, a first stator second amplifier, a second stator first amplifier and a second stator second amplifier, and
- providing said first stator having a plurality of electromagnets includes providing a first stator with a first set of electromagnet windings and a second set of electromagnet windings, with said first stator first amplifier driving said first set of electromagnet windings and said first stator second amplifier driving said second set of electromagnet windings, and providing said second stator having a plurality of electromagnets includes providing a second stator with a first set of electromagnet windings and a second set of electromagnet windings, with said second stator first amplifier driving said first set of electromagnet windings and said second stator second amplifier driving said second set of electromagnet windings.

35. A method as claimed in claim 31, said method including providing a health monitoring sensor for monitoring a change in an operational characteristic and disposing said health monitoring sensor in said rotary housing.

* * * * *